(12) United States Patent
Sanford et al.

(10) Patent No.: US 9,912,053 B2
(45) Date of Patent: Mar. 6, 2018

(54) ARRAY ANTENNAS HAVING A PLURALITY OF DIRECTIONAL BEAMS

(71) Applicant: Ubiquiti Networks, Inc., New York, NY (US)

(72) Inventors: John R. Sanford, Escondido, CA (US); Sriram Dayanandan, Dublin, CA (US); Vish Ponnampalam, Palo Alto, CA (US); Gonzalo P. Jabbaz, Taipei (TW); Robert J. Pera, San Jose, CA (US)

(73) Assignee: Ubiquiti Networks, Inc., New York, NY (US)

( * ) Notice: Subject to any disclaimer, the term of this patent is extended or adjusted under 35 U.S.C. 154(b) by 158 days.

(21) Appl. No.: 14/659,424

(22) Filed: Mar. 16, 2015

(65) Prior Publication Data

US 2015/0263424 A1 Sep. 17, 2015

Related U.S. Application Data

(60) Provisional application No. 62/019,321, filed on Jun. 30, 2014, provisional application No. 61/954,244, filed on Mar. 17, 2014.

(51) Int. Cl.
*H01Q 3/00* (2006.01)
*H01Q 3/24* (2006.01)
(Continued)

(52) U.S. Cl.
CPC .............. *H01Q 3/24* (2013.01); *H01Q 1/12* (2013.01); *H01Q 1/1228* (2013.01); *H01Q 3/36* (2013.01);
(Continued)

(58) Field of Classification Search
CPC .. H01Q 3/24; H01Q 3/36; H01Q 3/46; H01Q 15/08; H01Q 15/21; H01Q 3/00;
(Continued)

(56) References Cited

U.S. PATENT DOCUMENTS 3,155,975 A 11/1964 Chatelain
3,633,208 A 1/1972 Ajioka
(Continued)

FOREIGN PATENT DOCUMENTS

DE 102012023938 12/2014
DE 102012023938 A1 12/2014
(Continued)

OTHER PUBLICATIONS

Pera et al.; U.S. Appl. No. 14/862,676 entitled "Multi-sector antennas," filed Sep. 23, 2015.
(Continued)

*Primary Examiner* — Harry K Liu
(74) *Attorney, Agent, or Firm* — Shay Glenn LLP

(57) ABSTRACT

Multi-directional antenna apparatuses, which may include phased array antennas and/or arrays of multiple antennas, and methods for operating these directional antennas. In particular, described herein are apparatuses configured to operate as an access point (AP) for communicating with one or more station devices by assigning a particular directional beam to each access point, and communicating with each station device using the assigned directional beam at least part of the time. Methods and apparatuses configured to optimize the assignment of one or more directional beam and for communicating between different station devices using assigned directional beams are described. Also described are methods of connecting a radio device to an antenna by connecting a USB connector on the radio device to a USB connector on an antenna and identifying the antenna based on a voltage of the ground pin on the antenna's USB connector.

11 Claims, 34 Drawing Sheets

(51) Int. Cl.
| | |
|---|---|
| *H01Q 3/36* | (2006.01) |
| *H01Q 1/12* | (2006.01) |
| *H01Q 3/46* | (2006.01) |
| *H01Q 15/08* | (2006.01) |
| *H04B 7/06* | (2006.01) |
| *H04W 16/28* | (2009.01) |
| *H01Q 25/00* | (2006.01) |
| *H01Q 21/00* | (2006.01) |
| H04W 84/12 | (2009.01) |
| H04W 88/08 | (2009.01) |

(52) U.S. Cl.
CPC ............ *H01Q 3/46* (2013.01); *H01Q 15/08* (2013.01); *H01Q 21/0031* (2013.01); *H01Q 25/008* (2013.01); *H04B 7/0617* (2013.01); *H04B 7/0639* (2013.01); *H04B 7/0695* (2013.01); *H04W 16/28* (2013.01); *H04W 84/12* (2013.01); *H04W 88/08* (2013.01)

(58) Field of Classification Search
CPC ...... H01Q 1/12; H01Q 1/1228; H04B 7/0617; H04B 7/0639; H04B 7/0695; H04W 16/28; H04W 84/12; H04W 88/08
USPC .................................. 343/700 MS; 342/371
See application file for complete search history.

(56) References Cited

U.S. PATENT DOCUMENTS

| | | |
|---|---|---|
| 3,696,433 A | 10/1972 | Killion et al. |
| 3,739,392 A | 6/1973 | Ross et al. |
| 3,825,874 A | 7/1974 | Peverill |
| 4,087,822 A | 5/1978 | Maybell et al. |
| 4,613,868 A | 9/1986 | Weiss |
| 4,658,262 A | 4/1987 | Duhamel |
| 4,757,324 A | 7/1988 | Dhanjal |
| 4,758,842 A | 7/1988 | Linhardt et al. |
| 4,973,953 A | 11/1990 | Shimokawa et al. |
| 4,992,866 A | 2/1991 | Morgan |
| 5,131,006 A | 7/1992 | Kamerman et al. |
| 5,151,920 A | 9/1992 | Haagh et al. |
| 5,191,349 A | 3/1993 | Dinsmore et al. |
| 5,295,154 A | 3/1994 | Meier et al. |
| 5,303,413 A | 4/1994 | Braegas |
| 5,307,515 A | 4/1994 | Kuo et al. |
| 5,339,455 A | 8/1994 | Vogt et al. |
| 5,406,260 A | 4/1995 | Cummings et al. |
| 5,416,797 A | 5/1995 | Gilhousen et al. |
| 5,422,887 A | 6/1995 | Diepstraten et al. |
| 5,428,636 A | 6/1995 | Meier |
| 5,503,566 A | 4/1996 | Wang |
| 5,504,746 A | 4/1996 | Meier |
| 5,510,975 A | 4/1996 | Ziegler |
| 5,523,768 A | 6/1996 | Hemmie et al. |
| 5,546,397 A | 8/1996 | Mahany |
| 5,564,093 A | 10/1996 | Matsumoto |
| 5,608,413 A | 3/1997 | Macdonald |
| 5,621,662 A | 4/1997 | Humphries et al. |
| 5,661,494 A | 8/1997 | Bondyopadhyay |
| 5,666,126 A | 9/1997 | Lange |
| 5,706,428 A | 1/1998 | Boer et al. |
| 5,734,350 A | 3/1998 | Deming et al. |
| 5,740,366 A | 4/1998 | Mahany et al. |
| 5,758,296 A | 5/1998 | Nakamura |
| 5,782,656 A | 7/1998 | Zell et al. |
| 5,805,111 A | 9/1998 | Brettner et al. |
| 5,844,893 A | 12/1998 | Gollnick et al. |
| 5,872,594 A | 2/1999 | Thompson |
| 5,936,542 A | 8/1999 | Kleinrock et al. |
| 5,936,584 A | 8/1999 | Lawrence et al. |
| 5,936,588 A | 8/1999 | Rao et al. |
| 5,940,771 A | 8/1999 | Gollnick et al. |
| 6,036,539 A | 3/2000 | Rigby et al. |
| 6,045,402 A | 4/2000 | Embo et al. |
| 6,067,053 A | 5/2000 | Runyon et al. |
| 6,113,431 A | 9/2000 | Wong |
| 6,124,830 A | 9/2000 | Yuanzhu |
| 6,127,987 A | 10/2000 | Maruyama et al. |
| 6,130,892 A | 10/2000 | Short et al. |
| 6,192,282 B1 | 2/2001 | Smith et al. |
| 6,194,992 B1 | 2/2001 | Short et al. |
| 6,206,724 B1 | 3/2001 | Leung |
| 6,208,310 B1 | 3/2001 | Suleiman et al. |
| 6,219,005 B1 | 4/2001 | Szafranek |
| 6,252,559 B1 | 6/2001 | Donn |
| 6,275,922 B1 | 8/2001 | Bertsch |
| 6,313,798 B1 | 11/2001 | Bancroft et al. |
| 6,320,553 B1 | 11/2001 | Ergene |
| 6,326,922 B1 | 12/2001 | Hegendoerfer |
| 6,334,057 B1 | 12/2001 | Malmgren et al. |
| 6,337,990 B1 | 1/2002 | Koshino |
| 6,359,647 B1 | 3/2002 | Sengupta et al. |
| 6,362,783 B1 | 3/2002 | Sugiura et al. |
| 6,374,311 B1 | 4/2002 | Mahany et al. |
| 6,386,913 B1 | 5/2002 | Mohammad et al. |
| 6,386,914 B1 | 5/2002 | Collins et al. |
| 6,411,258 B1 | 6/2002 | Ho |
| 6,425,783 B1 | 7/2002 | Touboul |
| 6,429,827 B1 | 8/2002 | Hsueh et al. |
| 6,462,710 B1 | 10/2002 | Carson et al. |
| 6,501,377 B2 | 12/2002 | Ebata et al. |
| 6,522,307 B2 | 2/2003 | Kim |
| 6,524,119 B2 | 2/2003 | Kato et al. |
| 6,529,234 B2 | 3/2003 | Urisaka et al. |
| 6,535,793 B2 | 3/2003 | Allard |
| 6,563,786 B1 | 5/2003 | Nee |
| 6,567,482 B1 | 5/2003 | Popovic |
| 6,593,892 B2 | 7/2003 | Honda et al. |
| 6,597,393 B2 | 7/2003 | Kato et al. |
| 6,618,017 B1 | 9/2003 | Ryken et al. |
| 6,636,894 B1 | 10/2003 | Short et al. |
| 6,643,496 B1 | 11/2003 | Shimoyama et al. |
| 6,665,004 B1 | 12/2003 | Paff |
| 6,665,536 B1 | 12/2003 | Mahany |
| 6,679,728 B1 | 1/2004 | Huang et al. |
| 6,697,415 B1 | 2/2004 | Mahany |
| 6,714,559 B1 | 3/2004 | Meier |
| 6,738,582 B1 | 5/2004 | Moshe et al. |
| 6,759,957 B2 | 7/2004 | Murakami et al. |
| 6,788,250 B2 * | 9/2004 | Howell ............... H01Q 3/26 342/372 |
| 6,789,110 B1 | 9/2004 | Short et al. |
| 6,795,852 B1 | 9/2004 | Kleinrock et al. |
| 6,808,414 B2 | 10/2004 | Spiegel et al. |
| 6,810,426 B2 | 10/2004 | Mysore et al. |
| 6,813,260 B1 | 11/2004 | Fogle |
| 6,844,862 B1 | 1/2005 | Cencich et al. |
| 6,845,297 B2 | 1/2005 | Allard |
| 6,857,009 B1 | 2/2005 | Ferreria et al. |
| 6,865,169 B1 | 3/2005 | Quayle et al. |
| 6,868,399 B1 | 3/2005 | Short et al. |
| 6,945,817 B2 | 9/2005 | Miyazaki et al. |
| 6,954,859 B1 | 10/2005 | Simerly et al. |
| 6,968,173 B2 | 11/2005 | Cowley |
| 6,970,680 B1 | 11/2005 | Tomoe |
| 6,970,751 B2 | 11/2005 | Gonzales et al. |
| 6,977,585 B2 | 12/2005 | Falk et al. |
| 6,997,753 B2 | 2/2006 | Broomall et al. |
| 7,020,082 B2 | 3/2006 | Bhagavath et al. |
| 7,038,620 B1 * | 5/2006 | Chubb, Jr. ............... H01Q 1/28 342/153 |
| 7,079,079 B2 | 7/2006 | Jo et al. |
| 7,086,898 B2 | 8/2006 | Johnsen et al. |
| 7,088,727 B1 | 8/2006 | Short et al. |
| 7,095,321 B2 | 8/2006 | Primm et al. |
| 7,117,043 B1 | 10/2006 | Frederick et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,252,555 B2 | 8/2007 | Moessinger |
| 7,254,191 B2 | 8/2007 | Sugar et al. |

(56) References Cited

U.S. PATENT DOCUMENTS

| | | |
|---|---|---|
| 7,286,095 B2 | 10/2007 | Parsche et al. |
| 7,295,812 B2 | 11/2007 | Haapoja et al. |
| 7,319,477 B2 | 1/2008 | Katz |
| 7,353,114 B1 | 4/2008 | Rohlf et al. |
| 7,386,002 B2 | 6/2008 | Meier |
| 7,413,474 B2 | 8/2008 | Liu et al. |
| 7,430,442 B2 | 9/2008 | He et al. |
| 7,457,646 B2 | 11/2008 | Mahany et al. |
| 7,483,984 B1 | 1/2009 | Jonker et al. |
| 7,526,539 B1 | 4/2009 | Hsu |
| 7,555,658 B2 | 6/2009 | Vahid et al. |
| 7,584,020 B2 | 9/2009 | Bruemmer et al. |
| 7,587,260 B2 | 9/2009 | Bruemmer et al. |
| 7,636,559 B2 | 12/2009 | Magnusen et al. |
| 7,668,621 B2 | 2/2010 | Bruemmer |
| 7,683,940 B2 | 3/2010 | Fleming |
| 7,696,940 B1 | 4/2010 | Macdonald |
| 7,710,940 B2 | 5/2010 | Van Der Wal et al. |
| 7,715,800 B2 | 5/2010 | Sinha |
| 7,733,835 B2 | 6/2010 | Sammour et al. |
| 7,739,383 B1 | 6/2010 | Short et al. |
| 7,752,334 B2 | 7/2010 | Paunikar et al. |
| 7,783,390 B2 | 8/2010 | Miller |
| 7,791,466 B2 | 9/2010 | Agarwalla et al. |
| 7,801,644 B2 | 9/2010 | Bruemmer et al. |
| 7,826,426 B1 | 11/2010 | Bharghavan et al. |
| 7,839,926 B1 | 11/2010 | Metzger et al. |
| 7,848,263 B2 | 12/2010 | Chhabra |
| 7,865,252 B2 | 1/2011 | Clayton |
| 7,889,701 B2 | 2/2011 | Malik et al. |
| 7,934,952 B2 | 5/2011 | Pera |
| 7,974,738 B2 | 7/2011 | Bruemmer et al. |
| 8,013,732 B2 | 9/2011 | Petite et al. |
| 8,031,650 B2 | 10/2011 | Petite et al. |
| 8,042,048 B2 | 10/2011 | Wilson et al. |
| 8,060,582 B2 | 11/2011 | Bliss et al. |
| 8,073,564 B2 | 12/2011 | Bruemmer et al. |
| 8,077,113 B2 | 12/2011 | Syed et al. |
| 8,154,398 B2 | 4/2012 | Rolf et al. |
| 8,165,041 B2 | 4/2012 | Wang et al. |
| 8,184,061 B2 | 5/2012 | Sanford |
| 8,184,064 B2 | 5/2012 | Sanford |
| 8,190,708 B1 | 5/2012 | Short et al. |
| 8,219,059 B2 | 7/2012 | Pera et al. |
| 8,270,767 B2 | 9/2012 | Park |
| 8,306,634 B2 | 11/2012 | Nguyen et al. |
| 8,310,335 B2 | 11/2012 | Sivakkolundhu |
| 8,335,272 B2 | 12/2012 | Roberts |
| 8,350,697 B2 | 1/2013 | Trundle et al. |
| 8,385,869 B2 | 2/2013 | Feenaghty et al. |
| 8,390,684 B2 | 3/2013 | Piran et al. |
| 8,400,997 B2 | 3/2013 | Pera et al. |
| 8,421,700 B2 | 4/2013 | Sanford |
| 8,421,704 B2 | 4/2013 | Sanford |
| 8,429,435 B1 | 4/2013 | Clayton et al. |
| 8,466,847 B2 | 6/2013 | Pera et al. |
| 8,467,759 B2 | 6/2013 | Pera et al. |
| 8,478,450 B2 | 7/2013 | Lu et al. |
| 8,483,188 B2 | 7/2013 | Walton et al. |
| 8,489,065 B2 | 7/2013 | Green et al. |
| 8,493,279 B2 | 7/2013 | Pera et al. |
| 8,498,574 B2 | 7/2013 | Beninghaus et al. |
| 8,604,989 B1 * | 12/2013 | Olsen ............... H01Q 25/008 343/754 |
| 8,619,136 B2 | 12/2013 | Howarter et al. |
| 8,698,684 B2 | 4/2014 | Sanford |
| 8,698,687 B2 | 4/2014 | Pera et al. |
| 8,724,605 B2 | 5/2014 | Zhang et al. |
| 8,736,503 B2 | 5/2014 | Zaghloul et al. |
| 8,761,142 B2 | 6/2014 | Dayanandan et al. |
| 8,836,601 B2 | 9/2014 | Sanford et al. |
| 8,855,730 B2 | 10/2014 | Sanford |
| 8,879,574 B2 | 11/2014 | Dayanandan et al. |
| 8,880,204 B2 | 11/2014 | Frei et al. |
| 8,902,120 B2 | 12/2014 | Sanford |
| 8,977,733 B1 | 3/2015 | Phuong et al. |
| 2001/0046258 A1 | 11/2001 | Wise et al. |
| 2002/0015393 A1 | 2/2002 | Pan et al. |
| 2002/0105475 A1 | 8/2002 | Overton et al. |
| 2002/0113744 A1 | 8/2002 | Strickland |
| 2002/0126062 A1 * | 9/2002 | Matthews ............... H01Q 3/40 343/795 |
| 2002/0138443 A1 | 9/2002 | Schran et al. |
| 2002/0142780 A1 | 10/2002 | Airy et al. |
| 2002/0187760 A1 | 12/2002 | Krishmar Junker et al. |
| 2002/0193945 A1 | 12/2002 | Tan et al. |
| 2003/0032398 A1 | 2/2003 | Harris |
| 2003/0052830 A1 | 3/2003 | Takaya et al. |
| 2003/0098812 A1 | 5/2003 | Ying et al. |
| 2003/0128684 A1 | 7/2003 | Hirsh et al. |
| 2003/0169522 A1 | 9/2003 | Schofield et al. |
| 2003/0189516 A1 | 10/2003 | Olson |
| 2003/0207669 A1 | 11/2003 | Kroeger |
| 2003/0217136 A1 | 11/2003 | Cho et al. |
| 2003/0224801 A1 | 12/2003 | Lovberg et al. |
| 2003/0233660 A1 | 12/2003 | Slemmer et al. |
| 2004/0033817 A1 | 2/2004 | Gorsuch et al. |
| 2004/0133913 A1 | 7/2004 | Benveniste |
| 2004/0151126 A1 | 8/2004 | Matsubara |
| 2004/0209521 A1 | 10/2004 | Cooper et al. |
| 2004/0233107 A1 | 11/2004 | Popov et al. |
| 2005/0048835 A1 | 3/2005 | Clark |
| 2005/0048971 A1 | 3/2005 | Findikli et al. |
| 2005/0057700 A1 | 3/2005 | Lim et al. |
| 2005/0075070 A1 | 4/2005 | Crilly |
| 2005/0136880 A1 | 6/2005 | Subasic et al. |
| 2005/0285803 A1 | 12/2005 | Iacono et al. |
| 2006/0020978 A1 | 1/2006 | Tatsuo |
| 2006/0050677 A1 | 3/2006 | Schafer |
| 2006/0057986 A1 | 3/2006 | Wakui et al. |
| 2006/0079230 A1 | 4/2006 | Russell |
| 2006/0090923 A1 | 5/2006 | Fetterolf et al. |
| 2006/0114839 A1 | 6/2006 | Meier et al. |
| 2006/0116170 A1 | 6/2006 | Brahmbhatt et al. |
| 2006/0128371 A1 | 6/2006 | Dillon et al. |
| 2006/0203789 A1 | 9/2006 | Iacono et al. |
| 2006/0209876 A1 | 9/2006 | Liu et al. |
| 2006/0253205 A1 | 11/2006 | Gardiner |
| 2006/0258315 A1 | 11/2006 | Fein et al. |
| 2006/0268760 A1 | 11/2006 | Fang et al. |
| 2006/0281433 A1 | 12/2006 | Yang et al. |
| 2007/0001918 A1 | 1/2007 | Ebling et al. |
| 2007/0042732 A1 | 2/2007 | Kang et al. |
| 2007/0053362 A1 | 3/2007 | Garg |
| 2007/0057860 A1 | 3/2007 | Jaffer et al. |
| 2007/0075909 A1 | 4/2007 | Flynn et al. |
| 2007/0086424 A1 | 4/2007 | Calcev et al. |
| 2007/0182657 A1 | 8/2007 | Chiang et al. |
| 2007/0188615 A1 | 8/2007 | Beniyama et al. |
| 2007/0205847 A1 | 9/2007 | Kushta et al. |
| 2007/0238419 A1 | 10/2007 | Dubois et al. |
| 2007/0274249 A1 | 11/2007 | Hulbert et al. |
| 2007/0282944 A1 | 12/2007 | Odaka et al. |
| 2007/0285327 A1 | 12/2007 | Paschen et al. |
| 2008/0009967 A1 | 1/2008 | Bruemmer |
| 2008/0036657 A1 | 2/2008 | Oomuro |
| 2008/0048927 A1 | 2/2008 | Hoshi |
| 2008/0051053 A1 | 2/2008 | Fedan |
| 2008/0056125 A1 | 3/2008 | Kneckt et al. |
| 2008/0080553 A1 | 4/2008 | Hasty et al. |
| 2008/0113552 A1 | 5/2008 | Casperson et al. |
| 2008/0125129 A1 | 5/2008 | Lee |
| 2008/0136713 A1 | 6/2008 | Fu et al. |
| 2008/0151801 A1 | 6/2008 | Mizuta |
| 2008/0159239 A1 | 7/2008 | Odlyzko et al. |
| 2008/0162048 A1 | 7/2008 | Yang et al. |
| 2008/0165731 A1 | 7/2008 | Zellner |
| 2008/0165735 A1 | 7/2008 | Chen et al. |
| 2008/0175265 A1 | 7/2008 | Yonge et al. |
| 2008/0192644 A1 | 8/2008 | Utsunomiya et al. |
| 2008/0211929 A1 | 9/2008 | Uchihara |
| 2008/0212612 A1 | 9/2008 | Singh et al. |
| 2008/0219198 A1 | 9/2008 | Honkasalo et al. |
| 2008/0224938 A1 | 9/2008 | Udagawa et al. |

(56) References Cited

U.S. PATENT DOCUMENTS

| | | |
|---|---|---|
| 2008/0231538 A1 | 9/2008 | Ingue et al. |
| 2008/0240107 A1 | 10/2008 | Parekh et al. |
| 2008/0291873 A1 | 11/2008 | Benveniste |
| 2008/0309535 A1 | 12/2008 | Le Guillou |
| 2009/0003374 A1 | 1/2009 | Morrissey et al. |
| 2009/0070477 A1 | 3/2009 | Baum et al. |
| 2009/0096689 A1 | 4/2009 | Krajicek |
| 2009/0157844 A1 | 6/2009 | Fionda et al. |
| 2009/0174622 A1 | 7/2009 | Kanou |
| 2009/0191751 A1 | 7/2009 | Barsigian et al. |
| 2009/0195467 A1 | 8/2009 | Vassilakis et al. |
| 2009/0234499 A1 | 9/2009 | Nielsen et al. |
| 2009/0237314 A1 | 9/2009 | Lalezari |
| 2009/0240791 A1 | 9/2009 | Sakurai et al. |
| 2009/0245227 A1 | 10/2009 | Chin et al. |
| 2009/0252127 A1 | 10/2009 | Rangarajan et al. |
| 2009/0257239 A1 | 10/2009 | Burton |
| 2009/0264148 A1 | 10/2009 | Alfred |
| 2009/0286569 A1 | 11/2009 | Rousu et al. |
| 2009/0307255 A1 | 12/2009 | Park |
| 2009/0310721 A1 | 12/2009 | Redfern et al. |
| 2009/0312044 A1 | 12/2009 | Hottinen |
| 2010/0007561 A1 | 1/2010 | Bucca et al. |
| 2010/0013729 A1 | 1/2010 | Harel et al. |
| 2010/0014502 A1 | 1/2010 | Singh et al. |
| 2010/0023865 A1 | 1/2010 | Fulker et al. |
| 2010/0039979 A1 | 2/2010 | Takase et al. |
| 2010/0053022 A1 | 3/2010 | Mak et al. |
| 2010/0060531 A1 | 3/2010 | Rappaport |
| 2010/0073260 A1 | 3/2010 | Fujita |
| 2010/0097473 A1 | 4/2010 | Park et al. |
| 2010/0115415 A1 | 5/2010 | Hickey |
| 2010/0152897 A1 | 6/2010 | Muller |
| 2010/0177012 A1 | 7/2010 | Marrow |
| 2010/0218004 A1 | 8/2010 | Cousy |
| 2010/0232324 A1 | 9/2010 | Radunovic et al. |
| 2010/0232400 A1 | 9/2010 | Patil et al. |
| 2010/0238846 A1 | 9/2010 | Xu et al. |
| 2010/0271985 A1 | 10/2010 | Gabriel et al. |
| 2010/0280635 A1 | 11/2010 | Cohn et al. |
| 2010/0280637 A1 | 11/2010 | Cohn et al. |
| 2010/0283707 A1 | 11/2010 | Foo |
| 2010/0295736 A1 | 11/2010 | Su |
| 2010/0298957 A1 | 11/2010 | Sanchez Rocha et al. |
| 2010/0306320 A1 | 12/2010 | Leppanen et al. |
| 2011/0013601 A1 | 1/2011 | Cerasa et al. |
| 2011/0053536 A1 | 3/2011 | Friedmann |
| 2011/0058036 A1 | 3/2011 | Metzger et al. |
| 2011/0064033 A1 | 3/2011 | Gong et al. |
| 2011/0090129 A1 | 4/2011 | Weily et al. |
| 2011/0115816 A1 | 5/2011 | Brackney |
| 2011/0150401 A1 | 6/2011 | Furuyama |
| 2011/0185011 A1 | 7/2011 | Shuman et al. |
| 2011/0211559 A1 | 9/2011 | Lim et al. |
| 2011/0258678 A1 | 10/2011 | Cowling et al. |
| 2011/0260934 A1 | 10/2011 | Ilno et al. |
| 2011/0294342 A1 | 12/2011 | DeBock et al. |
| 2012/0019418 A1 | 1/2012 | Wong et al. |
| 2012/0096271 A1 | 4/2012 | Ramarathinam et al. |
| 2012/0127977 A1 | 5/2012 | Copeland et al. |
| 2012/0130513 A1 | 5/2012 | Hao et al. |
| 2012/0158161 A1 | 6/2012 | Cohn et al. |
| 2012/0176608 A1 | 7/2012 | McCown |
| 2012/0210147 A1 | 8/2012 | Musti et al. |
| 2012/0213086 A1 | 8/2012 | Matsuura |
| 2012/0226366 A1 | 9/2012 | Lee et al. |
| 2012/0257862 A1 | 10/2012 | Deel et al. |
| 2012/0276949 A1 | 11/2012 | Dorsey et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0031201 A1 | 1/2013 | Kagan et al. |
| 2013/0035774 A1 | 2/2013 | Warren et al. |
| 2013/0051286 A1 | 2/2013 | Schultz et al. |
| 2013/0072247 A1 | 3/2013 | Park et al. |
| 2013/0077606 A1 | 3/2013 | Wu et al. |
| 2013/0099895 A1* | 4/2013 | Harpak ............... G06K 7/01 340/10.1 |
| 2013/0107869 A1 | 5/2013 | Abraham et al. |
| 2013/0115887 A1 | 5/2013 | Kwon et al. |
| 2013/0129091 A1 | 5/2013 | Kang et al. |
| 2013/0154894 A1 | 6/2013 | Caimi et al. |
| 2013/0201316 A1 | 8/2013 | Binder et al. |
| 2013/0252567 A1 | 9/2013 | Pera et al. |
| 2013/0271337 A1 | 10/2013 | Lee et al. |
| 2013/0272263 A1 | 10/2013 | Pi et al. |
| 2013/0322495 A1 | 12/2013 | Behdad et al. |
| 2013/0333005 A1 | 12/2013 | Kim et al. |
| 2014/0005809 A1 | 1/2014 | Frei et al. |
| 2014/0005810 A1 | 1/2014 | Frei et al. |
| 2014/0005851 A1 | 1/2014 | Frei et al. |
| 2014/0006506 A1 | 1/2014 | Frei et al. |
| 2014/0006552 A1 | 1/2014 | Frei et al. |
| 2014/0006605 A1 | 1/2014 | Frei et al. |
| 2014/0022918 A1 | 1/2014 | Guo et al. |
| 2014/0115354 A1 | 4/2014 | Jabbaz et al. |
| 2014/0118203 A1 | 5/2014 | Sanford |
| 2014/0140228 A1 | 5/2014 | Dayanandan et al. |
| 2014/0140232 A1 | 5/2014 | Dayanandan et al. |
| 2014/0143374 A1 | 5/2014 | Huang et al. |
| 2014/0218248 A1 | 8/2014 | Schulz et al. |
| 2014/0219142 A1 | 8/2014 | Schulz et al. |
| 2014/0220903 A1 | 8/2014 | Schulz et al. |
| 2014/0225782 A1 | 8/2014 | Sanford |
| 2014/0225788 A1 | 8/2014 | Schulz et al. |
| 2014/0225802 A1 | 8/2014 | Huerta et al. |
| 2014/0225803 A1 | 8/2014 | Huerta et al. |
| 2014/0245160 A1 | 8/2014 | Bauer et al. |
| 2014/0258742 A1 | 9/2014 | Chien et al. |
| 2014/0274177 A1 | 9/2014 | Carbajal |
| 2014/0329522 A1 | 11/2014 | Dayanandan et al. |
| 2015/0002357 A1 | 1/2015 | Sanford et al. |
| 2015/0105038 A1 | 4/2015 | Lascari et al. |
| 2015/0201429 A1 | 7/2015 | Chen et al. |
| 2016/0105203 A1 | 4/2016 | Rilling |

FOREIGN PATENT DOCUMENTS

| | | |
|---|---|---|
| EP | 0886336 B1 | 10/2003 |
| GB | 2313957 A | 12/1997 |
| JP | 10-303808 A | 11/1998 |
| JP | 2002299940 A | 10/2002 |
| KR | 20020095556 | 12/2002 |
| KR | 10-2008-0079357 | 9/2008 |
| KR | 10-2013-0141939 | 12/2013 |
| WO | WO98/40990 A1 | 9/1998 |
| WO | WO99/34477 A1 | 7/1999 |
| WO | WO01/31855 A2 | 5/2001 |
| WO | WO01/31886 A2 | 5/2001 |
| WO | WO01/86877 A2 | 11/2001 |
| WO | WO03/023987 A1 | 3/2003 |
| WO | WO2006/044783 A2 | 4/2006 |
| WO | WO2006/084331 A1 | 8/2006 |
| WO | WO2007/069809 A1 | 6/2007 |
| WO | WO2008/042804 A2 | 4/2008 |
| WO | WO2009/146342 A1 | 12/2009 |
| WO | WO2010/049113 A1 | 5/2010 |
| WO | WO2011/005710 A2 | 1/2011 |
| WO | WO2014/191756 A1 | 12/2014 |

OTHER PUBLICATIONS

Sanford, John; U.S. Appl. No. 14/170,507 entitled "Coaxial RF Dual-Polarized Waveguide Filter and Method," filed Jan. 31, 2014.
Hardy et al.; U.S. Appl. No. 14/639,909 entitled "Cloud device identification and authentication," filed Mar. 5, 2015.
Pera et al.; U.S. Appl. No. 14/639,892 entitled "Power receptacle wireless access point devices for networked living and work spaces," filed Mar. 5, 2015.
Pera et al.; U.S. Appl. No. 14/639,905 entitled "Wall-mounted interactive sensing and audio-visual devices for networked living and work spaces," filed Mar. 5, 2015.

(56) References Cited

OTHER PUBLICATIONS

Dayanandan et al.; U.S. Appl. No. 14/659,397 entitled "Methods of operating an access point using a plurality of directional beams," filed Mar. 16, 2015.
Sanford; U.S. Appl. No. 14/659,445 entitled "Compact radio frequency lenses," filed Mar. 16, 2015.
Sanford et al.; U.S. Appl. No. 14/676,600 entitled "Antenna assembly," filed Apr. 1, 2015.
Sanford et al.; U.S. Appl. No. 14/676,641 entitled "Compact radio frequency antenna apparatuses," filed Apr. 1, 2015.
Ashtaiwi et al.; Utilizing IEEE 802.11n to enhance QoS support in wireless mesh networks; (LCN 2008) 33rd IEEE Conf. on Loacal Computer Networks; pp. 689-696; Oct. 14-17, 2008.
Cisco; Cisco NX-OS Software: Business-Critical Cross-Platform Data Center OS (white paper); retrieved from the internet on Jul. 9, 2014 (http://www.cisco.com/c/en/us/products/collateral/switches/nexus-7000-series-switches/white_paper_c11-622511.pdf); 14 pgs.; © 2010.
El-Basioni et al.; Smart home design using wireless sensor network and biometric technologies; International Journal of Application or Innovation in Engineering & Management; 2(3); pp. 413-429; Mar. 2013.
Hajlaoui et al.; A frame aggregation scheduler for QoS-sensitive applications in IEEE802.11n WLANs; (ICCIT) Int. Conf. on Communications and Information Tech.; pp. 221-226; Jun. 26-28, 2012.
Iijima et al.; NETCONF over WebSocket; 82nd IETF Meeting, Taipei, Taiwan; retrived from the internet (http://www.ietf.org/proceedings/82/slides/netconf-1.pdf); 9 pgs.; Nov. 13-18, 2011.
Internet Engineering Task Force (IETF); The WebSocket Protocol; 72 pgs.; Dec. 2011; retrieved from the internet on Mar. 6, 2014 from https://tools.ietf.org/html/rfc6455.
Kishk et al.; Conical dielectric resonator antennas for wide-band applications; IEEE Trans.; vol. AP-50; Issue 4; pp. 469-474; Apr. 2002.
Lewis, F. L.; Chapter 2: Wireless Sensor Networks; in Smart Environments: Technologies, Protocols, and Applications (eds Cook and Das); John Wiley & Sons, Inc.; Hoboken, NJ, USA; Sep. 2004 (pre-publication copy, 18 pgs.).
Liang et al.; Design and implementation of wireless smart-home sensor network based on ZigBee protocol; IEEE; International Conf. on Communications; Circuits and systems, ICCCAS 2008; May 25-27, 2008.
Liu et al.; Design of antenna radome composed of metamaterials for high gain; Antenna and Propogation Society Symposium; IEEE; pp. 19-22; Jul. 9-14, 2006.
Marcincak, Martin; AirGrid M5; 3 pgs.; Jan. 27, 2010; retrieved from the internet: http://www.youtube.com/watch?v=L4Z99Uzz-Bc (this web address was available to applicant(s) at least as of Jan. 27, 2010).
Nakajima et al.; A simple and efficient selective repeat scheme for high throughput WLAN; IEEE802.11n; IEEEVTS Vehicular Tech. Conf. Proc.; pp. 1302-1306; Apr. 22-25, 2007.
Netvox; Intelligent home automation system (Product Catalog); 123 pgs.; retrieved from the internet on Jul. 8, 2014 (http://www.netvox.com.tw/download/Netvox%20Catalog(English%20Version)%2020131129.pdf).
Open Networking Foundation; OpenFlow management and configuration protocol (OF-Config 1.1); retrieved from the internet: (www.opennetworking.org/images/stories/downloads/sdn-resources/onf-specifications/openflow-config/of-config-1.1pdf); 117 pgs.; Jun. 25, 2012.
Rosenberg et al.; Session Traversal Utilities for NAT (STUN); 52 pgs.; Oct. 2008; retrieved from the internet on Mar. 6, 2014 from http://tools.ietf.org/search/rfc5389.
Russell et al.; The Bayeux Specification; 25 pgs.; 2007; retrieved from the internet on Mar. 6, 2014 from http://svn.cometd.org/trunk/bayeux/bayeux.html.
Streakwave Wireless; Ubiquiti Nanobridge m Series Product Overview; 2 pgs.; Jan. 12, 2012; retrieved from the internet: http//www.youtube.com/watch?v=DF_hx6iDIAM (this web address was available to applicant(s) at least as of Jan. 12, 2012).
Ubiquiti Networks; AirGrid M Datasheet; ©2011-2013; pp. 1-10; Jun. 21, 2013; retrieved from the internet (http://dl.ubnt.com/datasheets/airgridm/agmhp_datasheet_web.pdf).
Ubiquiti Networks; Nanobridge M Quick Start Guide; 20 pgs.; Mar. 27, 2012; retrieved from the internet (http://dl.ubnt.com/guides/nanobridge/nanobridge_M_QSG.pdf).
Zhang et al.; Prediction-based link-layer dynamic fragmentation and aggregation for wireless mesh networks; 2008 ISECS int. Colloquium on Computing, Communication, Control, and Management; vol. 2; pp. 582-586; Aug. 3-4, 2008.
Keniuk et al.; U.S. Appl. No. 15/289,487 entitled "Synchronized multiple-radio antenna systems and methods," filed Oct. 10, 2016.

* cited by examiner

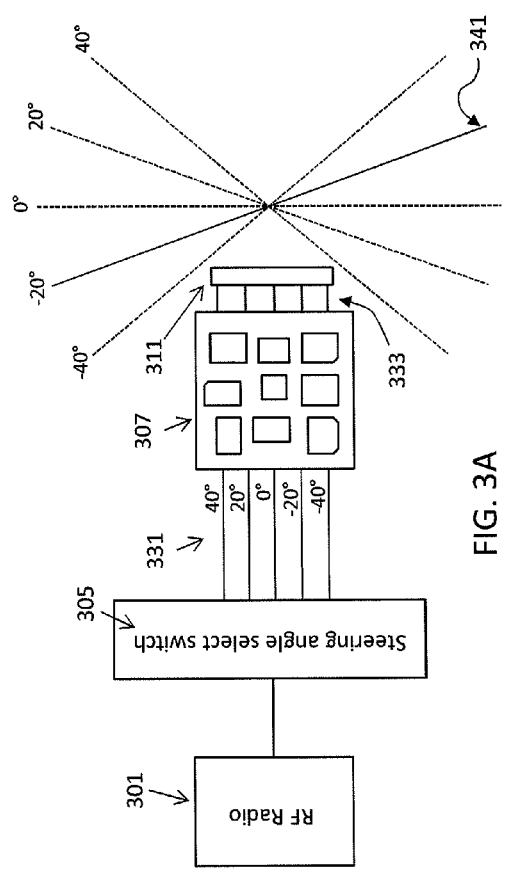
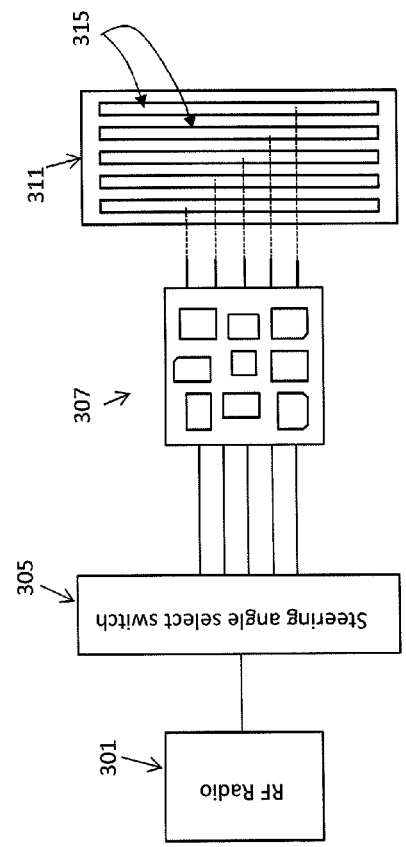
FIG. 3A
FIG. 3B

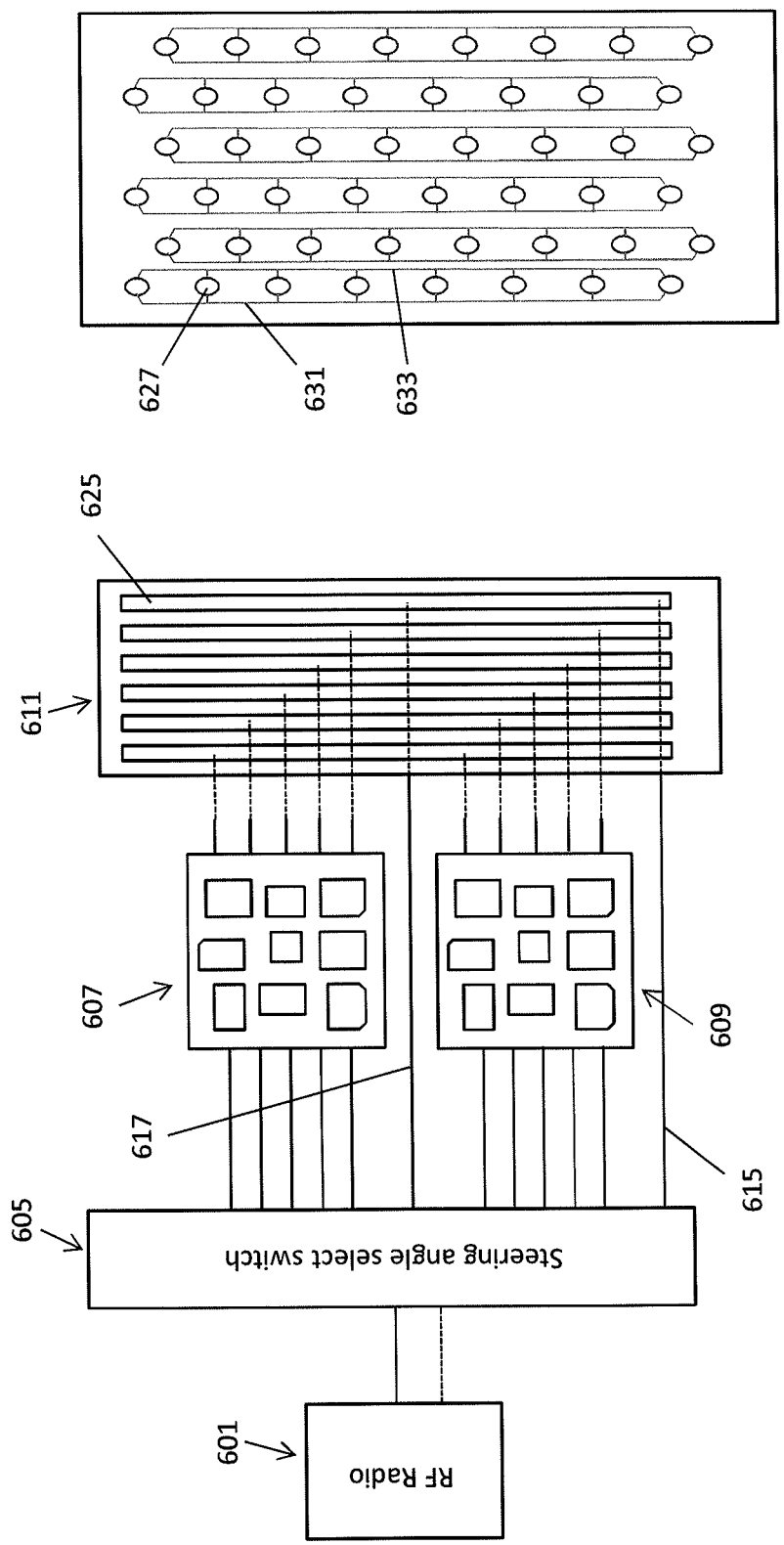

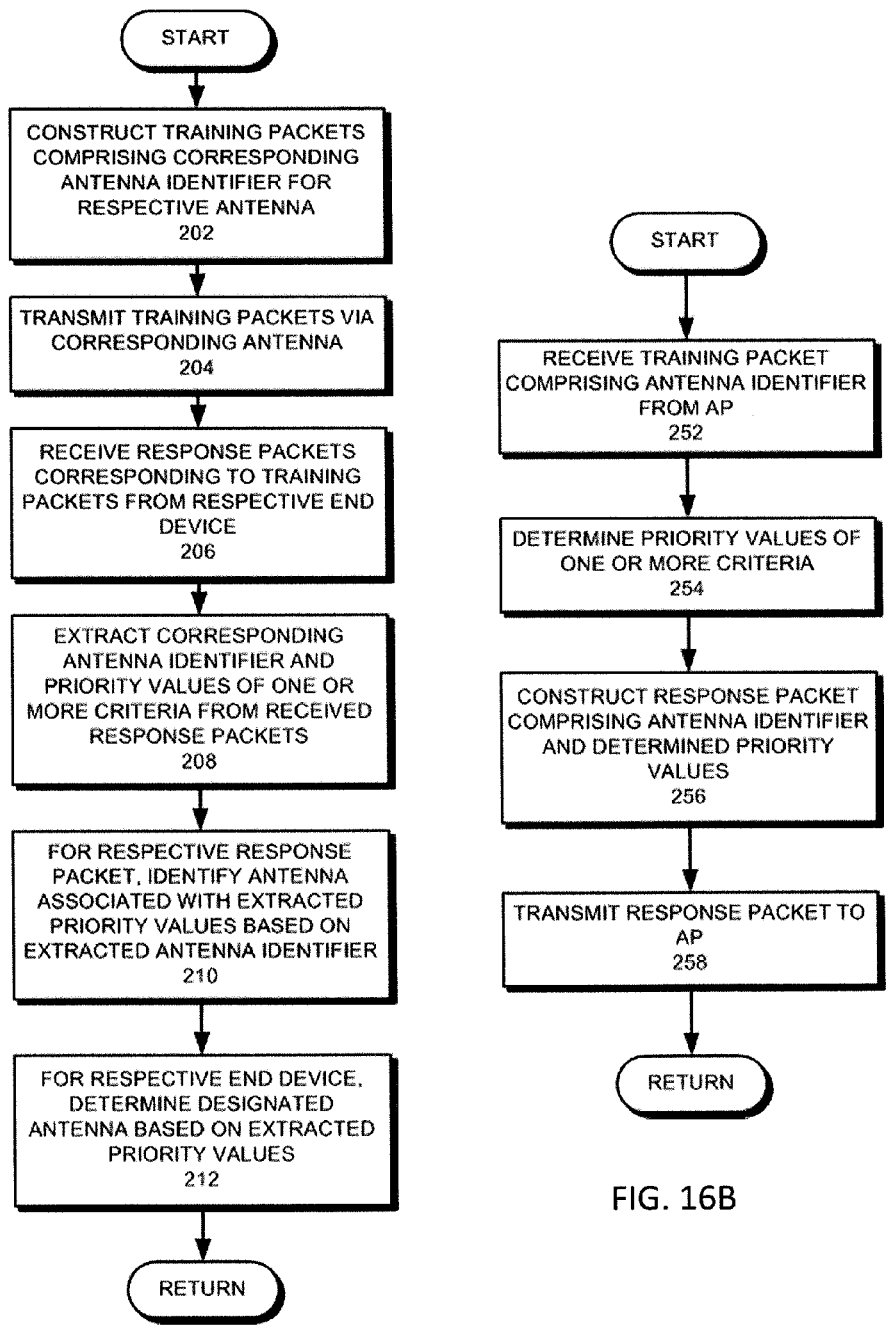

ARRAY ANTENNAS HAVING A PLURALITY OF DIRECTIONAL BEAMS

CROSS REFERENCE TO RELATED APPLICATIONS

This patent application claims priority to U.S. Provisional Patent Application No. 62/019,321, filed Jun. 30, 2014, and titled "PHASED ARRAY ANTENNAS;" and U.S. Provisional Patent Application No. 61/954,244, filed Mar. 17, 2014, and titled "MANAGING AN ARRAY OF ANTENNAE OF AN ACCESS POINT". Each of these patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

In general, described herein are directional antennas including phased array antennas and arrays of multiple antennas, and methods for operating the directional antennas. Also described herein are compact lacunated lenses that may be used for beamforming a phased array antenna and/or for filtering.

BACKGROUND

The phenomenal growth of mobile devices, including smart phones and tablet computers, has resulted in a huge demand in wireless networks. Particularly, Wi-Fi networks, which are based on the Institute of Electrical and Electronics Engineers (IEEE) 802.11 family of standards, are becoming increasingly ubiquitous. In a typical Wi-Fi network, an end-user device (end device) can move freely within the range of an access point's (AP's) radio transceiver while maintaining high-speed data connectivity.

In a large-scale network, such as an enterprise or campus network, provisioning such a Wi-Fi network is non-trivial. One challenge is how to increase the coverage of an AP to cover a large area with a few APs, while providing a user with the desired performance from the Wi-Fi network. An end device can wirelessly communicate with an AP within the coverage are of the AP. An AP's coverage depends on its antenna(e). An AP can have one or more omni-directional and/or directional antennae that provide coverage to the surrounding area of the AP. An omni-directional antenna radiates radio waves (i.e., electromagnetic wave) in all directions, and a directional antenna radiates radio waves to a specific direction.

Typically, a directional antenna radiates with higher power than an omni-directional antenna in the direction associated with the antenna. This allows the antenna to increase its performance on transmission and reception. Because the antenna operates in a specific direction, communication by the directional antenna faces interference only from devices operating in its directional radiation. This facilitates reduced interference than an omni-directional antenna.

Currently, to facilitate a large-scale Wi-Fi coverage and increased performance, an AP can be equipped with a plurality of directional antenna. This approach to construct an AP requires a respective directional antenna to be individually configured and managed. Furthermore, end device in the coverage of a respective antenna usually contend among each other for airtime with the AP (i.e., transmission time between the AP and an end device), leading to a low-utilization of the wireless bandwidth provided by the antenna.

Phased array antennas are one type of directional antenna that may help address these problems. A phased array is an array of antennas in which the relative phases of the respective signals feeding the antennas are varied in such a way that the effective radiation pattern of the array is reinforced in a desired direction and suppressed in undesired directions. Thus, the antenna may be considered "directional" as the beam from the antenna may be directed (formed) in a desired direction. Beamforming may be particularly useful when preserving power, signal strength and operating time in communicating between devices, both from an AP to one or more client devices as well as to/from an AP and another AP, base station, etc.

Existing beamforming lenses for phased array antennas, such as the well-known Rotman lenses, are well described for use in microwave systems, and may be used for RF systems. Unfortunately, such lenses must be relatively large and expensive, particularly in the RF frequency range (e.g., between 2 GHz and 50 GHz). Although various improvements in Rotman lenses have been proposed, such improvements typically reduce the efficacy of the lens, and require somewhat expensive and complicated arrangements of features, including multiple dielectric materials. See, for example, U.S. Pat. No. 8,736,503 to Zaghloul et al., which requires a strip of negative refractive index medium bisecting a positive refractive index medium. Thus, a compact and efficient electronic lens that is inexpensive to operate and manufacture would be very useful.

An antenna array may be a group of multiple active antennas coupled to a common source or load to produce a directive radiation pattern. The spatial relationship of the individual antennas may also contribute to the directivity of the antenna array. Use of the term "active antennas" may be used to describe elements whose energy output is modified due to the presence of a source of energy in the element (other than the mere signal energy which passes through the circuit) or an element in which the energy output from a source of energy is controlled by the signal input. One common application of this is with a standard multiband television antenna, which has multiple elements coupled together.

Described herein are phased array antennas that enhance base station gain by focusing the signal transmission and reception in a narrower beam that, in turn, reduces transmission interference and increases range. For example, the array antennas described herein may be used in base station applications to solve key limitations of traditional wide and narrow beam technologies. In wide beam communication, a signal is transmitted and received over a wide angle to overcome physical obstructions and uneven terrain. Unfortunately, this form of transmission can be inefficient and noisy. Narrow beam communication requires many antennas and frequency channels to provide the broad coverage associated with wide beam communication. The phased array antennas described herein may combine narrow beam technology and time based multiplexing of transmissions and receptions to overcome both challenges.

The phased array devices described herein may provide base station design that delivers high antenna gain and broad coverage by using a combination of narrow beams in various directions. This design may allow frequencies to be re-used by having beam transmissions and receptions in different directions take place at different times. This increases the efficiency of spectrum usage by allowing re-use of frequency bands, which enables the use of more radios on the same tower and the deployment of our products in environments where limited frequency bands are available in the unlicensed spectrum.

SUMMARY OF THE DISCLOSURE

Described herein are multi-directional antenna apparatuses, which may include phased array antennas and/or arrays of multiple antennas, and methods for operating these directional antennas. As used herein, a directional antenna apparatus may refer to a device of system of antennas that can direct multiple beams forming multiple antenna beam patterns (antenna patterns) for use in transmitting and/or receiving data. In particular, described herein are apparatuses configured to operate as an access point (AP) for communicating with one or more station devices by assigning a particular directional beam to each access point, and communicating with each station device using the assigned directional beam at least part of the time. The apparatus may be assign directional beams to station devices a predetermined infrequent times (e.g., less than once per minute, once per five minutes, once per 10 minutes, once per 20 minutes, once per 30 minutes, etc.) using an efficient assignment protocol in which directional training packets are transmitted from each of a plurality of directional beams at the predetermined times, and one or more response packets (returned from station devices in response to the training packets) are received. The apparatus may be configured to interpret either or both the contents of the response packets (which can reference a particular directional beam and may include a priority value indicating the goodness of that directional beam) and/or the strength of the received response packet to designate a particular directional beam to the station device.

These apparatuses and methods may be used with any apparatus capable of selectively operating a plurality of directional beams, including apparatuses having a plurality of directional antennas and/or phased array antennas. In addition to apparatuses and methods for controlling the operation of an access point having a plurality of directional beams, also described herein are phased array antennas that may be operated in this manner, as well as systems, devices and methods (including components) that may be use used as part of a phased array antenna particularly well suited for operating as an access point. For example, described herein are compact radio frequency ("RF") lenses that may be used for beamforming phased array antennas or for operating as a compact RF filter, as well as systems and methods for adapting a USB connection to identify the device being connected via the USB connection.

For example, described herein are antennas, antenna systems, and method of making and using them. Any of the antennas described herein may be phased array antennas. The phased array antennas may include a compact beamforming lens having a plurality of openings through the body of the lens. These lenses may be referred to as a lacunated lens. In general, a lacunated lens may have a body having at least two parallel plates separated by a dielectric material, and may have multiple openings, gaps, holes, etc. (lacuna) at least partially through the body of the lens. The lens may be a microstrip. The lens typically includes multiple beam ports for steering the beam and multiple antenna ports. Signals (e.g., RF electromagnetic signals) applied to a beam port will be emitted from each of the antenna ports at a predetermined time delay for each antenna port that depends on the identity of the beam port, steering the beam of the antenna. Thus, each beam port has an associated (e.g. predetermined) beam steering angle (e.g., any angle between −90° and 90°, including but not limited to: −50°, −45°, −40°, −35°, −30°, −25°, −20°, −15°, −10°, −5°, 0°, 5°, 10°, 15°, 20°, 25°, 30°, 35°, 40°, 45°, 50°) The antenna ports are typically on a side of the lens opposite from the beam ports.

A lacunated lens may be a compact electrical lens device for beamforming an array of antenna elements. For example, a lens device may include: a lens body comprising parallel plates separated by a dielectric, the lens body having an outer perimeter and an inner region within the outer perimeter; a plurality of beam ports on the outer perimeter of the lens body, wherein each beam port corresponds to a predetermined steering angle; a plurality of antenna ports on the outer perimeter of the lens body; and a plurality of openings in the inner region of the lens body within at least one plate of the parallel plates of the lens body, wherein the openings are arranged through the lens body so that an electromagnetic signal entering the lens body from any one of the beam ports will exit from each of the antenna ports at a time delay corresponding to the predetermined steering angle of the beam port from which the electromagnetic signal entered the lens body.

A lacunated lens may also be a compact electronic lens that may be used for beamforming an array of antenna elements, or it may also be configured as an amplifier (similar to a butler matrix amplifier) that includes: a lens body comprising parallel plates separated by a dielectric, the lens body having an outer perimeter and an inner region within the outer perimeter; a plurality of input ports on the outer perimeter of the lens body, wherein each input port corresponds to a predetermined steering angle; a plurality of output ports on the outer perimeter of the lens body; and a plurality of openings in the inner region of the lens body within at least one plate of the parallel plates of the lens body, wherein the openings are arranged through the lens body so that an electromagnetic signal entering the lens body from any one of the input ports will exit from each of the output ports at a time delay corresponding to the predetermined steering angle of the input port from which the electromagnetic signal entered the lens body. The input ports and output ports may also be referred to (particularly when configured for beamforming) as beam ports and antenna ports, respectively.

For example, a compact RF electronic lens device may include: a lens body, the lens body comprising a ground plate, a dielectric substrate on top of the ground plate, and a conductor plate on top of the dielectric substrate; a plurality of input ports on an outer perimeter of the lens body, wherein each input port corresponds to a predetermined steering angle; a plurality of output ports on the outer perimeter of the lens body; and a plurality of openings within the lens body through the conductor plate, wherein the openings are configured so that an electromagnetic signal entering the lens body from any one of the input ports will exit from each of the output ports at a time delay corresponding to the predetermined steering angle of the input port from which the electromagnetic signal entered the lens body.

A compact electronic RF lens device may include: a lens body having an upper surface, a thickness, and a lower surface parallel to the upper surface, the lens body having an outer perimeter and an inner region within the outer perimeter; a plurality of input ports on the outer perimeter of the lens body, wherein each input port corresponds to a predetermined steering angle; a plurality of output ports on the outer perimeter of the lens body; and a plurality of openings into the lens body within the inner region through the upper surface, wherein the openings are configured so that an electromagnetic signal entering the lens body from any one of the input ports passes through the lens body along multiple paths around the openings and exits from each of the output ports at a time delay that is characteristic of the predetermined steering angle of the input port from which the electromagnetic signal entered the lens body.

The compact RF lens device may be configured as a lacunated lens for beamforming an array of antenna elements, and may include: a lens body having an upper surface, a thickness, and a lower surface parallel to the upper surface, the lens body having an outer perimeter and an inner region within the outer perimeter; a plurality of beam ports on the outer perimeter of the lens body, wherein each beam port corresponds to a predetermined steering angle; a plurality of antenna ports on the outer perimeter of the lens body; and a plurality of openings into the lens body within the inner region through the upper surface, wherein the openings are configured so that an electromagnetic signal entering the lens body from any one of the beam ports passes through the lens body along multiple paths around the openings and exits from each of the antenna ports at a time delay that is characteristic of the predetermined steering angle of the beam port from which the electromagnetic signal entered the lens body.

In general, an electromagnetic signal entering the lens body from any one of the input ports (e.g., beam ports) passes through the lens body along multiple paths around the openings and exits from each of the output ports (e.g., antenna ports) at a time delay that is characteristic of the predetermined steering angle of the beam port from which the electromagnetic signal entered the lens body.

As mentioned, the lens may include a microstrip (e.g., the lens body may be a microstrip). In general, the lens body may have a square shape. The lens body may be generally square (e.g., it may have projections or "bump out" regions), so that the overall shape is square. In general, the lens body may be small, particularly for the frequency of radio waves processed by the lens. For example, the lens may beamform RF signals between 2 GHz and 50 GHz (e.g., between 2 GHz and 30 GHz, between 2 GHz and 20 GHz, between 3 GHz and 6 GHz, between 10 GHz and 21 GHz, etc.), and the lens body may have a maximum diameter of less than about 10 cm, less than about 9 cm, less than about 8 cm, less than about 7 cm, etc. (e.g., the dimensions of the lens body are less than about 8 cm×8 cm, 7 cm×7 cm, 9 cm×9 cm, etc.). For example, the lens body may be less than about 8 cm×8 cm and the plurality of openings may be configured so that an electromagnetic signal between about 2 GHz and about 30 GHz entering the lens body from any one of the input ports passes through the lens body along multiple paths around the openings and exits from each of the output ports at a time delay that is characteristic of the predetermined steering angle of the input port from which the electromagnetic signal entered the lens body.

The input ports may generally be arranged on the outer perimeter of the lens body opposite from the output ports. The plurality of input ports may comprise 3 input ports or more. For example, the lens may have five input ports and each input port in the set of input ports may have a dedicated steering angle (e.g., −40°, −20°, 0, 20, 40; −35, −17, 0, 17, 35; etc.). The input ports may each have a predetermined steering angle that is at or between about −90° and 90°, e.g., at or between −45° and about 45°, e.g., at or between −35° and 35°, etc.).

The plurality of output ports may generally comprise 3 or more individual output ports (e.g., 4 output ports, 5 output ports, 6 output ports, 7 output ports, 8 output ports, 9 output ports, 10 output ports, 11 output ports, 12 output ports, etc.).

In general, the lens body includes parallel surfaces (planes) or plates. In the lacunated lens at least one of the surfaces/planes forming the body of the lens has multiple holes, opening, gaps, etc. (lacuna) therethrough. These opening may pass completely through the lens, or may extend through just one of the planes and the dielectric. The openings within the lens body may be of any appropriate size (e.g., between about 2% and 30% of the surface area of the plane of the lens body. In total, the openings through the lens body may take up more than 30%, 40%, 50%, 60%, 70%, 80% (or more) of the surface area (e.g., of an upper surface) of the lens body. As mentioned, the openings in the lens body may extend through the dielectric between the plates, for example, the openings in the lens body may extend from the conductor plate and through the dielectric. The openings in the lens body may extend through the upper surface and through the dielectric between the upper and lower surfaces.

In general, described herein are methods of operating a compact electronic lens having a lens body, wherein the lens body has an upper surface forming a plane, a lower surface parallel to the upper surface, a dielectric between the upper and lower surface, and a plurality of openings through the upper surface, the method comprising: applying a first electromagnetic signal to a first input port of the lens body, wherein the first input port is associated with a first predetermined steering angle; passing the first electromagnetic signal from the first input port through the lens body along multiple paths around the openings so that the first electromagnetic signal exits each of a plurality of output ports at a time delay for each output port that is characteristic of the first predetermined steering angle; applying a second electromagnetic signal to a second input port of the lens body, wherein the second input port is associated with a second predetermined steering angle; and passing the second electromagnetic signal from the second input port through the lens body along multiple paths around the openings so that the second electromagnetic signal exits each of a plurality of output ports at a time delay for each output port that is characteristic of the second predetermined steering angle.

Also described herein are methods of beamforming an array of antenna elements using a compact electronic lens (e.g., a lacunated lens). The compact electronic lens may have a lens body, wherein the lens body has an upper surface forming a plane, a lower surface parallel to the upper surface, a dielectric between the upper and lower surface, and a plurality of openings through the upper surface. For example, a method of beamforming with a lacunated lens may include: applying a first electromagnetic signal between about 2 GHz and about 30 GHz to a first input port of the lens body, wherein the first input port has a first predetermined steering angle; passing the first electromagnetic signal from the first input port through the lens body along multiple paths around the openings so that the first electromagnetic signal exits each of a plurality of output ports at a time delay for each output port that is characteristic of the first predetermined steering angle; applying a second electromagnetic signal to a second input port of the lens body, wherein the second input port has a second predetermined steering angle; and passing the second electromagnetic signal from the second input port through the lens body along multiple paths around the openings so that the second electromagnetic signal exits each of a plurality of output ports at a time delay for each output port that is characteristic of the second predetermined steering angle.

The first predetermined steering angle and the second predetermined steering angle are typically different and may be between any of the ranges described herein (e.g., −90 to 90°, −60° to 60°, −45° to 45°, −35 to 35°, −30 to 30°, etc.).

The method of beamforming may also include electrically switching from the first input port to the second input port. In general, any appropriate electrical switching technique may be used.

The method may also include emitting the signal from each of a plurality of antenna elements, wherein each antenna element is coupled to one of the output ports.

Also described herein are phase antenna devices that include any of the lenses (e.g., the lacunated lenses) described herein. For example, a phased array antenna device having a compact electronic lens for beamforming may include: a radio frequency (RF) input; an electronic lens having a lens body, wherein the lens body has an upper surface forming a plane, a lower surface parallel to the upper surface, a dielectric between the upper and lower surface, a plurality of openings through the upper surface of the lens body, a plurality of input ports on an outer perimeter of the lens body, wherein each input port corresponds to a predetermined steering angle, and a plurality of output ports on the outer perimeter of the lens body; a switch configured switch the RF input between the input ports; and a plurality of antenna elements, wherein each antenna element is coupled to one of the output ports.

Also described herein are phased array antenna devices having a compact electronic lens (e.g., a lacunated lens) for beamforming. A phased array antenna may include: a radio frequency (RF) input configured to connect to an RF transceiver; an electronic lens having a lens body, wherein the lens body has an upper surface forming a plane, a lower surface parallel to the upper surface, a dielectric between the upper and lower surface, a plurality of openings through the upper surface of the lens body, wherein the openings are configured so that an electromagnetic signal entering the lens body from any one of the input ports passes through the lens body along multiple paths around the openings and exits from each of the output ports at a time delay that is characteristic of the predetermined steering angle of the input port from which the electromagnetic signal entered the lens body, a plurality of input ports on an outer perimeter of the lens body, wherein each input port corresponds to a predetermined steering angle, and a plurality of output ports on the outer perimeter of the lens body; a steering control configured to control a switch to switch the RF input between the input ports to steer the device; and a plurality of antenna elements, wherein each antenna element is coupled to an output port from the plurality of output ports.

In general, a phased array antenna device having a compact electronic lens for beamforming may include: a radio frequency (RF) input having a vertical RF line and a horizontal RF line; a vertical electronic lens having a vertical lens body, wherein the vertical lens body has an upper surface forming a plane, a lower surface parallel to the upper surface, a dielectric between the upper and lower surface, a plurality of openings through the upper surface of the vertical lens body, a plurality of input ports on an outer perimeter of the vertical lens body, wherein each input port corresponds to a predetermined steering angle, and a plurality of output ports on the outer perimeter of the vertical lens body. The device may also include a horizontal electronic lens having a horizontal lens body, wherein the horizontal lens body has an upper surface forming a plane, a lower surface parallel to the upper surface, a dielectric between the upper and lower surface, a plurality of openings through the upper surface of the horizontal lens body, a plurality of input ports on an outer perimeter of the horizontal lens body, wherein each input port corresponds to a predetermined steering angle, a plurality of output ports on the outer perimeter of the horizontal lens body; a switch configured switch the vertical RF line between the input ports of the vertical lens body and to switch the horizontal RF line between the input ports of the horizontal lens body; and a plurality of antenna elements, wherein each antenna element is coupled to an output port from the plurality of output ports on the horizontal lens body and an output port from the plurality of output ports on the vertical lens body.

In general, any of the compact lenses described herein may be relatively small, particularly compared to prior art lenses operating on similar radio frequencies. For example, an RF input may be configured to transmit an RF signal between about 2 GHz and about 50 GHz (e.g., between 2 GHz and 30 GHz), and the upper surface may have a surface area less than about 8 cm×8 cm (or a maximum dimension of less than about 12 cm, e.g., less than 11 cm, less than 10 cm, less than 9 cm, less than 8 cm, etc.).

Any of the phased array antennas described herein may include an integrated transceiver, or may be configured to mate with a transceiver (e.g., a more general-purpose transceiver) using the RF input device. The transceiver may be an RF radio.

As described above, any of the phased array antennas described herein may include multiple (e.g., lacunated) lenses. For example, any of these devices may include a second electronic lens having a second lens body, wherein the second lens body has a second upper surface forming a plane, a second lower surface parallel to the second upper surface, a second dielectric between the second upper and second lower surface, a second plurality of openings through the second upper surface of the second lens body, a plurality of input ports on an outer perimeter of the second lens body, wherein each input port corresponds to a predetermined steering angle, and a second plurality of output ports on the outer perimeter of the second lens body. Thus, a phased array antenna may have a horizontal and a vertical polarization path for emitting/receiving RF signals on the antenna, and each path may have a dedicated lens.

The antenna radiating elements (antenna elements) may be of any desirable dimension and shape, as appropriate for the frequencies to be transmitted and/or received. For example, the antenna elements may be radiating disks. In some variations the antenna elements including multiple (discrete) radiating elements that are electrically connected. For example, each of the antenna elements may comprise a line of electrically connected radiating disks.

The one or more lenses included as part of the phased array antennas described herein may include any of the features described for the lenses, such a lens body comprising a microstrip, a lens body having a square (or roughly square) shape, input ports arranged on the outer perimeter of the lens body opposite from the output ports, etc.

In addition, any of the phased array antennas described herein may include one or more omnidirectional antenna elements. For example, a phased array antenna may also include one or more omnidirectional antenna elements connected to the RF input that bypass the vertical lens and the horizontal lens. An omnidirectional may broadcast/receive in an un-steered manner (e.g., over a broad directional range) and/or may broadcast/receive a fixed directional range. For example, an antenna may include an omnidirectional antenna element that is connected to the vertical RF line and the horizontal RF line and bypasses the vertical lens and the horizontal lens.

Also described herein are techniques, including methods and apparatuses, for connecting a radio device (e.g., transceiver) to an antenna, and particularly to a phased array antenna, using a pair of USB connectors, where the ground portion of the connectors is used to identify to the radio device the type of antenna to which the radio device is connected. In some variations this connection may also be used to help control (e.g., steer) the antenna. Identifying and/or controlling the type of antenna connected to an RF radio may be particularly relevant in variations in which the radio (transceiver) is configured/adapted to be connected to a variety of different antenna. For example, a radio may have a self-contained body with one or more (e.g., a horizontal RF connector (input/output) and a vertical RF connector (input/output) as well as a USB connector. The radio and/or antenna may also transmit power via the USB connector(s), including Power over Ethernet (POE).

For example, a method of connecting a radio device to an antenna may include: connecting a (e.g., a self-contained) radio device having a first USB connector to an antenna having a second USB connector; and identifying the antenna based on a voltage of the ground pin on the second USB connector.

A method of connecting and configuring a radio device to work with an antenna may include: connecting the radio device having a first USB connector to an antenna having a second USB connector; identifying the antenna based on a voltage of the ground pin on the second USB connector; and configuring the radio device based on the identity of the antenna to transmit and receive data using the antenna.

In any of these variations, the method may also include transmitting steering information from the radio to a beamforming lens of the antenna when the antenna is identified as a phased array antenna. The method may also include configuring the radio device based on the identity of the antenna to transmit and receive data using the antenna. Configuring the radio device may include sending control information to the antenna for steering, timing or otherwise processing signals to/from the antenna. Configuring may also include configuring the output/input of the radio device when communicating with the antenna. For example, configuring may comprises transmitting control information from the radio device to the antenna. Configuring may include transmitting steering information from the radio device to a beamforming lens of the antenna. Thus, identifying the type of antenna my include identifying (from a predetermined set of information, e.g., look-up table, based on as sensed parameter) characteristics of the antenna such as the number of input ports and output ports, etc.

The step of connecting may include connecting one or more radio frequency (RF) connectors between the radio device and the antenna. For example, as mentioned, the radio may include a horizontal and vertical RF connector, each of which may be connected to the antenna.

In general, connecting may include connecting the USB port of the radio device to the USB port of the antenna. Further, identifying may include using a detection circuit to compare the voltage of the ground pin on the second USB connector to a predetermined voltage. The detection circuit may be part of the radio device or may be connectable to the radio device. The detection circuit may also be referred to as an identification circuit, which identifies the type of antenna to which a radio is connected.

In general, identifying the antenna may include determining a digital identifier of the antenna based on the voltage of the ground pin on the second USB connector. Identifying may include comparing the voltage of a ground pin on the second USB connector to a predetermined voltage.

The method of connecting and/or identifying an antenna to a radio device may also include biasing the ground pin on the second USB connector to a predetermine voltage (e.g., the ground pin on the antenna USB connector).

Also described herein are apparatuses (e.g., devices and systems, including radio/transceiver devices) that are adapted to detect (and/or control) the type of antenna to which the radio device is connected. For example, described herein are radio devices that may be used with a variety of antennas and are configured to identify and/or control the type of antenna to which they are connected through the ground pin(s) of a USB connector. Thus, a radio device may include: a receiver configured to receive RF signals; a transmitter configured to transmit RF signals; at least one RF output/input line; a USB port; and a detection circuit connected to a ground pin of the USB port and configured to compare the voltage of the USB port to a predetermined value and output an indicator of the identity of a type of antenna when the USB port of the radio device is connected to the USB port of the antenna.

The detection circuit may include a plurality of comparators configured to compare the voltage of the ground pin of the USB port to a predetermined value. The radio device of claim 13, wherein the detection circuit is configured to do a resistive measurement to generate a digital signal indicative of the identity of the type of antenna.

As mentioned above, any of the radio devices described herein may be configured to transmit steering information when the detection circuit detects a phased array antenna.

In general, described herein are methods of operating an antenna apparatus (including, but not limited to the phased array antennas described herein) capable of specifying a plurality of different directional beams as an access point. Thus, for example, any of the antennas described herein may be used as part of an access point, either alone, or in combination with other antennas. Thus, also described herein are methods and systems for operating an access point comprising an array of antennas.

For example, as mentioned above, described herein are method of operating an access point in a wireless network, wherein the access point is configured to operate a plurality of directional beams, the method comprising: transmitting a training packet for each of the plurality of directional beams of the access point, wherein each training packet includes an identifier specific to the directional beam transmitting the training packet; receiving at the access point, in response to the training packet, a response packet from a station device, wherein the response packet includes the identifier specific to the directional beam transmitting the training packet and a priority value associated with one or more criteria for directional beam selection; designating a directional beam from the plurality of directional beams for communicating with the station device based on the priority value received in the response packet; and transmitting data between the access point and the station device using the directional beam designated for the station device to transmit data to the station device.

A method of operating an access point in a wireless network (wherein the access point is configured to operate a plurality of directional beams) may include: assigning one of the directional beams from the plurality of directional beams to a station device, by: transmitting a plurality of training packets, wherein each training packet identifies a directional beam and is transmitted using the identified directional beam; receiving a response packet from a station device, wherein the response packet identifies one of the directional beams of the plurality of directional beams and includes a priority value associated with one of the training packets; and designating the station device a directional beam based on the priority value; and transmitting data between the access point and the station device using the directional beam designated for the station device to transmit data to the station device.

More than one station devices may be assigned directional beams by this method. For example, any of these methods may include assigning a directional beam from the plurality of directional beams to a second station device. Directional beams may be assigned from the plurality of directional beams to a second station device, and transmitting data between the access point and the second station device may use the directional beam assigned to the second station device.

The method of assigning directional beams to specific station devices (and apparatuses configured to do this) may be particularly configured so that the steps of assigning (e.g., transmitting the training packets, receiving response packets and assigning or re-assigning directional beams) is done only infrequency, e.g., at predetermined intervals that are less than once per half-minute, once per minute, once per second, once per 2 sec, once per 5 sec, once per 10 sec, once per 15 sec, once per 30 sec, once per 1 min, once per 2 min, once per 3 min, once per 5 min, once per 10 min, once per 15 min, once per 20 min, once per 30 min, once per hour, etc.). For example, transmitting the training packet for each of the plurality of directional beams may mean transmitting the training packet less frequently than once every second, once every five seconds, etc.

The methods and apparatuses described herein may also be configured so that the data rate between the access point (e.g., phased array antenna) and any of the station device communicating with the access point is selectable and may be matched to the use of a particular directional beam and/or particular timeslots dedicated to station devices and un-dedicated time slots. For example, any of the methods or apparatuses may be configured to transmit signals from the station device to the access point at a first rate using the directional beam designated for the station device during a first time period assigned to the station device and transmit signals from the station device to the access point at a second, lower rate without using the directional beam designated for the station device during a second time period.

Any of the apparatuses and methods described herein may be configured to operate with a different directional beam for transmission to the station device and receiving data from the station device. For example, described herein are methods and devices in which transmitting data from the access point to the station device may include using a first designated directional beam (for that particular station device) and receiving data at the access point from that station device may use a second direction beam that is different from the designated directional beam. Thus, in any of these methods and apparatuses, separate receive directional beams and transmit directional beams may be assigned (e.g., by the access point). For example, the apparatus or method may be configured to include designating a receive directional beam from the plurality of directional beams for receiving signals from the station device.

As mentioned, any of the methods of operating the access point described herein my be performed using a phased array antenna and/or using a plurality of antennas including directional antennas. Thus, for example, transmitting data may generally comprise transmitting data from one of a plurality of directional antennas forming the access point, wherein each directional antenna is associated with a directional beam from the plurality of directional beams. In some variations, transmitting data comprises transmitting data from a phased array antenna forming the access point, wherein the phased array antenna phased array antenna comprises phase angles associated with directional beams from the plurality of directional beams.

The phased array antenna may be beamformed in any way, including using any type of phase shifter, or array of phase shifter, and/or it may use a lens (e.g., compact lacunated lens as described herein) Transmitting data may include transmitting data from a phased array antenna at different phase angles wherein the phased array antenna includes a plurality of phase shifters configured to select the directional beams of the access point.

In general, the methods and apparatuses described herein may be configured to construct the training packets and receive response packets so that directional beams may be assigned to particular station devices. For example, the method (or an apparatus configured to perform the method) may include constructing the training packets in a processor of the access point. A training packet may be constructed for each of a plurality of directional beams (e.g., beam angles), and the training packet specific to a particular directional beam may encode a reference to that directional beam; it may then be transmitted at that directional beam by the access point. A reference to the directional beam may include a reference to the particular antenna (e.g., when dedicated directional antennas are used), phase angle (e.g., phrase array antennas), or any other reference indicating the directional beam from the access point.

The response packet typically includes a reference to the directional beam and the station device transmitting the response packet, as well as a specific priority value related to the goodness of the signal received by the station device. For example, the priority value may include an indicator of one or more of: signal strength; packet error rate; or a modulation scheme. In some variations the response value may be the carrier to interference noise ratio (CINR) and/or error vector magnitude (EVM).

As mentioned, in any of these variations, the apparatus may be configured to operate using TDMA, and to designate timeslots for upstream and/or downstream transmission/reception between the access point and the various station devices. In particular, these apparatuses may operate by shifting the data rate (and the directional beam) so that at timeslots dedicated for communication between the access point and a particular station device, a first mode (e.g., a higher rate transmission mode) may be used along with the assigned directional beam for that station, while at timeslots that are not specific to a particular station device (e.g., unassigned time slots, general time slots, overflow time slots, etc.) a different, e.g., lower rate mode, may be used, without the specific directional beam for that station.

For example, a method of operating an access point in a wireless network, wherein the access point is configured to operate a plurality of directional beams, may include: assigning each of a plurality of station devices one of the directional beams from the plurality of directional beams; allocating upstream timeslots to each of the plurality of station device and allocating general upstream timeslots that are not associated with a single station device; receiving data at a first rate at the access device from a station device of the plurality of station devices during an upstream timeslot allocated to the station device and using the directional beam assigned for the station device; receiving data at a second data rate at the access device from a station device of the plurality of station devices during a second upstream timeslot that is a general upstream timeslot.

For example, the first rate may have a different modulation scheme than the second rate; e.g., the first rate may be higher than the second rate. Receiving data at the second rate may include using a directional beam that is different from the directional beam assigned to the station device. In some variations different upstream directional beams and downstream directional beams may be used for all or some of the stations devices. Any of these methods may also include allocating downstream timeslots to each of the plurality of stations devices and transmitting data (e.g., at the first rate) to a station device of the plurality of stations during a downstream timeslot allocated to the station device and using the directional beam assigned for the station device.

Also described herein are methods of operating an access point in a wireless network, wherein the access point is configured to operate a plurality of directional beams, the method comprising: assigning each of a plurality of station devices one of the directional beams from the plurality of directional beams as a downstream directional beam; assigning each of a plurality of station devices one of the directional beams from the plurality of directional beams as an upstream directional beam; transmitting data from the access point to a station device of the plurality of station devices using the downstream directional beam assigned to the station device; and receiving data from a station device of the plurality of station using the upstream directional beam assigned for the station device.

As mentioned, described herein are systems for operating an access point, which comprises an array of antennae, in a wireless network. During operation, the access point sends a training packet via an antenna of the array of antennae. This training packet includes an identifier of the antenna. The access point then receives a response packet corresponding to the training packet from an end device. This response packet includes the identifier of the antenna and priority values associated with one or more criteria for antenna selection from the array of antennae. Based on the priority values, the access point determines the antenna to be the designated antenna for communicating with the end device.

At least one of the antennae in the array of antennae may be a broadcast antenna. The access point may identify a second end device for which the access point has not designated an antenna and uses the broadcast antenna for communicating with the second end device. At least one of the antennae in the array of antennae may be a virtual broadcast antenna, which is logically coupled with a respective antenna of the array of antennae. The training packet may be a multi-destination packet.

In response to selecting the antenna to be the designated antenna, the access point may transmit a packet to the end device via the antenna during a dedicated downstream timeslot allocated for the end device.

A criterion in the criteria for antenna selection may correspond to: (1) signal strength of the end device, (2) packet error rate between the access point and the end device, or (3) a modulation scheme.

Also described are systems for operating an access point, which comprises an array of antennae, in a wireless network. During operation, the access point may send a training packet via an antenna of the array of antennae. This training packet can include an identifier of the antenna. The access point then receives a wireless acknowledgement packet corresponding to the training packet from an end device and determines priority values associated with one or more criteria for antenna selection from the array of antennae based on the wireless acknowledgement packet. Based on the determined priority values, the access point determines the antenna to be the designated antenna for communicating with the end device. The access point and the end device may contend for transmission time between the access point and the end device. The contention between the access point and the end device content may be based on Institute of Electrical and Electronics Engineers (IEEE) 802.11 family of standards. The training packet may be a uni-destination packet for the end device.

A criterion in the criteria for antenna selection may correspond to: (1) signal strength of the end device, (2) packet error rate between the access point and the end device, or (3) a modulation scheme.

Also described are antenna systems that include an array of antenna elements. A first subset of the antenna elements may be adapted to transmit an omni-directional signal. A second subset of the antenna elements may be adapted to transmit a directional signal with a horizontal polarization. A third subset of the antenna elements may be adapted to transmit a directional signal with a vertical polarization. The antenna system may also include an antenna control module. During operation, the antenna control module may send a training packet via the first subset of antenna elements, wherein the training packet includes an identifier of the antenna system. The antenna control module then receives a response packet corresponding to the training packet from an end device, wherein the response packet includes the identifier of the antenna system and priority values associated with one or more criteria for selection of antenna elements. The antenna control module then determines a direction and polarization to be used for communication with the end device.

For example, described herein are phased array antenna apparatuses that include: a controller; a radio frequency (RF) input connected to the controller; a plurality of phase shifters, wherein each phase shifter is connected to the RF input and wherein each phase shifter is connected to the controller; a plurality of antenna ports wherein each antenna port is connected to a phase shifter; an array of antenna elements, wherein each antenna element is coupled to one of the antenna ports; wherein the controller is configured for beamforming the apparatus by setting a phase angle for each of the phase shifters to directional beams; and wherein the controller is configured to assign a station device a directional beam and to transmit data to the station device using the assigned directional beam, based on a response packet received from the station device in response to a training packet emitted by the array of antenna elements.

In general, the controller may be configured to periodically transmit a training packet at each of a plurality of directional beams, wherein the training packet encodes an identifier of the directional beam. The controller may be configured to assign the directional beam to a station device based on the response packet received from the station device, wherein the response packet includes an identifier of a directional beam and a priority value associated with one of the training packets. The controller may be configured to periodically transmit training packets at each of a plurality of directional beams. For example, the controller may be configured to periodically transmit training packets at each of a plurality of directional beams, wherein the period is less than once every second, 2 sec., 5 sec, 15 sec, 30 sec, 45 sec, 1 minute, etc.).

The controller may be configured to receive data from the station device at a first rate using the assigned directional beam at a first window of time, and to receive data from the station device at a second, slower, rate when not using the assigned directional beam during a second window of time. For example, the controller may be configured to allocate upstream timeslots to the station device and to allocate general upstream timeslots that are not allocated to the station device, and to receive data at a first rate from the station device devices during an upstream timeslot allocated to the station device using the assigned directional beam, and to receive data at a second data rate from the station device during a second upstream timeslot that is not allocated to the station device.

In general, a controller may be configured to assign each of a plurality of station devices a directional beam based on a response packet received from each of the station devices in response to a training packet emitted by the array of antenna elements, and to transmit data to the station device using the assigned directional beam.

The array of antenna elements may be a flat array; the antenna elements may be arranged in parallel (e.g., vertical) rows of emitting elements. For example, each antenna element of the array of antenna elements may comprise a line of emitting elements. Each antenna element of the array of antenna elements may comprise a line of disc-shaped emitting elements.

For example, a phased array antenna apparatus may include a two-dimensional array of antenna emitters; and a radio frequency (RF) transceiver and steering subsystem connected to the 2D array of antenna emitters, and configured to generate a plurality of RF signals that are phase shifted relatively to each other for beamforming of the plurality of RF signals emitted by the two dimensional array of antenna emitters.

In general, a radio frequency (RF) transceiver and steering subsystem may include, as described above, an RF radio (transceiver), and a separate or separable steering unit. The steering unit may be a controller (e.g., control circuitry) and a steering element (e.g., a plurality of phase shifters and/or a lacunated lens). In some variations the control circuitry is part of the RF radio (transceiver). Thus the radio frequency (RF) transceiver and steering subsystem may operate as each of these components (which are described above) operate.

For example, the radio frequency (RF) transceiver and steering subsystem may comprise a plurality of phase shifters, wherein each phase shifter is connected to the RF transceiver and wherein steering subsystem is configured to set a phase angle for each of the phase shifters. The radio frequency (RF) transceiver and steering subsystem may comprise a lacunated lens. The radio frequency (RF) transceiver and steering subsystem may be configured to periodically transmit a training packet at each of a plurality of directional beams, wherein the training packet encodes an identifier of the directional beam.

Thus, any of the phased array antenna apparatuses described herein may include: an antenna housing including; a two-dimensional array of antenna emitters forming two or more vertical columns of disc-shaped emitting surfaces arrange in a flat plane on a front side of the antenna housing; a pair of flared wings extending vertically along two sides of the two-dimensional array; a radio frequency (RF) transceiver and steering subsystem connected to the 2D array of antenna emitters, and configured to generate a plurality of RF signals that are phase shifted relatively to each other for beamforming of the plurality of RF signals emitted by the two dimensional array of antenna emitters, wherein the RF transceiver and steering subsystem comprises a radio device; and two or more RF connectors on a back of the antenna housing, configured to connect the radio device to the two-dimensional array of antenna emitters.

As mentioned, the antenna elements of the array of antenna elements may comprise a line of emitting elements; for example, the antenna elements of the array of antenna elements may comprise a line of disc-shaped emitting elements. In some variations, the antenna elements of the two-dimensional array of antenna elements comprise disc-shaped elements each having a concave emitting surface.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 3A schematically illustrates one variation of a phased array antenna including a compact electronic lens adapted for beamforming the phased array antenna.

FIG. 3B is another schematic of a phased array antenna such as the one shown in FIG. 3A.

FIG. 6A is a schematic illustrating one variation of a phased array antenna having both horizontal and vertical transmission/reception paths, and including separate horizontal and vertical compact (lacunated) lenses.

FIG. 6B is a schematic illustration of one example of the antenna portion (showing an array of emitting antenna elements) as described herein.

FIG. 16A presents a flowchart illustrating an exemplary process of an AP actively learning antenna association of end devices.

FIG. 16B presents a flowchart illustrating an exemplary process of an end device facilitating active learning of antenna association.

DETAILED DESCRIPTION

Phased array antennas are described herein, including phased array antennas that include a compact, electronic lens for steering (beamforming) the antenna. Features of the array antennas, and of systems including such antennas, are described in greater detail below, and may include: compact, electronic lenses (e.g., lacunated lenses) for steering a phased array antenna, phased array antennas incorporating such compact electronic lenses, phased array antennas adapted for use with a removable, self-contained RF radio (transceiver) device, methods and devices for identifying the type of antenna (including the type of phased array antenna) to which a removable, self-contained RF radio is connected, methods and device for controlling a phased array antenna by a removable, self-contained RF radio, and arrangements of antenna (emitting) elements within a phased array antenna. Also described herein are systems and methods of operating an access point using an antenna array, which may include one or more phased array antennas, including those described herein. Any of the elements and features described herein may be used alone or in combination.

For example, FIGS. 1A-1D illustrate one variation of a phased array antenna. This variation is configured as a phased array base station antenna. A phased array antenna may include a plurality of emitting antenna elements that may be placed on and/or in a housing 101. The housing may include a cover to protect the antenna elements, e.g., from weather. In FIGS. 1A-1D the housing also includes a pair of flared 'wings' 103 extending vertically along two of the four sides. These wings may shield the antenna elements, and may be formed of a metal (shielding) material.

Figure 1D:
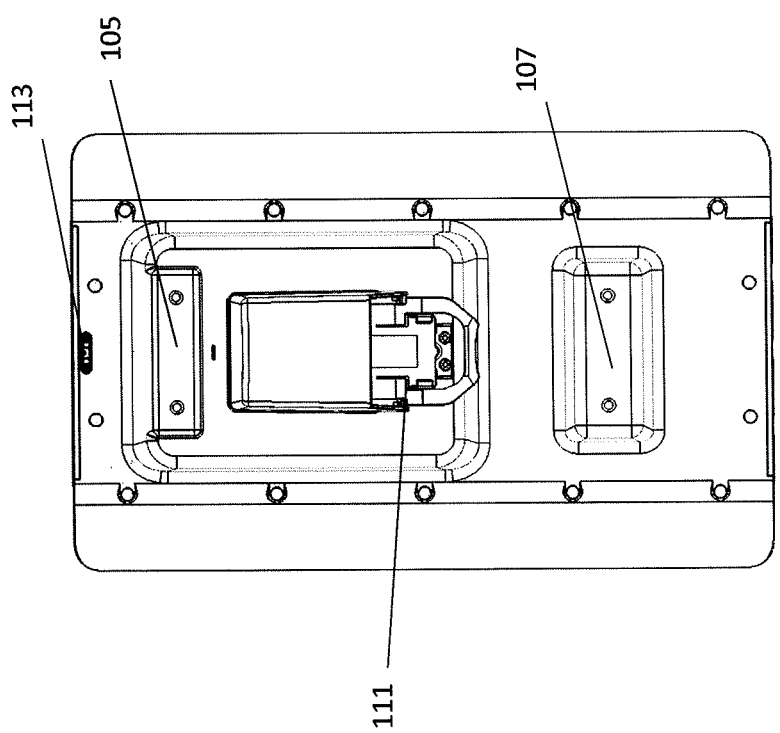

In FIGS. 1A-1D the phased array antenna is adapted to be mounted, as illustrated in more detail below, in an upright, vertical position, and can be controlled by the beamforming lens to scan or orient azimuthally (e.g. in the horizontal direction). The back of the housing of the phased array antenna shown in FIG. 1D illustrates the mounting portions 105, 107 and a connection region 111. The housing may also include a level (e.g., spirit level 113) for assisting in alignment of the device.

Figure 1A:
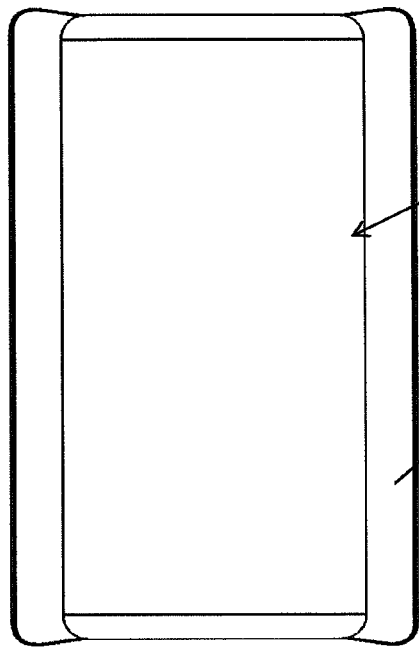
FIGS. 1A, 1B, 1C and 1D show front, side, side perspective, and back views, respectively, of an phased array antenna as described herein that is steerable using a compact (e.g., lacunated) lens having a plurality of groups (or lines) of radiating antenna elements that may be used to steer the beam of the antenna.
Figure 1B:
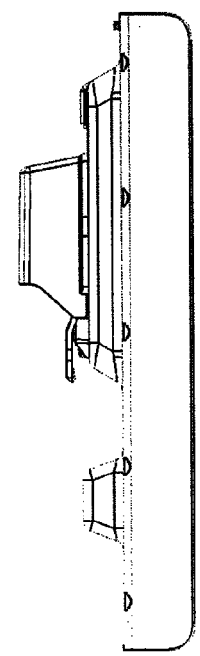
Figure 1C:
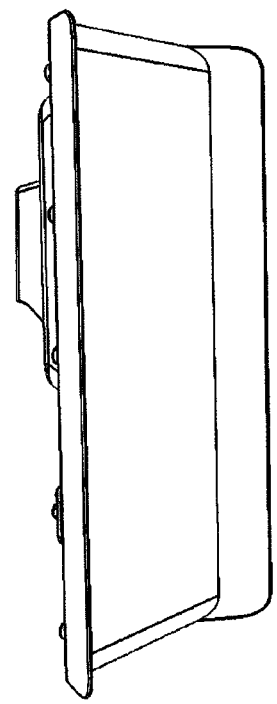
Figure 2:
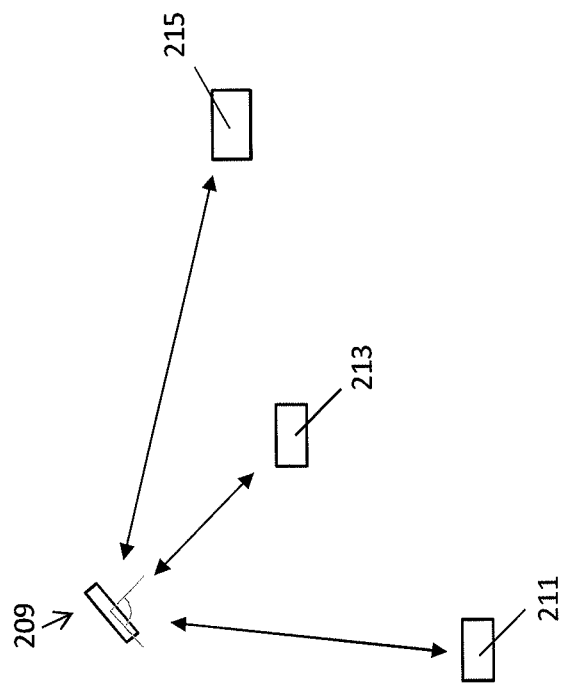
FIG. 2 illustrates the operation of a phased array antenna such as the one shown in FIGS. 1A-1D, communicating with a variety of wireless devices arranged at different azimuthal positions.

In operation, a phased array antenna may communicate wirelessly by RF signal transmission with one or more wireless devices within range of the phased array antenna. As illustrated schematically in FIG. 2, a single phased array antenna 209 may direct beams to one or more wireless devices. For example, in FIG. 2, three exemplary devices 211, 213, 215 are illustrated. The phased array antenna may be steered electronically, without requiring gross movement of the antenna, to communicate with each of the three devices that are separated from each other in space (e.g., azimuthally). The phased array antenna may be connected to a second phased array antenna or another type of wireless device (including an antenna) and/or may be configured as an access point. FIG. 2 is a top view of (e.g., looking down on) a phased array antenna deployed to communicate with a variety of wireless devices. The phased array antenna may be configured as a base station.

Any of the phased array antennas described herein may include or may be adapted to connect with, a radio (RF radio) device that acts as a transceiver (transmitter and receiver) for RF signals at one or more desired frequencies. For example, the apparatus shown in FIGS. 1A-1D may be configured to accommodate an RF radio (e.g., the Ubiquity "Rocket M5") and which may connect on a portion (e.g., the back) of the device. Alternatively, the devices described herein may include an integrated radio. Thus, the transceiver can also be incorporated into the device.

FIG. 3A schematically illustrates the operation of a phased array antenna as described herein. In this example, the antenna includes or is connected to an RF radio 301 that provides input to the antenna, including a steering angle selection switch 305 and an electronic lens 307 that effectively steers the antenna emitting element(s) 311. For example, the RF antenna may provide RF signal input/output, which may be a single input/output or may include multiple (e.g., parallel) input/output signals, including horizontal and vertical polarization signals. The radio may also configured the output/input signals using any appropriate technique, e.g., single and multiple access/encoding such as frequency-division multiple access (FDMA) and frequency division duplex (FDD), etc. Finally, the radio may be connected to the phased array antenna through one or multiple connections, including connections to steer the antenna to direct the antenna beam towards a particular target azimuthal direction (e.g., 40°, 20°, 0°, −20, −40°) from the orientation of the antenna. In FIG. 3A the switch 305 may select the angle of the phased array antenna by selecting which input ports (e.g., "beam ports") 331 feeding into the lens 307. In this example, five beam ports are illustrated. Each beam port has a characteristic (e.g., predetermined) angle associated with that particular beam port. In FIG. 3A, the angle associated with each beam port is indicated above the beam port (e.g., 40°, 20°, 0°, −20, −40°). Because of the structure of the compact electronic lens 307, the output port (e.g., antenna ports) 333 of the lens may be time-delayed relative to data sent and/or received by a particular beam port, resulting in steering of the beam to the particular angle, as indicated. For example, if input is applied non the beam port associated with the −20° phase angle, signals applied into the lens from this beam port will result in a wave front 341 as indicated in FIG. 3A. Similarly, by switching between any of the other beam ports 331 of the lens 307, the antenna beam may be steered to any of the other predetermined azimuthal angles (indicated by dashed lines in this example). In some variations, by applying the same signal to combinations of beam ports the beam may be steered to intermediate targets, alternatively, the apparatus may be configured so that signals may be applied onto to a single beam port at a time. Details of the structure and operation of the lens are provided in greater detail below.

Figure 3E:
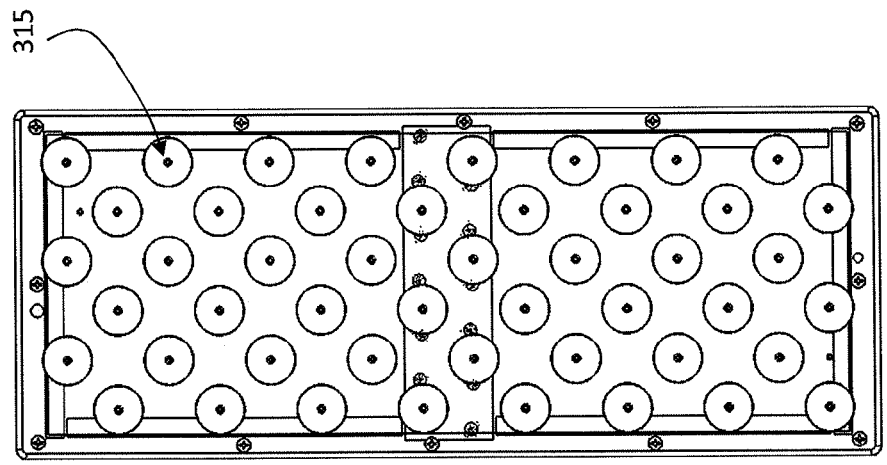
FIGS. 3C, 3D and 3E show back, side and front views, respectively, illustrating an example of components of a phased array antenna such as the one shown schematically in FIG. 3B.

FIG. 3B shows another schematic example of a phased array antenna, similar to that shown in FIG. 3A. In this example, the radio 301, steering angle select switch(s) 305 and lens 307 (including beam ports and antenna ports) may be similar to those shown in FIG. 3A, however antenna 311 emitting elements 315 are also illustrated on the antenna. The antenna is oriented so that the emitting elements 315 will be positioned vertically to allow azimuthal steering of the RF signals. In this example, the emitting elements 315 are configured as elongated emitting elements; each emitting element may be a single emitter or a plurality of connected emitters, as illustrated in FIG. 3E.

In the example shown in FIG. 3B, the switch(s) 305, lens 307, and antenna emitters may be included in the antenna housing. In some variation the radio may also be included within the same housing. For example, as shown in FIG. 3C, a single PCB 351 may be used to hold/form the switch(s) and lens(s) within the housing and may be connected to each of the antenna emitting elements. In FIGS. 3C-3C, the PCB is mounted on one side (e.g., the back side) of a support that also holds the plurality of antenna emitting elements 315. Each of the antenna ports of the lens are connected by electrical connections (e.g., wires, traces, etc.) to each of the antenna emitting elements 315. In FIG. 3C, the antenna includes 48 individual antenna emitting elements 315, arranged in six vertical lines of eight individual emitting elements; within this arrangement, each of the eight individual elements are electrically connected so that all eight emit/receive synchronously. This arrangement of lines of connected individual emitting element is particularly beneficial, and may help in focusing the beam in the elevation plane. However, rather than multiple linked elements, a single antenna emitting element may be used.

Figure 3D:
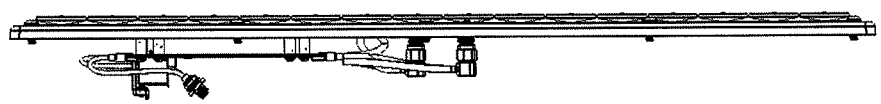
Figure 3C:
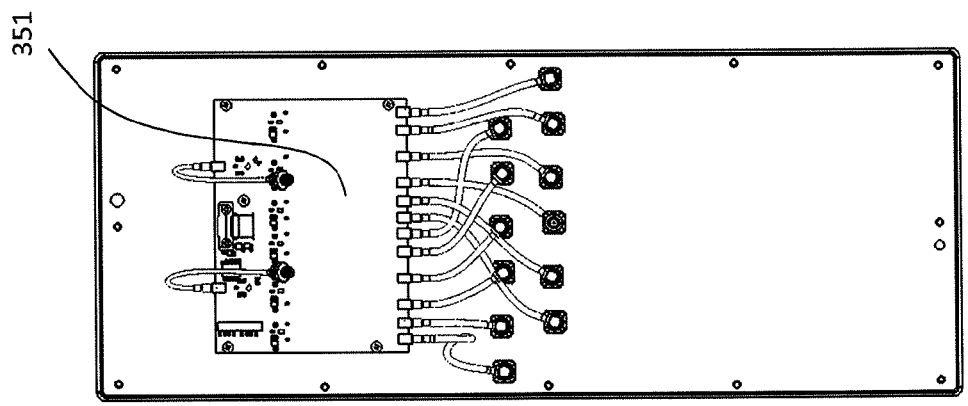

In FIGS. 3C-3E the apparatus is configured to connect to a radio (not shown). As mentioned, the radio may be integrated into the device, and may be formed on the same PCB as the lens and switches. In this example, the antenna consists of an array of approximately cone-shaped disk/wafer transmitters 315 on a panel. The antenna board connects to the electronic lens board, so that the phased array may direct the direction of the focused radio wave signal. Any appropriate radio (transceiver) can be connected to the phased array antenna and may provide directional transmission of radio waves.

The compact lenses described herein are adapted for electronic beam steering. These lenses are compact beam steering lenses may be formed from parallel plates (for example, a stripline) where there are a plurality of openings (holes, gaps, lacuna, etc.) formed in the plane of the lens body.

For example, the lens body may be formed of two parallel, conductive plates separated by a dielectric material. The lens body extends in a plane (parallel with each of the plates), and the holes, gaps, lacunae, etc. in the body may be formed into this plane. Because of the multiple holes/openings/gaps/lacunae in the lens body, these lenses may be referred to as lacunated lenses.

In general, a lacunated lens allows steering of a beam of a phase-array antenna without the need for phase shifters. As mentioned above in reference to FIGS. 3A-3B, a lacunated lens typically has multiple antenna beam ports, where each beam port has an associated (predefined and predetermined) constant phase shift and has multiple antenna input/output ports (e.g., array output ports) that are each connected to antenna radiating elements. The beam ports may be referred to as antenna beam ports, antenna beam input ports, input ports, or beam phase ports. The beam ports can be connected to switches that allow switching between the beam ports to determine the angle of the beam for the array antenna. The lacunated lens also includes a plurality of antenna ports for connection to antenna elements. The antenna elements may also be referred to as antenna radiating/receiving elements, radiating elements or antenna receiving elements.

Antenna elements are typically connected on one side of the lacunated lens, with beam ports connected on the opposite side of the lacunated lens. The lacunated lens may also be thought of as a quasi-microstrip (or quasi-stripline) circuit where each beam port represents (or results in) a constant phase shift at the antenna ports, by feeding (or receiving from) the antenna elements at phases that vary linearly across a row. The variations in phase result in steering of the phased array, as illustrated in FIG. 3A.

Figure 4B:
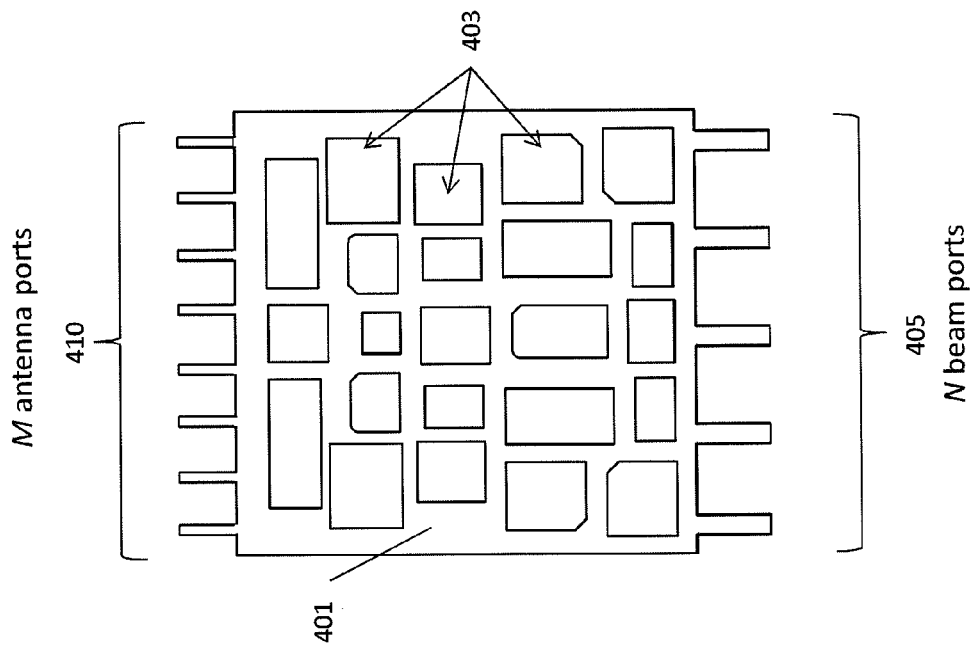
FIGS. 4A, 4B and 4C illustrate top views of variations of compact, electronic lenses for beamforming as described herein.
Figure 4A:
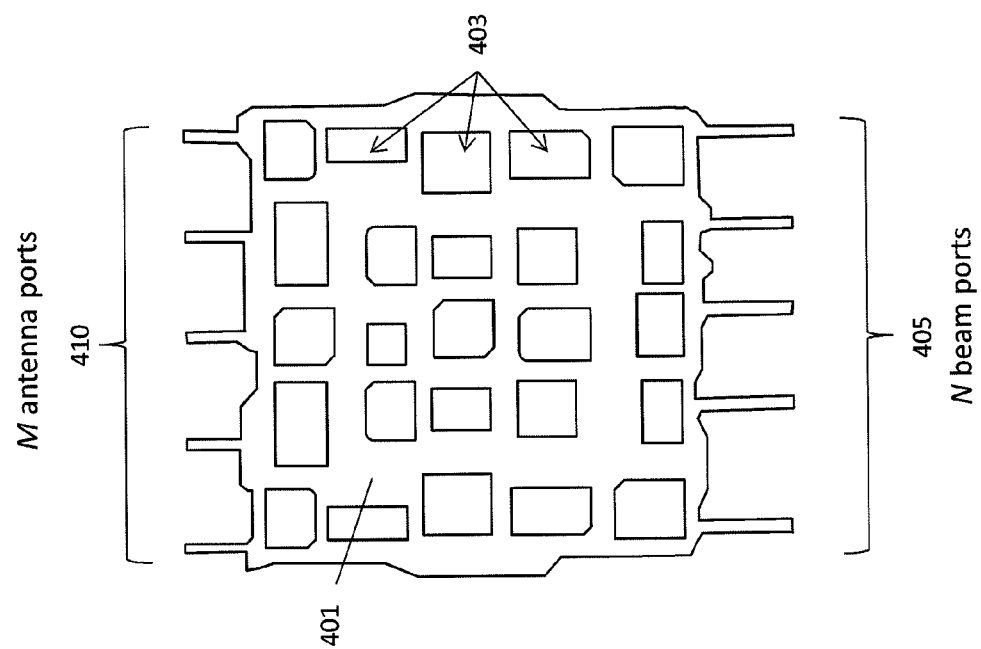
Figure 4C:
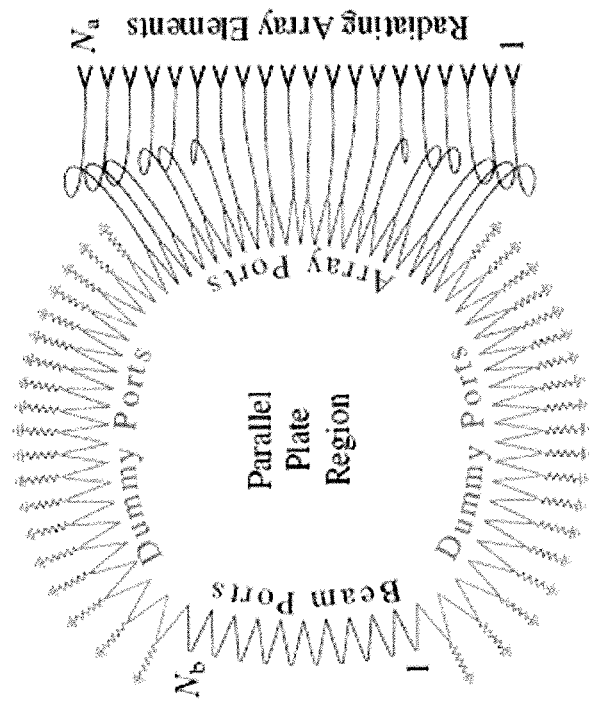

FIGS. 4A-4C illustrate variations of lacunated lenses. In general, the lacunated lens has a carefully chosen shape and location of the lacuna or openings through the parallel plates within the inner region of the lens; these openings produce a wave front across the antenna ports that is phased by the time delay in the signal transmission, so that each beam port correspond to a distinct beam angle shift at the output. Aiming the array antenna may involve selecting a specific beam port (or combinations of beam ports). For example, the lens may have N beam ports and M antenna ports, where the N beam ports each correspond to a different phase angle, and the M antenna ports each connect to a distinct antenna element.

This is illustrated in FIG. 4A. In This example, the lacunated lens has five beam ports 405 (in this example, N is 5) and also has five antenna ports 410 (M is 5). The lens is formed from as a microstrip so that there are multiple cut-out regions 403 (openings, lacuna, etc.) in the plane forming the lens, within the body of the lens 401 between the beam ports and the antenna ports. In this example, the lens may be formed as a printed circuit board (e.g., microstrip) structure, although other parallel-plate structures could be used. For example, the lens may be printed using an FR4 (e.g., FR408) material. FR408 is a high-performance FR-4 epoxy laminate having a low dielectric constant and low dissipation factor.

In this example, the holes (which may also be described as opening, lacuna, cut-outs, etc.) are regions where the signal is not passed through the body of the lens. Thus, the radio signal must travel in a path through the regions between the openings along the body 401. In general, the opening may have any shape. Although FIG. 4A shows the openings as generally rectangular, the openings may be square, triangular, circular, five-sided, six-sided, seven-sided, eight-sided, etc. For example FIG. 4C illustrates openings having different sizes and shapes, including oval and triangular. The number of openings may also be varied. For example, in some variations the number of openings may be greater than 2, greater than M, greater than N, greater than M×N, etc. The shape and sizes of the openings may be selected based on the path length and transit time, as well as the constructive and destructive effects of traveling through the parallel plate structure having multiple separate but converging paths. In each case the signal input/output at a particular beam port may be pre-defined (e.g., to have a desired phase angle and location on the edge of the lens body), and the number of antenna beam ports may also be predefined. By varying the number, sizes and locations of the openings through the lens body, the one or more solutions resulting in the predetermined timing delay causing the phase shift at the antenna ports may be resolved. In the examples shown in FIGS. 4A-4C the openings are symmetric about a midline transverse to the antenna ports and beam ports. This symmetry may not be necessary. In addition, the examples shown are intended to provide relatively evenly spaced phase angle shifts; the spacing between phase angles may be irregular (e.g., for a set of five antenna ports, −40°, −30°, 10°, 15°, 40°), and customized.

Thus, the arrangement of the openings as well as the overall shape (e.g., outer perimeter) of the plane forming the body of the lens may be modified to adjust the phase shift of the lens, and may be determined experimentally or solved for by simulation. In general, the timing of a signal from each of the beam ports to each of the antenna ports through the body of the lens, including traveling around the holes, may determine the effective phase at each of the antenna ports. The length and connection of each antenna port to each antenna emitting element may also be included in this estimate, so that the steering can be determined. In addition, the overall shape of the lens body may be varied. For example, in FIG. 4A the lens body has a grossly rectangular shape; while in FIGS. 4B and 4C, the lens body is more regularly rectangularly (or square) shaped. The lens body may have other shapes (e.g., trapezoidal, oval, pentagonal, hexagonal, heptagonal, octagonal, oval, etc.).

In general, these lenses operate in both transmission and reception of electromagnetic signals. For example, steering the beam to be transmitted may involve feeding a signal to one of the different input ports (or for steering to intermediate angles, feeding combinations of ports). As described above, the beam is steered by phasing the time delay of transmission from the array of emitting elements based on the angle desired. Receiving signals from one (or combinations of) beam ports ("listening" on these beam ports) may determine the angle from which a signal was received by the antenna.

The lenses described herein are particularly compact and efficient. Traditional lenses for beamforming, such as Rotman lenses and variations thereof, are structured differently, and must therefore be much larger than the lacunated lenses described here.

Figure 5:
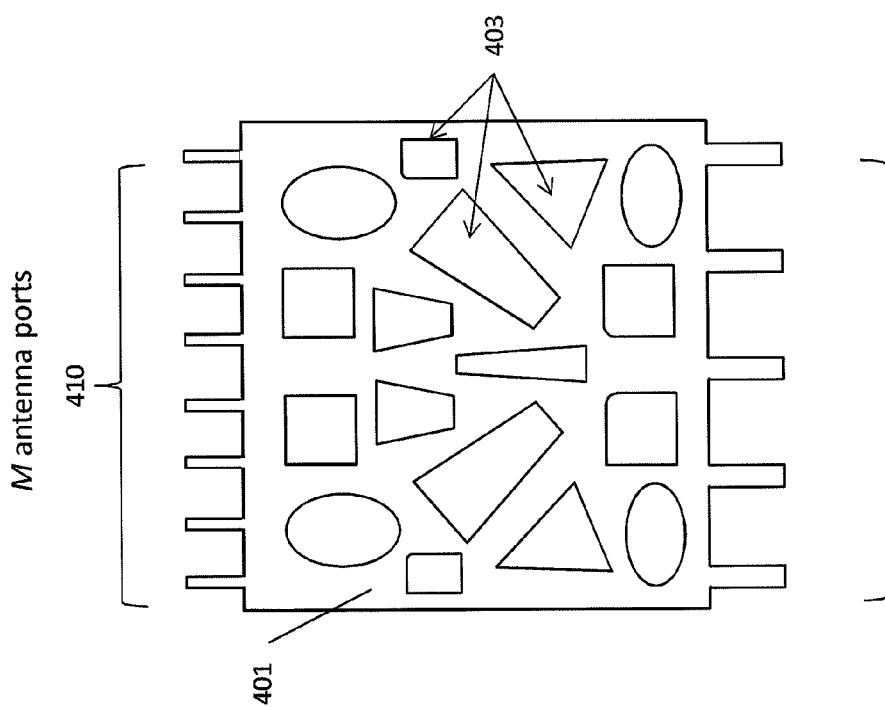
FIG. 5 is a top view of an example of a prior-art Rotman lens.

For example, a traditional Rotman lens has a plurality of inputs with fixed/constant phase shift, a plurality of outputs that each connect to a radiating element, and a plurality of dummy ports to provide refelctionless termination. A Rotman lens generally has a carefully chosen shape and appropriate length transmission lines to produce a wave front across the output that is phased by the time delay in the signal transmission. For example, FIG. 5 shows an example of a basic diagram of a traditional Rotman lens. The Rotman lens in FIG. 5 consists of a set $N_b$ of input (beam) ports and a set of $N_a$ output (array/antenna) ports arranged along an arc. The lens structure between both sets of ports functions as an ideal transmission line between the individual input and output ports. The signal applied to an input port is picked up by the output ports, and the different electrical lengths between a specific input and all output ports generates a linear progressive phase shift across the output ports of the lens. A large number of terminal or "dummy" ports are also an integral part of the Rotman lens and serve as an absorber for the spillover of the lens and thus it reduces multiple reflections and standing waves which deteriorate the lens performance. The design of these types of lenses is governed by the Rotman-Turner design equations, based on the geometry of the lens. These equations assume a solid parallel plate region (e.g., without holes) and the presence of dummy ports.

A principle advantage, and distinction, between the lacunated lenses described herein and traditional Rotman-type lenses is the sizing. For a particular band of frequencies, the lacunated lenses described herein may be made substantially smaller than Rotman lenses. For example, a typical Rotman lens may require a roughly 12×12 cm lens when operating in the RF frequency range (e.g., 2 GHz to 30 GHz). A lacunated lens as described herein may have comparable or superior performance at a fraction of this size. For example, the lacunated lens shown in FIGS. 4A-4C and other examples may be about 5 cm×6 cm or smaller. Without intending to be bound by a particular theory of operation, this may be a result of the increased path lengths resulting from the holes through the body of the lens in the lacunated lenses described herein, as mentioned above.

FIGS. 6A and 6B illustrate another example of a phased array antenna using lacunated lenses. In this example, the phased array antenna receives both horizontal and vertical polarization input from the RF radio 601, and may separately transmit/receive the horizontal and vertical signal components through a dedicated horizontal component lacunated lens 607 and a vertical component lacunated lens 609. In FIG. 6A, the radio 601, which may be integrated with or separate from the rest of the antenna, connects the RF horizontal and vertical signal components to the switch 605. Additional control elements (processors, etc.) may be used either as part of a control for the phased array antenna or (more likely) as part of the RF radio; the additional control may determine the control information/configuration for the phased array antenna, including which beam ports to use, and timing of the applied energy. The two lenses may be steered together (e.g., in tandem) or independently, and each lens may be connected (via the antenna ports) to each of the antenna emitting elements. In FIG. 6A, there are five antenna ports for each lens, and six antenna emitting lines. As shown in FIG. 6B, each antenna emitting line may comprise multiple, linked antenna emitting elements; in FIG. 6B, eight emitting elements 627 are connected 631, 633 in a vertical line (which may improve focus in the elevation plane). Each of the first five lines of antenna emitting elements is connected to one of the antenna ports of each of the horizontal lens 607 and the vertical lens 609. In addition, in this example, the sixth antenna emitting line of emitting elements is connected directly 615, 617 to the vertical and horizontal components, without being time-delayed through a lens. Thus, the antenna may include an omni-directional set of antenna elements 625 in addition to the beamformed (aimed) sets.

Figure 7A:
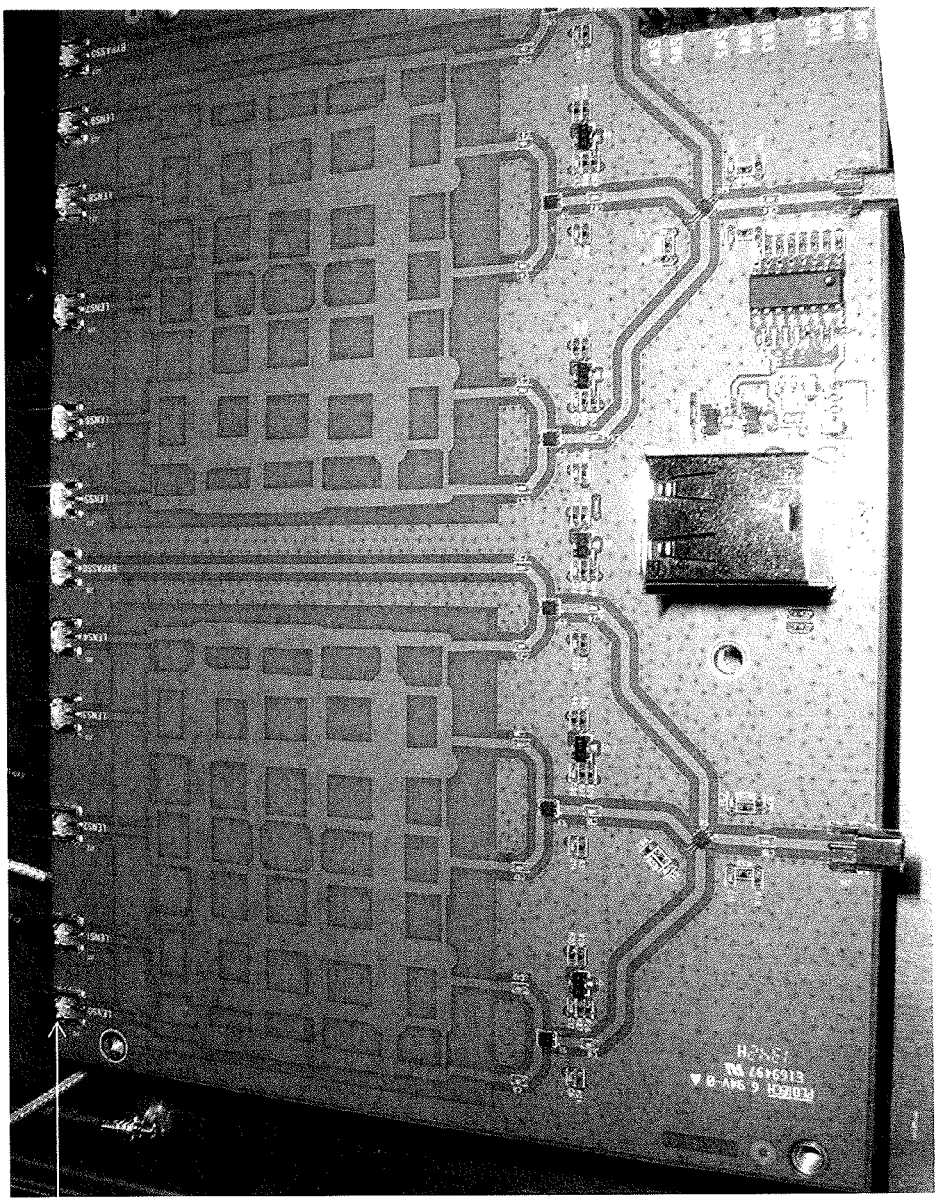
FIGS. 7A and 7B show top views of a portion of a phased array antenna including the switching circuitry and compact (lacunated) lenses as described herein; the lenses shown may be used with a phased array antenna such as the one shown in FIG. 3C.
Figure 7B:
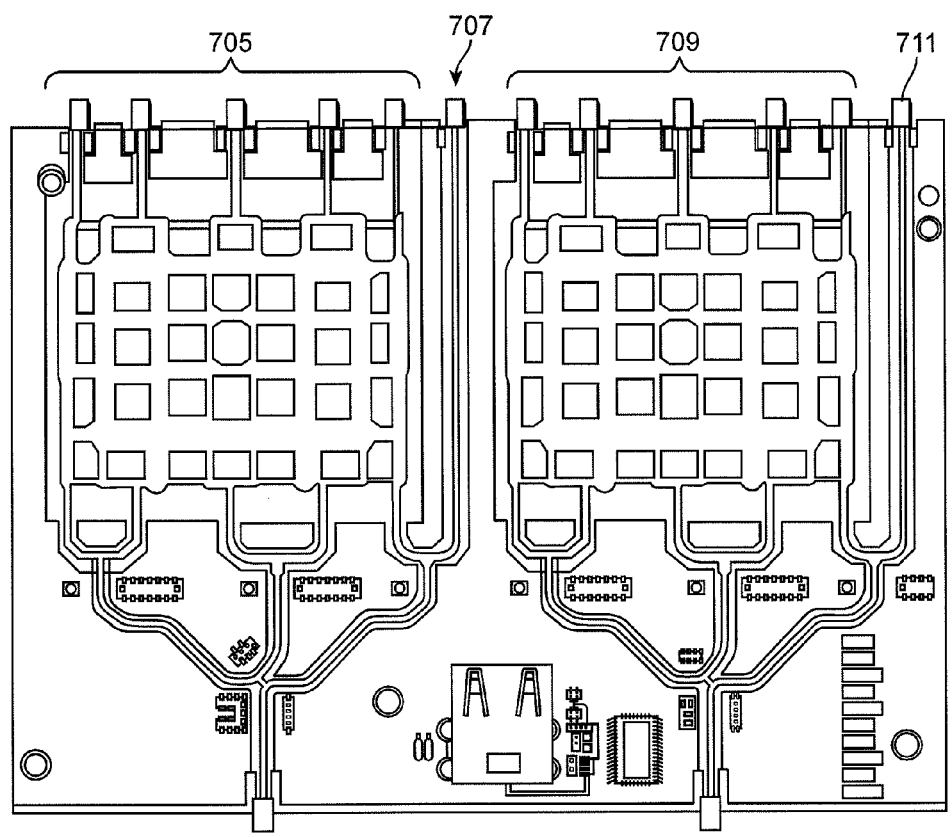

FIGS. 7A and 7B illustrate one example of a pair of lenses such as those described for FIGS. 6A and 6B above, in which the lenses are formed along with the switches (e.g., on a PCB) and include connectors 703 for connecting the antenna ports to the array of antenna emitting elements (not visible in FIGS. 7A and 7B). As shown in FIG. 7B, this example has five antenna ports 705 for the horizontal lens, one horizontal omni-directional connection 707, five antenna ports 709 for the vertical lens, and one vertical omni-directional connection 711.

These ports may be connected to the antenna emitting elements (e.g., on an opposite side of the antenna housing). As shown in FIGS. 8A, 8B, 9A, 9B and 9C, the antenna emitting elements may be arranged in an array so that the line of emitting elements (which may be referred to collectively as an antenna element, and therefore includes one or more antenna emitting elements) and connected to the appropriate antenna ports. For example, FIGS. 9A and 9B show front and back portions, respectively or an array of antenna elements. In FIG. 9A, eight antenna emitting elements are shown connected to form a line (vertical line) making an antenna element. In FIG. 9B the connections to the antenna ports on the back side of the antenna substrate is shown. FIG. 9C shows an enlarged view, with exemplary dimensions, of a single antenna emitting element.

FIGS. 10A to 10F illustrate one variation of an assembled phased array antenna including a pair of lacunated lenses for horizontal and vertical components of RF signal communication. In this example, the apparatus is configured to dock with a RF radio device on the back of the antenna. It may be configured to accommodate a variety of transceivers. Alternatively, the transceiver can also be incorporated into the device itself.

Figure 10B:
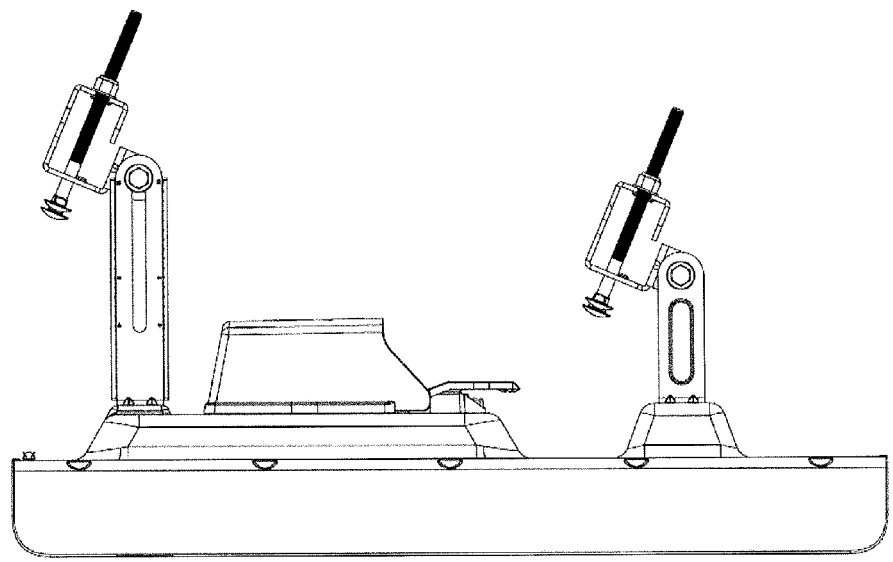
FIGS. 10A, 10B and 10C show front, side and back views, respectively, of one variation of a phased array antenna that may be used with a removable/replaceable RF radio (transceiver).
Figure 10A:
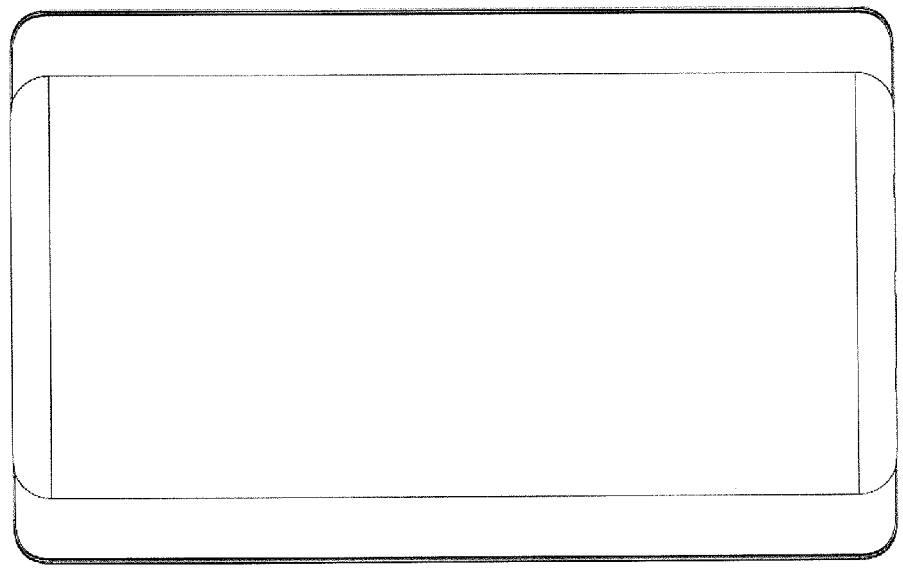
Figure 10D:
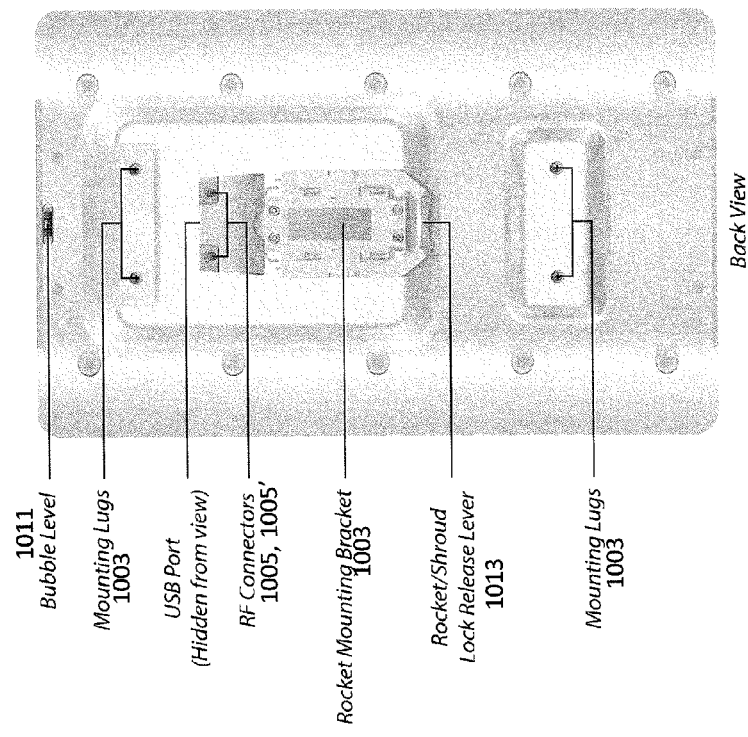
FIG. 10D is another example of a back view of the phased array antenna of FIGS. 10A-10C.
Figure 10C:
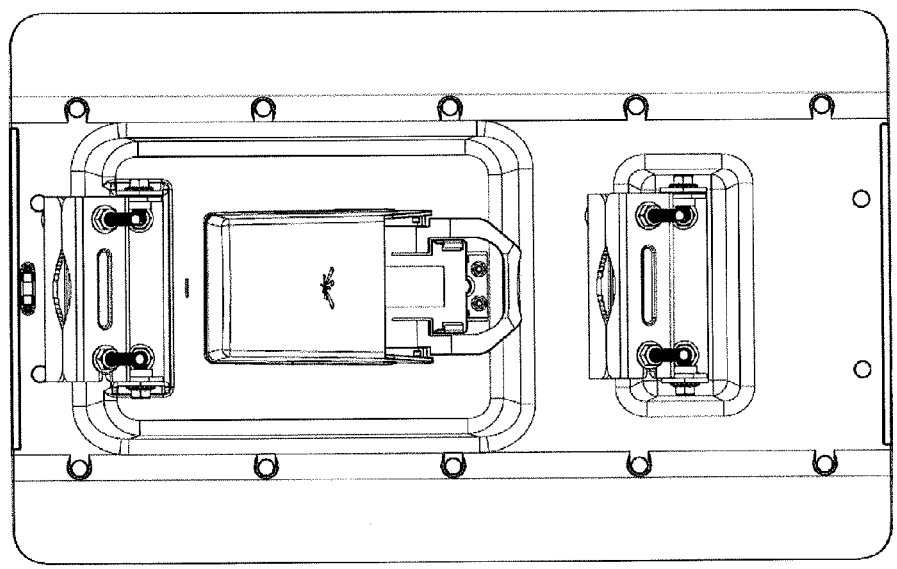
Figure 10F:
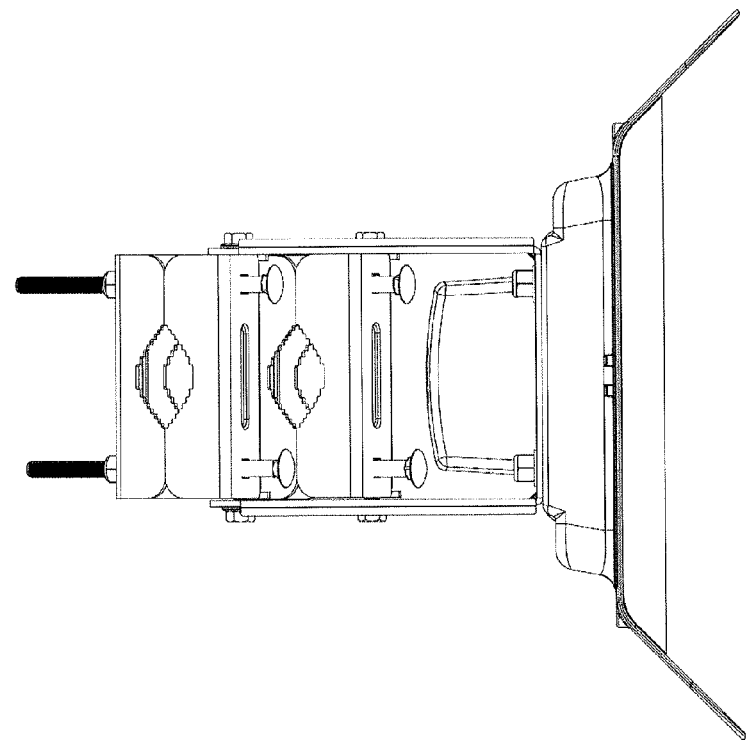
FIGS. 10E and 10F show back perspective and top views, respectively, or the phased array antenna of FIGS. 10A-10C.
Figure 10E:
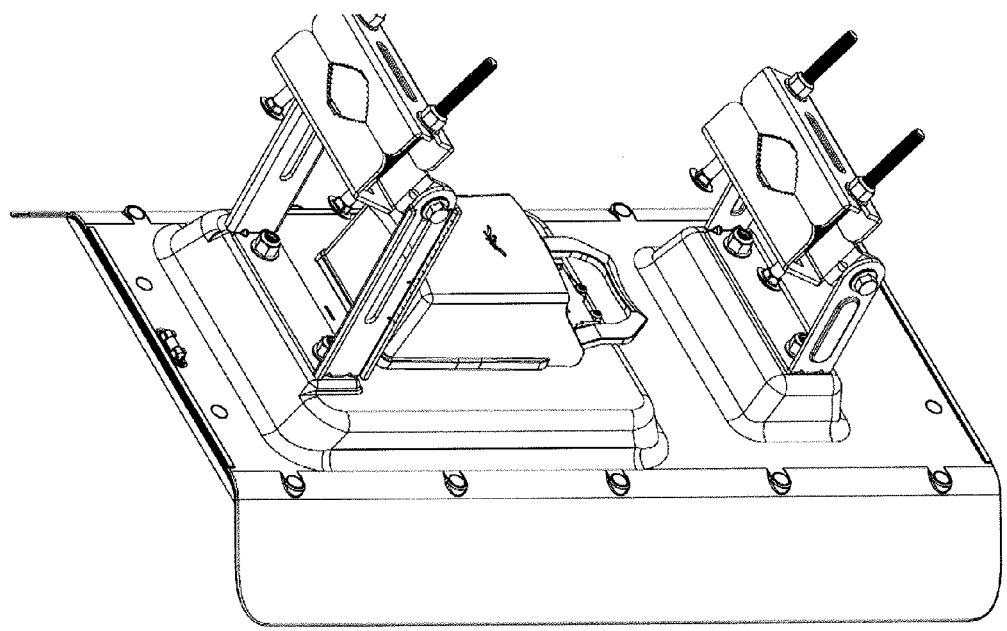

As mentioned, inside, the antenna consists of an array of cone-shaped disk/wafer transmitters on a panel. The antenna board connects to the electronic lens board, using the phased array to direct the direction of the focused radio wave. FIG. 10D illustrates one variation of a back of the phased array antenna including mounting regions 1003 and connections for coupling to the RF connectors 1005, 1005' (e.g., horizontal and vertical RF component connectors). As discussed below, the back may also include a USB port 1007. A spirit level 1011 may also be included to help align the antenna. Finally, the back may include attachment elements for coupling to an RF Radio device, including a cover or shroud 1013 for covering the radio once connected.

Figure 11:
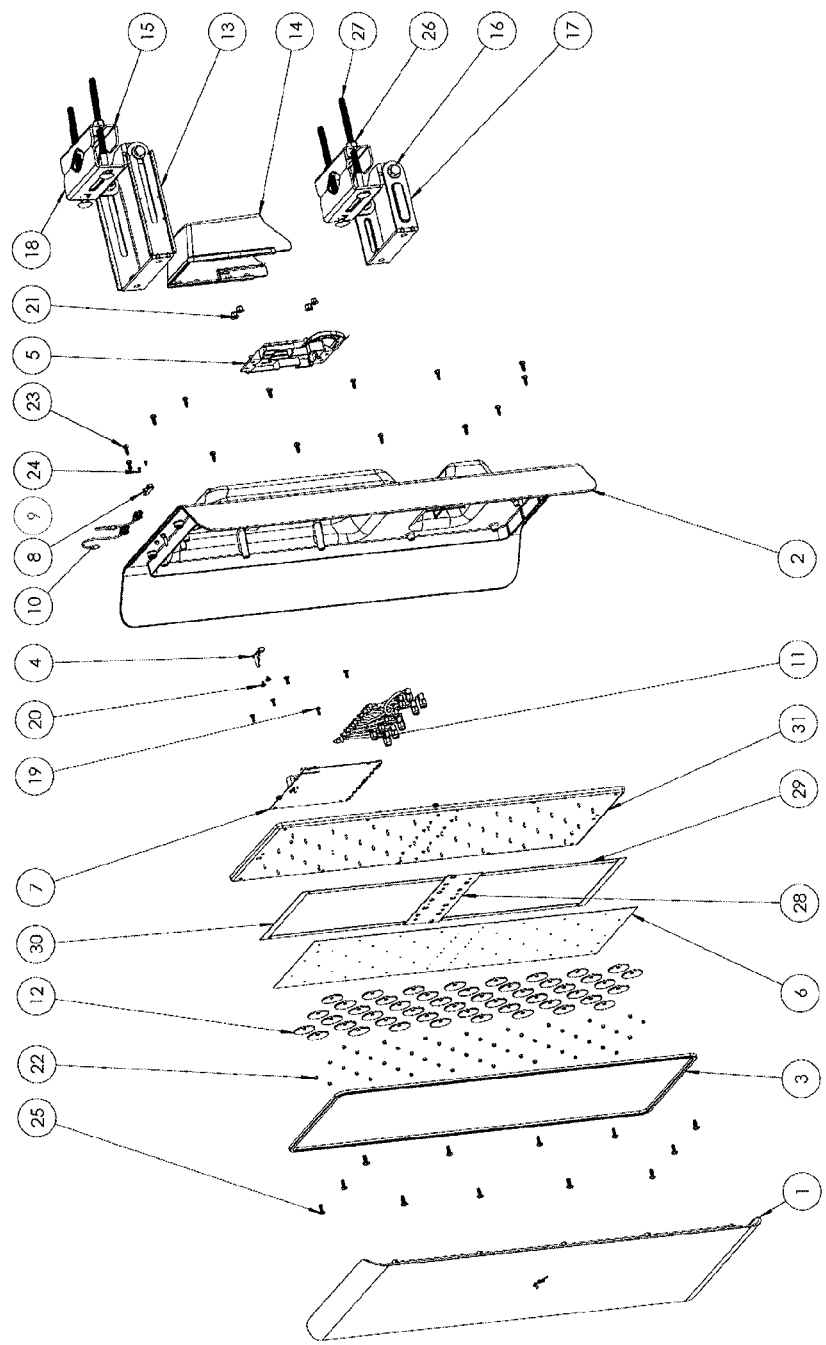
FIG. 11 is an exploded view of a phased array antenna that may be used with a removable RF radio, similar to the variation shown in FIGS. 10A-10F.

FIG. 11 shows an exploded view of the device of FIGS. 10A-10F. In this example, the phased array antenna includes a front cover 1, and a rear housing 2. The rear housing may include the wings/deflectors described above, as well as attachments for the mounts (e.g., radio mount 5, pivot mount 16, 17; pole-mounting brackets 13, 15, 18, and mounting screws 26, 27), connecting cables (e.g., RF cables 10 connecting the RF radio to the antenna) and a cover for an RF radio that can attach to the back of the apparatus (not shown). As mentioned above, a spirit level (bubble level) 9 may be integrated into the cover (e.g., back cover). Between the front and back covers, the internal components may include the plurality of antenna emitting elements 12 (disklike cones), each connected by screws/nuts to an antenna PCB 6. Connections between the individual antenna emitting elements may be made by a conductive element, such as a wire or trace; in FIG. 11 the conductive element is a conductive tape that can be used to connect a line of antenna emitting elements into a grouped antenna element, shown having eight individual antenna emitting elements, each. A printed circuit board 7 (lens PCBA) with the lens and control circuitry (e.g., switches, etc.) may be positioned behind the antenna PCB. A ground plate 31 is shown separating the front antenna side from the back circuitry/lens side. A plurality of cables 11 may connect the lens and control circuitry to the antenna elements (e.g., 130 mm cables). Fasteners such as screws and bolts may be used to secure the various components. Finally, as shown in FIG. 11, a seal 3 (e.g., gasket) may be positioned between the front and back covers.

The examples above illustrate the use of a lacunated lens as a compact beamforming element. However the lenses described herein may be used for a variety of other effects, including in particular as an amplifier. For example, any of the lenses described herein could be configured to operate (similar to a Bulter matrix) as a mulit-port amplifier, which is capable of selectively (or piecemeal) amplification by dividing a single input signal into N-signals or combining N-signals into a single output. For example, two or more of the lense devices (such as those shown in FIGS. 4A-4C) may be connected together (and even stacked atop each other for compact packing) to feed into each other. For example, with reference to FIG. 4A, energy applied into the input port(s) (e.g., any one of them) may be divide out into the M output ports; the output of all or just some of these output ports may be (e.g., individually) amplified, amplifying the energy, and the output could be fed into another lens and re-combined. As a result, each amplifier used to amplify the final output would need less power and/or may be smaller and more compact (and require both space and less overhead, e.g., for cooling). This may further allow the use of smaller, less expensive amplifiers, including chip amplifiers.

Thus, the lenses described herein may be used in virtually any application that a Bulter matrix may be used, however the lenses described herein have numerous advantages over Bulter matrix devices, including their compact dimensions. A Butler matrix is typically a larger multilayered device, and may be difficult to use, in contract to the compact single (e.g., single dielectric) layer lenses described herein.

Connection to Radio/Transceiver

As mentioned above, any of the antennas described herein may be used with a removable/connectable RF radio (also referred to as a transceiver). Alternatively, in some variations the radio may be dedicated and/or permanently integrated into the antenna.

In variations in which the radio may be connected to the antenna, the radio may be a radio that is configured to be operated with various types of antennas and removably connected to an antenna, such as the phased array antennas as described above. For example, a radio may be an RF radio. The radio may include a transmitter and receiver, and may include one or more outputs/inputs (e.g., RF outputs/inputs) such as a horizontal polarization output/input and a vertical polarization output/input, as well as USB connector (of any appropriate type, such as a micro USB connector). Any of the antennas described herein may also include a USB connector or any appropriate type (e.g., a USB type A connector). As will be described in greater detail below, when connecting the device, the radio may be connected so that the data input/outputs (such as the RF outputs) are connected to the antenna, and the USB ports between the radio and antenna may also be connected. Power (e.g., POE) may be transmitted through the USB to power the antenna. In general, the radio device (e.g., transceiver), such as a 2×2 MIMO radio, can be paired with the antenna to transmit/receive.

In variations in which the radio may be used with a variety of different antennas, including the phased array antennas described herein that can be beamformed (aimed) on different devices (e.g., client or target devices, such as wireless devices as shown in FIG. 3), the radio device may benefit from knowing the identity of the antenna that it is connected to, so that the radio may control the direction of the beam (e.g., steer) the beam during operation of the radio. For example, the radio may control the modulation technique (TMDA, etc.) or otherwise routing traffic to and from the radio. Thus, the radio (which may also be referred to as a transceiver) may be configured to detect and identify the antenna that it is paired with, and, based on the identity of the antenna, configured the radio so as to transmit and receive using the antenna, including provide control signals to the antenna (e.g., for aiming the antenna). This may be particularly useful with the phased array antennas described herein.

By using a USB connection between the radio and the antenna that can be used to provide power and/or data between the radio and the antenna, detection and/or communication between the antenna and the radio device may be done without the need for an additional communication link between the devices. A simplified circuit for signaling the identity of the antenna to the radio device may use the ground pins of the USB connection. By modifying the voltage of the ground pin, the USB connection may be a static identifier of the antenna identity in an otherwise generic USB connection, without requiring the use of a data line/pin of the USB connection. The circuitry involved may be extremely robust and simple.

In general, a radio (transceiver) may include a USB connector that mates with a USB connector on the antenna. As described herein, the traditionally dedicated ground pins on the USB connectors for the radio and the antenna USB connectors can be adapted to convey information identifying the antenna to the radio and in some variations, provide control information from the radio for steering the antenna. Thus, although the system does not use USB signals (Universal Serial Bus signals), instead the USB connector and standard USB cables may be adapted so that the dedicated ground pins transmit information about the identity and control for the antenna.

For example, a radio device may include the following USB pins, and be configured as a micro USB connector (pins usage as follows): Pin1=Power VCC; Pin2=Digital clock; Pin3=serial data; Pin4=ID NC; Pin5=USB GND; Shell=Earth_gnd. Similarly, the antenna device (e.g., and phased array antenna device) may be configured as a USB type A connector, and include the following pin configuration: Pin1=VCC power; Pin2=Digital clock; Pin3=Serial data; Pin4=GND signal; Shell=Earth_GND.

The radio device can detect that it is connected to a phased array antenna so that it can then coordinate the control of the beam steering. This may be achieved using an analog circuit connected to the USB ground pin. An analog detection circuit may be used to detect when the radio device is connected to a particular (e.g., predetermined) type of antenna, such as a phased array antenna having a known number of phase angles (beam ports, N) and antenna elements (antenna ports, M).

For example, the radio USB connection may be a digital circuit that uses only the connector Shell as Ground reference for the digital transmission on the USB connector. The dedicated Ground pins (pin4 on the antenna side/pin5 on the radio side, in the example above) may be used by the radio to detect a predetermined antenna type. In some variations the radio includes an antenna detection circuit that allows the detection of the antenna (e.g., phased array antenna) and gives feedback back to radio (e.g., software controlling the radio and/or antenna) that the radio has been connected to a predetermined type of phased array antenna. The predetermined type of antenna may include, for example, phased array antennas having a particular number of antenna (radiating) elements and/or predetermined steering angles, predetermined bandwidth(s), or the like.

Figures 12A, 12B:
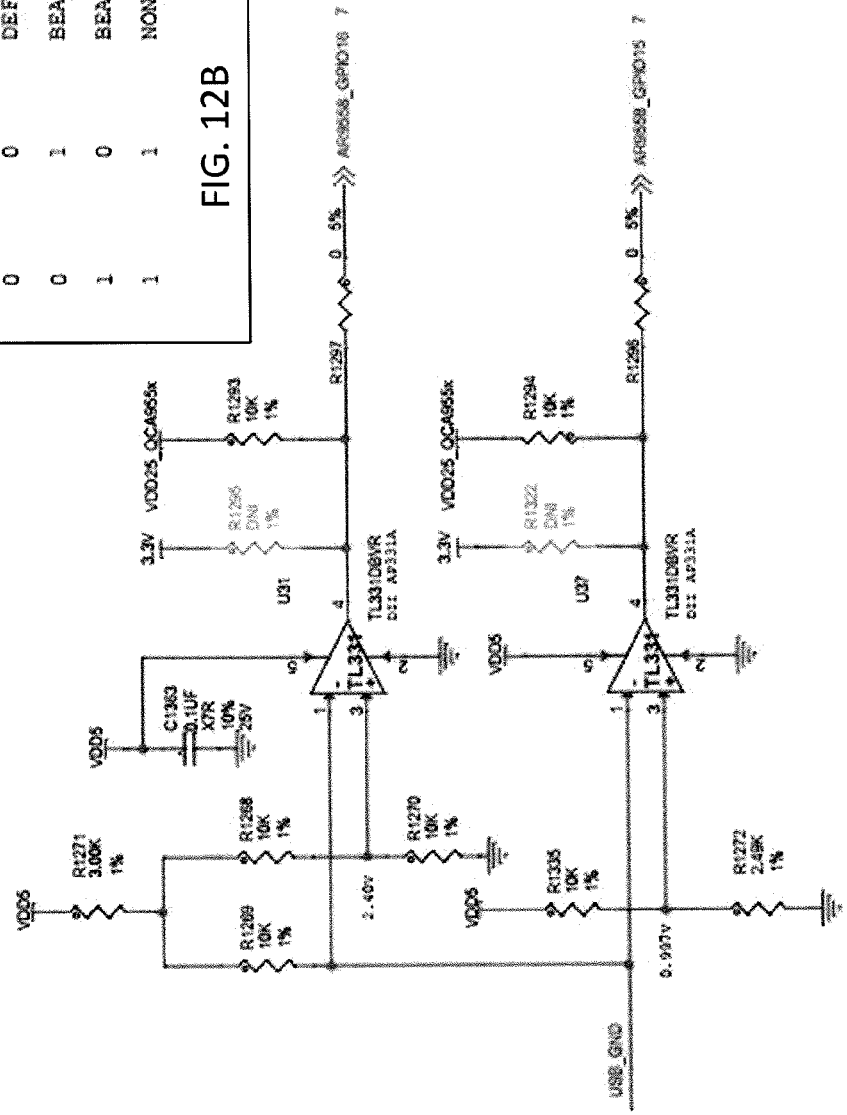
FIG. 12A is a schematic illustration of a sensing (detection) circuit that may be used with a removable (e.g., self-contained) RF radio to detect the type of antenna that the radio is connected to from the ground pin of a USB connector.
FIG. 12B illustrates the identification of the identity of an antenna when the radio is connected, using a circuit such as the one shown in FIG. 12A.

In general, a detection circuit may be an analog detection circuit that is operatively connected to the dedicated ground pins of the USB port(s). For example, an antenna detection circuit (or "sensing" circuit) may use two (or more) comparators that have reference voltages, and a tight tolerance resistive divider. See, e.g., FIG. 12A, showing one example of a sensing circuit. On the antenna, a signal from the dedicated ground pin of the USB port (Pin4) may be used as the resistor value detection to ground to complete the circuit. As shown in FIG. 12A, the inputs from the USB Ground may be compared to determine the identity of the antenna. On the antenna side, a predetermined type of antenna may have the ground pin of the USB (pin 4) set to a particular value that is different from the value that another type of antenna has, and that is different from a 'normal' USB ground value that all other (e.g., non-predetermined) antennas may have. For example, a first type of phased array antenna having six RF paths with both horizontal and vertical polarization (for a total of 12 paths) that operates at a particular frequency band, e.g., within a 5 GHz bandwidth, may have the ground pin of the USB (pin 4) at (or set to) a first voltage value, and a second type of phased array antenna having eight RF paths with both horizontal and vertical polarization (for a total of 16) that operates at a second frequency band, e.g., also within a 5 GHz bandwidth, may have the ground pin of the USB (pin 4) at (or set to) a second voltage value. As shown in FIGS. 12A and 12B, the sensing/detection circuit may use the value of the USB ground pin (Pin4) on the antenna to determine which of four possibilities for the connection to the antenna are present: default, first type of phased array antenna (beam board 1), second type of phased array antenna (beam board 2), or non-beam board antenna. Although the sensing/detecting circuit shown in FIG. 12A includes only two binary digits (e.g., four possibilities), the circuit may include additional "digits" and therefore additional numbers of predetermined antenna types. In this example, the antenna sensing/detection circuit is an analog circuit that provides a digital output to the radio and indicates the type of antenna to which it is connected, and therefore may help the device automatically configure for transmission/reception using the antenna. This information may also be provided to a user or to a remote device to control and/or modify operation of the antenna and/or radio. Thus, in general, the radio device uses the dedicated USB ground signal (USB_GND) from the antenna using the USB cable connection and comparators sense the voltage and report the result. As mentioned, the detected antenna information may be reported via output to a GPIO digital signal on a host CPU.

Figure 13:
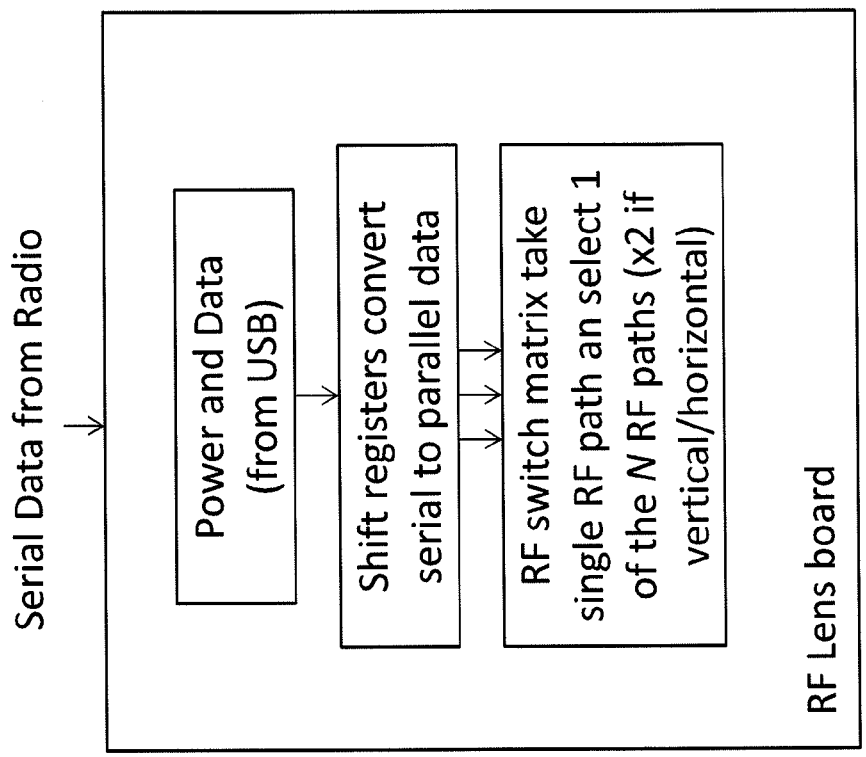
FIG. 13 schematically illustrates the control of a phased array antenna that is connected to an RF radio device once the antenna type has been identified by the radio.

In variations in which the radio controls the operation of the phased array antenna, the radio (or a processor/remote CPU, user, etc. operating through the radio) may control the operation of the antenna. For example, in a phased array antenna in which a lens is used for beam shaping (steering), the lens board may use several digital electronic ICs, and RF active parts to control the operation of the antenna, including switching the beam ports and thereby steering the antenna. In some variations this control information may be transmitted using the USB connection between the radio and the antenna, and data such as antenna control data, may be transmitted from the USB connection as well as power for powering the antenna. Thus, an antenna may receive power from a USB connector, such as power in from the USB connector provided by the radio, e.g., between about 4.2 to 5 VDC. The antenna may also be controlled (e.g., steered) using control information from the USB connection. For example, shift registers may be used to decode a serial stream of data from and convert it to parallel data, which is then fed to an RF switch matrix to select the correct RF beam on the electronic lens for beamforming (e.g., RF lens). This is shown in overview in FIG. 13. In this example, the antenna receives power and data from the radio, including from the USB connection. Data from the USB connection may be used to control the beamforming as mentioned above, by controlling the phase angle select switch that selects between the plurality of beam ports to select the predetermined phase angle and thereby steer the beam. In FIG. 13, the RF switch matrix determines which of the beam ports to feed particular information on so that the antenna directs this information properly in space. In some variations, this circuitry is included as part of the lens circuitry on the antenna, as mentioned above.

FIGS. 14A-14M show an example of one method of connecting, configuring and aligning a phased array antenna having a separate RF radio element. In this example, the phased array antenna is configured as a phased array base station antenna for point-to-multipoint linking. The phased array antenna (without the radio) in this example has dimensions of approximately 356×568×254 mm (14.02×22.36×10 inches), weighs about 6 kg (13.23 lb.) and is formed of primarily (e.g., the housing) of injection molded polycarbonate and die cast aluminum. The apparatus shown may have a frequency range of between about 5.1-5.9 GHz and a beamwidth of approximately 18° (with an electrical down-tilt of 4°).

Figure 14C:
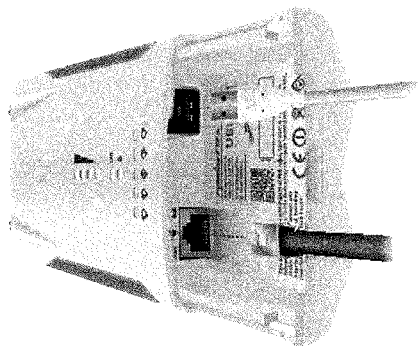
FIGS. 14A-14M illustrate one method for setting up a phased array antenna, including connecting a removable RF radio with the phased array antenna (FIGS. 14A-14H), and mounting the connected phased array antenna (FIGS. 14I-14M).
Figure 14D:
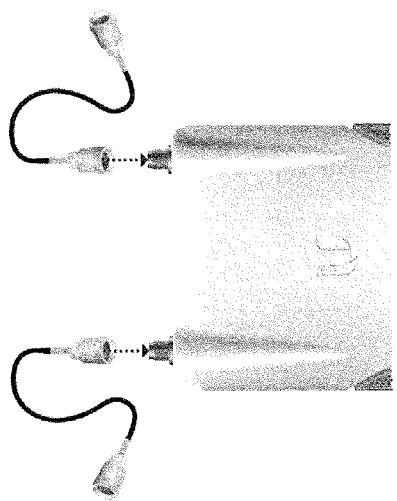
Figure 14A:
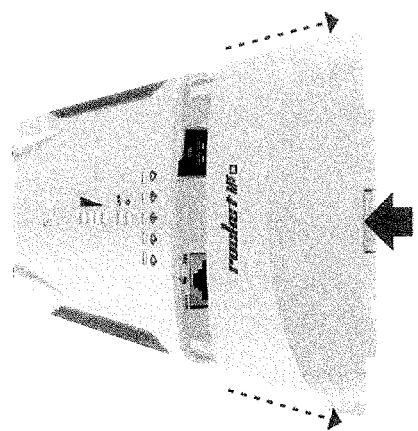
Figure 14B:
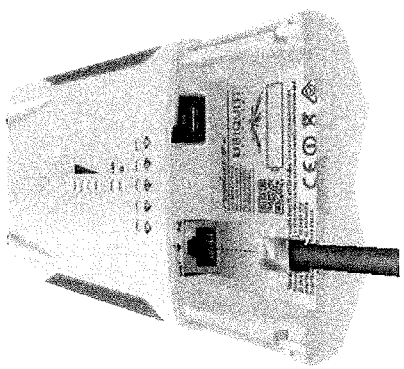

In this example, the RF radio is separate from the integrated phased array antenna, and is connected to the antenna as shown in FIGS. 14A-14H. The phased array antenna apparatus shown is similar to the variation illustrated in FIGS. 10A-F and 11, and includes a UBB port, a horizontal RF connector and a vertical RF connector, a radio mounting bracket and a cover or shroud for the RF radio once mounted to the antenna, and mounting elements for mounting the antenna to a pole or surface. In FIG. 14A, the RF radio device (shown in this example as a Ubiqiuti™ Rocket M5 AC radio, though any other appropriate transceiver may be used) is prepared for connecting to the phased array antenna by removing a cover on the radio to expose the Ethernet connector and USB port. In FIG. 14B, the Ethernet connection may be connected to an Ethernet cable. A USB cable may then be connected to the USB port, as shown in FIG. 14C, and the cover replaced over the radio device. In the example RF radio shown, the radio includes a pair of RF connectors (e.g., horizontal component connection and vertical component connection). In FIG. 14D, the connectors may be connected to RF cables.

Figure 14G:
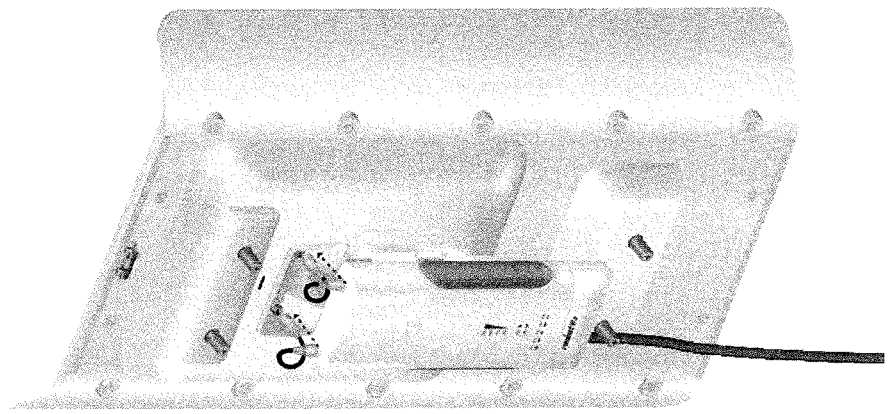
Figure 14E:
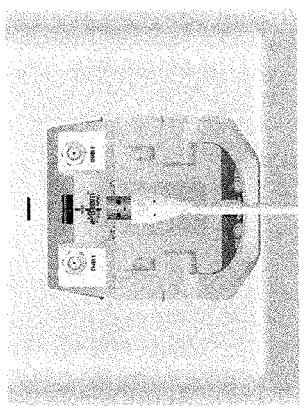
Figure 14F:
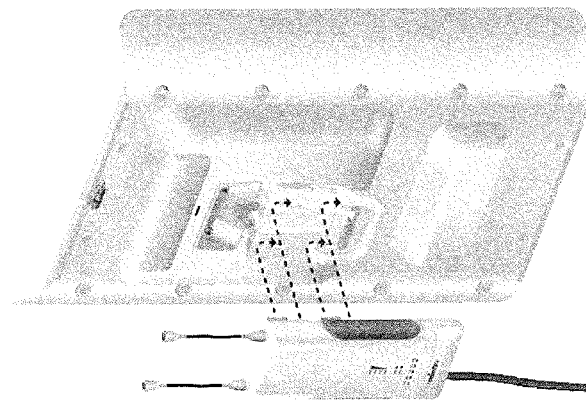
Figure 14I:
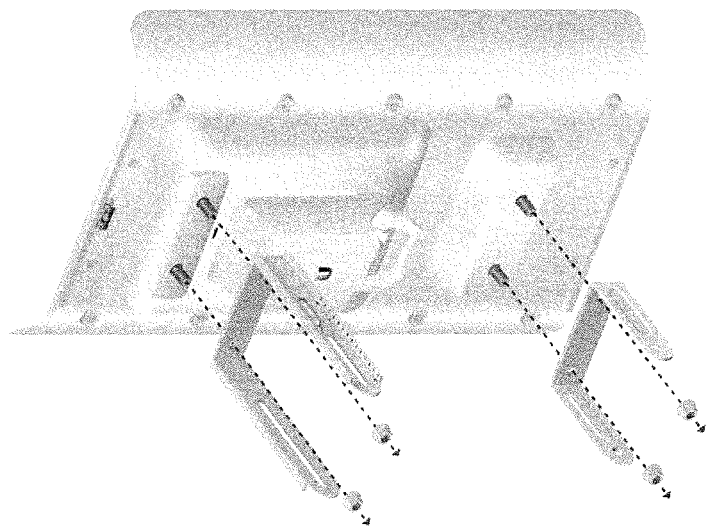
Figure 14H:
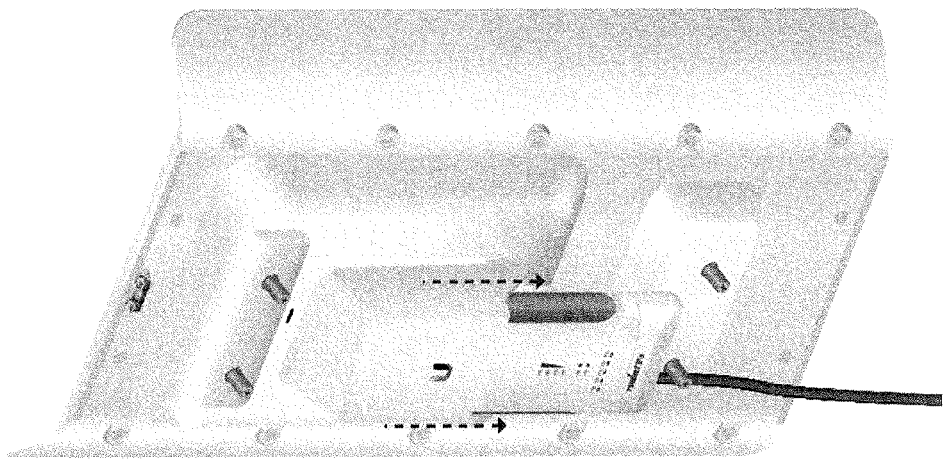
Figure 14K:
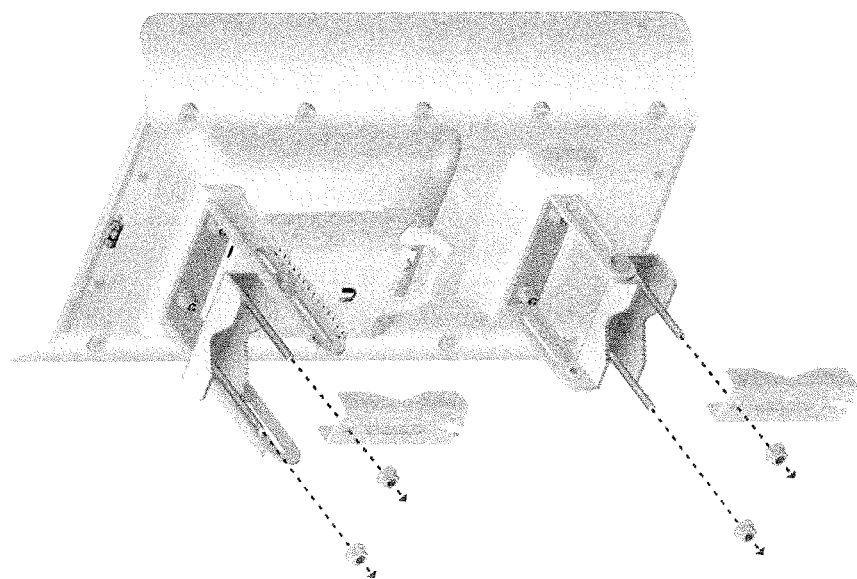

In FIG. 14E, the USB cable connected at one end to the radio device may then be connected to the antenna's USB (e.g., USB Type A) connector on the back of the antenna. Thereafter, the radio device may be mounted to the back of the antenna using the radio mounting brackets, as shown in FIG. 14F, in which the radio device is slid down into the mounting bracket until locked into place. In FIG. 14G, the other ends of the RF cables (the vertical and horizontal and/or chain 1 and Chain 0) are then connected to the connectors on the back of the antenna, and a cover (e.g., shroud) may then be positioned over the radio and locked into place, covering the connections and cables. The cover may include a seal to prevent exposure to the elements (e.g., water, etc.). As described above, connecting the radio to the antenna may also initiate or trigger detection (e.g., by the radio and/or antenna) that the connection has been made, and further, provide information to the radio device about what type of antenna the radio has been connected to, as discussed above in reference to FIGS. 12A and 12B. The radio may then configure itself for transmission on and control of the phased array antenna.

Figure 14J:
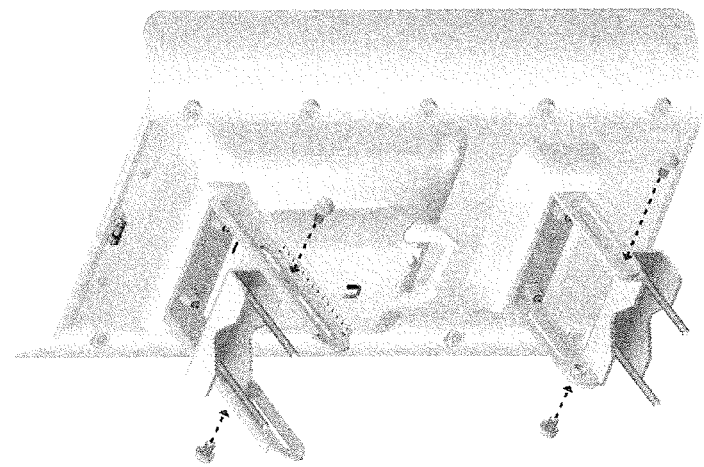
Figure 14M:
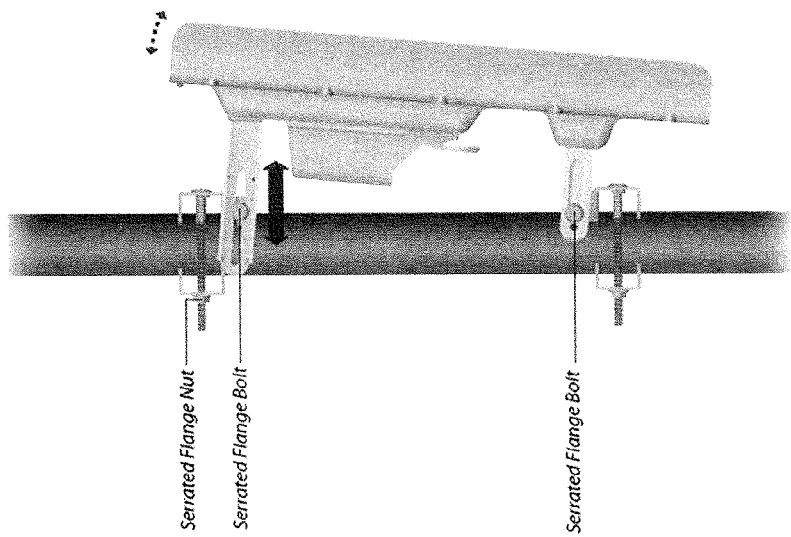
Figure 14L:
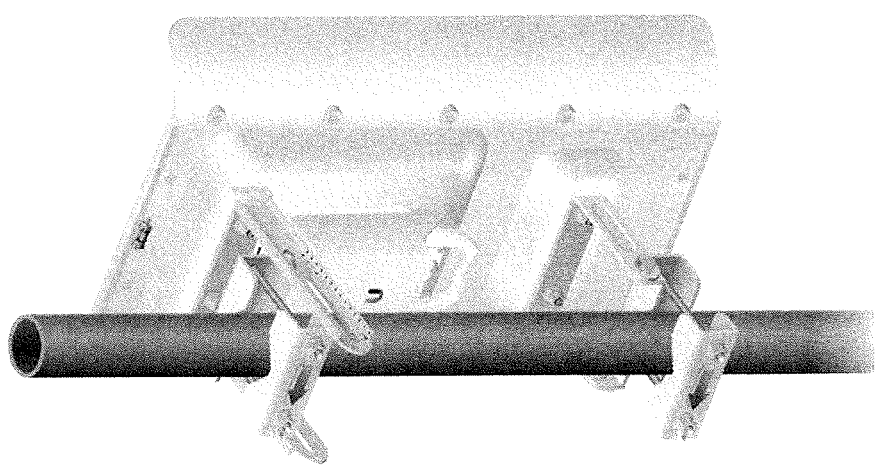

As shown in FIGS. 14H to 14M, the phased array antenna apparatus (including the radio) may be mounted to a pole, wall, tree, or any other structure or surface. For example, in FIG. 14H, U-brackets may be attached to the back of the antenna housing and secured by mounting lugs, as shown. When mounting to a pole, pole mounts may be attached to the brackets, as shown in FIG. 14J. Pole clamps may then be attached (shown in FIG. 14K) to the U-brackets and secured. Thereafter the mounting assembly may be attached to a pole, as illustrated in FIG. 14L. For example, the pole clamps may be locked onto the mounting and tightened down by bolts. In this example, the mounting assembly is configured to mount to a 38-47 mm diameter pole, but the mounts may be modified to fit any appropriate pole/surface as necessary.

Once mounted, the antenna may be adjusted ("aligned") to set the elevation and the azimuthal field of view. Since the device may be electrically steered, precise alignment may not be necessary, however adjustments may be made as shown in FIG. 14M. For example, the mounts may be adjusted to increase or decrease the tilt (elevation adjustment), and bolts may be used to tighten/clamp the device once the desired tilt is selected.

Managing an Array of Antennae

Any of the apparatuses (systems and devices) described herein may be used as part of a wireless network. Thus, described herein are wireless networks and methods and systems for managing them. Also described herein are methods and systems for managing an array of directional antennae (e.g., as a single antenna).

For example, described herein are methods and systems that may address the problem of managing an array of antennae operating as a single AP by determining the most suitable antenna from the array of antennae for a respective end device under the coverage of the AP and designating that antenna for communication between the AP and the end device. These techniques may also be adapted to determine steering angles for steering a single (or group of) phased array antennas.

An end device can be any device in wireless communication with the AP (e.g., a computer, cell phone, and tablet). The AP can periodically generate training packet for a respective antenna and transmit that packet via the corresponding antenna (or via a respective antenna in the array of antennae) to the end devices under the coverage of the antenna. Upon receiving the packet, a respective end device generates a response packet comprising priority values of one or more criteria of antenna association (e.g., signal strength) for a respective antenna and transmits the packet back to the AP. Based on the priority values, the AP designates the most suitable antenna of the array for the end device, thereby becomes trained for that end device.

For example, the priority value can be the measured signal strength of a respective antenna at the end device if the criterion is the signal strength of the AP. An end device uses the response packets to notify the AP regarding the measured signal strength of a respective antenna at the end device. The AP then designates the antenna that has the most desirable measured signal strength value for subsequent communication with that end device. Examples of other criteria include, but are not limited to, packet error rate and a modulation scheme. If packet error rate is the criterion, the number of training packets successfully received by an end device can be the corresponding antenna association information, and the priority value is the response packets can be a packet number.

Figure 15A:
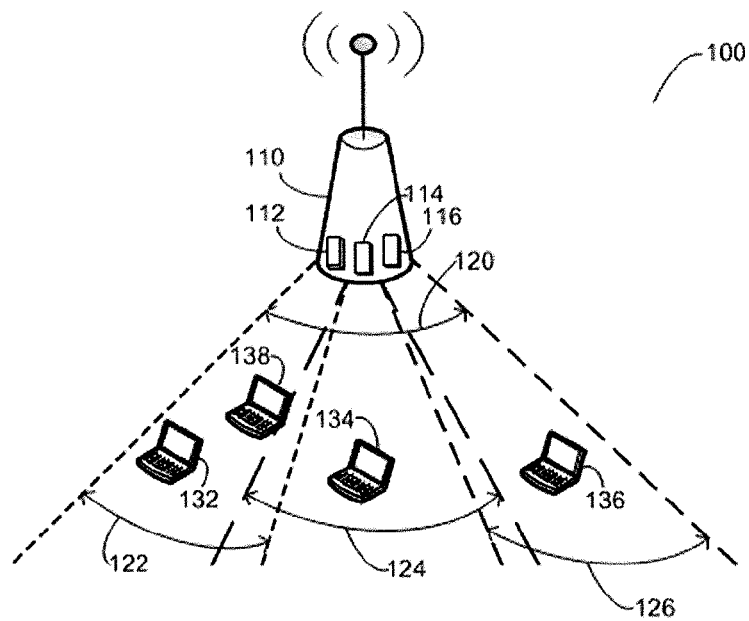
FIG. 15A illustrates an exemplary array of antennae operating as an AP.

FIG. 15A illustrates an exemplary array of antennae operating as an AP, in accordance with one embodiment. In this example, in a wireless network 100, an AP 110 includes an array of directional antennae, comprising antennae 112, 114, and 116. Externally, antennae 112, 114, and 116 appear as one single AP 110 (e.g., use the same AP identifier). Horizontal beamwidths of antennae 112, 114, and 116 are 122, 124, and 126, respectively. Beamwidths 122, 124, and 126 are overlapping with each other and together these beamwidths create beamwidth 120 for AP 110. In this way, antennae 112, 114, and 116 together facilitate the coverage provided by AP 110 via beamwidth 120, thereby operating as a single AP 110. Beamwidths 122, 124, and 126 can be different from each other (e.g., antennae 112, 114, and 116 can have different radiation patterns). In some embodiments, antennae 112, 114, and 116 provide Multiple-Input Multiple-Output (MIMO) support (e.g., support for IEEE 802.11n standard) to AP 110.

Note that, antennae 112, 114, and 116 operating as a single AP 110 is different from an AP having a plurality of sector antennae. A sector antenna typically creates a sector-shaped service area where the antenna provides wireless services. In contrast, antennae 112, 114, and 116 is managed together to operate in conjunction with each other and create a single service area indicated by beamwidth 120. End devices in that service area are provided wireless service by AP 110 via one or more of antennae 112, 114, and 116.

Because antennae 112, 114, and 116 have individual coverage areas (represented by their respective beamwidths), for antennae 112, 114, and 116 to externally appear as a single AP, these antennae have to be managed together. Suppose that a number of end devices 132, 134, 136, and 138 are under the coverage of AP 110. Physically, these end devices can be covered by different antennae. For example, even though end devices 132 and 134 consider themselves under the coverage of AP 110, end devices 132 and 134 are physically under the coverage of antennae 112 and 114, respectively.

To solve this problem, AP 110 can periodically generate training packet for a respective antenna and transmit that packet via the corresponding antenna. This training packet includes an antenna identifier of antenna that corresponding antenna. In some embodiments, a training packet is a multi-destination packet (e.g., a broadcast packet). A respective antenna can simply transmit this multi-destination packet periodically and a respective end device within the coverage of the antenna can receive the packet. For example, AP 110 can generate a training packet for antenna 112, include an identifier of antenna 112 in the training packet, and periodically transmit the packet via antenna 112. The training packet is received by a respective end device within the coverage of antenna 112 (e.g., end devices 132 and 138). Similarly, AP 110 periodically generates training packets for antennae 114 and 116, includes identifiers of antennae 114 and 116 in the corresponding packet, and transmits the corresponding packet via antennae 114 and 116, respectively.

Upon receiving the packet, a respective end device generates a response packet. For example, end device 138 receives a training packet via antenna 112, which includes an antenna identifier of identifier 112. Upon receiving the training packet, end device 138 generates a response packet comprising priority values of one or more criteria which indicates end device 138's association with antenna 112. Similarly, end device 138 also receives a training packet via antenna 114, which includes an antenna identifier of identifier 114. Upon receiving the training packet, end device 138 generates a response packet comprising priority values of one or more criteria which indicates end device 138's association with antenna 114.

The priority value can be the measured signal strength of antenna 112 at end device 138 if the criterion is the signal strength. In the response packet, end device 138 includes the identifier of antenna 112 and the signal strength of antenna 112 measured at end device 138, and transmits the packet to AP 110. Similarly, in response to the training packet from antenna 114, end device 138 measures signal strength of antenna 114 at end device 112. In the response packet, end device 138 includes the identifier of antenna 114 and the signal strength of antenna 114 measured at end device 138, and transmits the packet to AP 110.

AP 110 receives the response packets for antennae 112 and 114, extracts the respective measured signal strengths form the respective packets, and determines which of antennae 112 and 114 has better measured signal strength at end device 138. In some embodiments, AP 110 extracts the measured the signal strength (or any other priority values associated with any other criteria) from a plurality response packets over a period of time and designates an antenna for end device 138 based on current and historical values (e.g., via a running average). Suppose that antenna 112 has better measured signal strength at end device 138. AP 110 then assigns antenna 112 for data communication between AP 110 and end device 138, thereby training AP 110 for designating an antenna from the array of antennae for end device 138. Antenna 112 can then be referred to as the designated antenna for end device 138.

In the same way, AP 110 uses training packers to determine antenna 112, 114, and 116 to be the designated antennae for communicating with end devices 132, 134, and 136, respectively. This way of training an AP for designating an antenna for an end device based on actively receiving response packet can be referred to as active learning. Once AP 110 is trained for an end device, AP 110 uses the designated antenna to communicate with the end device. Communication from AP 110 to the end device can be referred to as downstream communication, and communication from the end device to AP 110 can be referred to as upstream communication.

In some embodiments, AP 110 continues to periodically transmit training packets even when all end devices in the coverage of AP 110 has a designated antenna. If an end device moves into the coverage of AP 110, the priority values associated with the end device can change. As a result, via the continuous transmission of training packets, AP 110 can be retrained and select a different designated antenna for the end device. Furthermore, when a new end device moves into the coverage of AP 110, this new end device receives the training packets and sends corresponding respond packets back. This allows AP 110 to designate an antenna for the new end device.

Radiation from a respective antenna in AP 110 can have a vertical polarity and a horizontal polarity. The horizontal and vertical polarities indicate the orientation of the electric field of the radio wave generated by the antenna. In this way, antennae 112, 114, and 116 can have a combination of six orientations at which AP 110 can radiate radio waves. When AP 110 designates an antenna to an end device, AP 110 can use both horizontal and vertical polarizations of the antenna to communicate with the end device.

In some embodiments, AP 110 can use one or more of vertical and horizontal polarizations of any of antennae 112, 114, and 116 to communicate with an end device. Under such a scenario, AP 110 assigns an identifier to a respective polarization of a respective antenna. When AP 110 sends training packet via a respective polarization of antennae 112, 114, and 116, AP 110 includes the identifier of that polarization in the corresponding training packet. Upon receiving response packets for the corresponding polarization, AP 110 designates one or more of the vertical and horizontal polarizations of any of antennae 112, 114, and 116 to an end device. For example, based on the training, AP 110 can designate antenna 112's radio wave with horizontal polarization for communicating with end device 132. In another example, AP 110 can designate antenna 112's radio wave with vertical polarization and antenna 114's radio wave with horizontal polarization for communicating with end device 138. In further embodiments, for a particular end device, AP 110 may use two antennas simultaneously, one with horizontal polarization and the other with vertical polarization. Such configuration could be useful in indoors applications because obstacles (such as walls and ceilings) often respond differently to different polarizations, and using one antenna with horizontal polarization in one direction and another antenna with vertical polarization in another direction could be the most effective way of communicating with an end device.

In some embodiments, AP 110 uses contention-based medium sharing scheme which requires each end device to contend for bandwidth from AP 110 (e.g., to obtain permission for transmission to/from AP 110) and send acknowledgement for each received packet. A contention-based medium sharing scheme can be based on Institute of Electrical and Electronics Engineers (IEEE) 802.11 family of standards. Under such a scenario, AP 110 sends individual training packet to end devices 132, 134, 136, and 138. Upon receiving the packet, a respective end device sends an acknowledgement back to AP 110. AP 110 measures the priority values associated with the one or more criteria based on the acknowledgement.

If the criterion is signal strength, AP 110 measures the signal strength of a respective received acknowledgement packet and determines the designated antenna based on the measured signal strength values for a respective end device. For example, AP 110 measures the signal strength of the acknowledgement packets from end device 138. AP 110 can measure the signal strength (or any other priority values associated with any other criteria) for a plurality of acknowledgement packets over a period of time. Suppose that AP 110 determines that the signal strength of the received acknowledgement packets from end device 138 via antenna 114 is the strongest. In response, AP 110 designates antenna 114 for communicating with end device 138. This way of training an AP for designating an antenna for an end device based on receiving wireless acknowledgement can be referred to as passive learning.

Figure 15B:
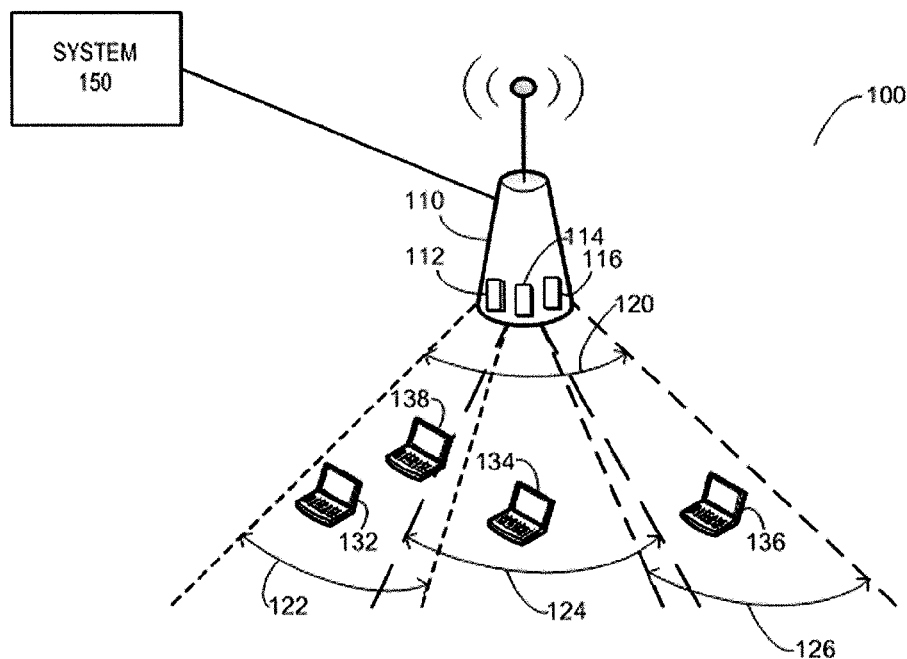
FIG. 15B illustrates an exemplary system managing an array of antennae operating as an AP.

In some embodiments, AP 110 can be managed by a remote system. FIG. 15B illustrates an exemplary system managing an array of antennae operating as an AP. In this example, system 150 (e.g., a computing system) is coupled to AP 110 via one or more wired and/or wireless link. System 150 can locally generate training packets, and send the training packets to AP 110, or can instruct AP 110 to generate the training packets. Upon receiving the response packets, AP 110 can send the response packets to system 150, which in turn extracts the priority values from the response packets, and designates an antenna for a respective end device. AP 110 also can extract the priority values from the received response packets and send the extracted priority values to system 150, which in turn designates an antenna for a respective end device.

Figure 15C:
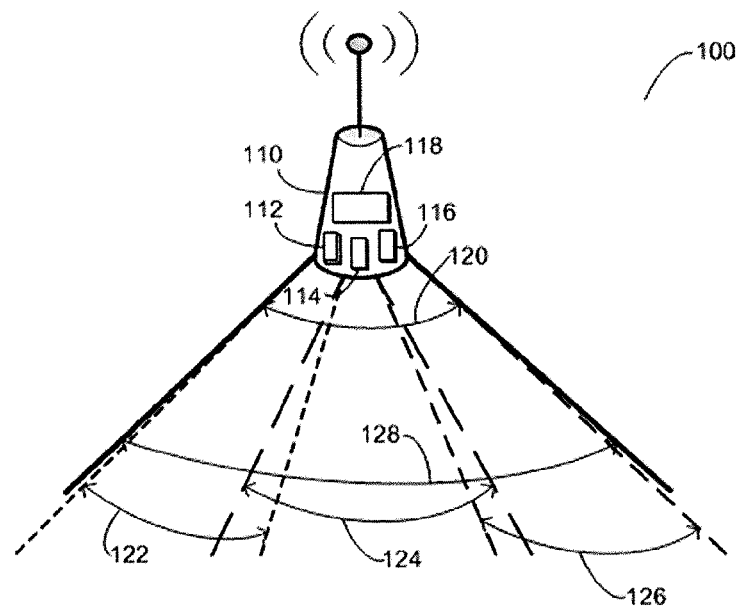
FIG. 15C illustrates an exemplary an array of antennae, which includes a broadcast antenna, operating as an AP.

In the example in FIG. 15A, to send a multi-destination packet across beamwidth of 120, AP 110 sends the packet via antennae 112, 114, and 116. To solve this problem, the array of antennae in AP 110 can include a broadcast antenna. FIG. 15C illustrates an exemplary an array of antennae, which includes a broadcast antenna, operating as an AP. In this example, AP 110 includes a broadcast antenna 118 with a beamwidth 128, which fully overlaps with beamwidth 120. If AP 110 needs to send a multi-destination packet (e.g., a broadcast, a multicast, or an unknown unicast packet), instead of sending the packet individually via antennae 112, 114, and 116, AP 110 transmits the packet via antenna 118 to end devices 132, 134, 136, and 138. Furthermore, when AP 110 has not been trained for an end device (e.g., a new end device has moved into the coverage of AP 110), AP 110 can use antenna 118 to communicate with that end device.

Figure 15D:
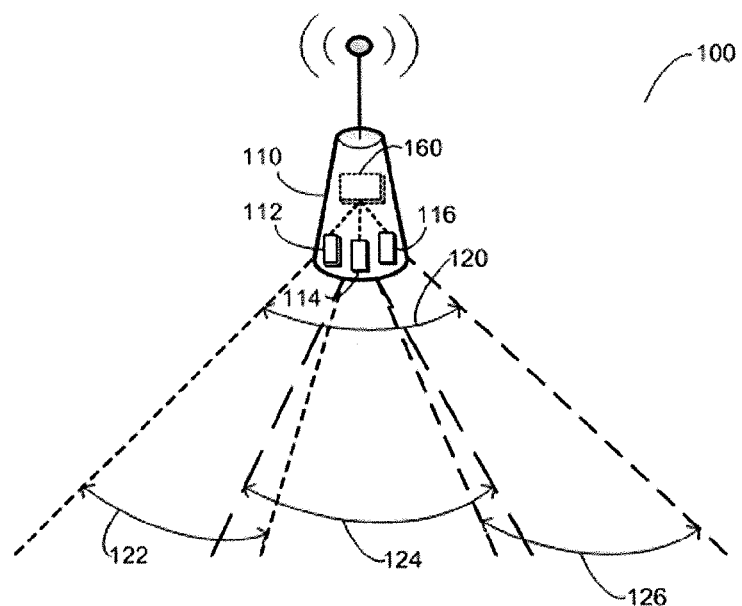
FIG. 15D illustrates an exemplary an array of antennae, which includes a virtual broadcast antenna, operating as an AP.

FIG. 15D illustrates an exemplary an array of antennae, which includes a virtual broadcast antenna, operating as an AP. In this example, AP 110 includes a virtual broadcast antenna 160, which is logically coupled to antennae 112, 114, and 116. If AP 110 needs to send a multi-destination packet, AP 110 sends the packet to virtual broadcast antenna 160. As a result, the corresponding radio frequency (RF) signal is sent to antennae 112, 114, and 116. In turn, each of antennae 112, 114, and 116 transmits the packet in its corresponding coverage area. In this way, the packet is transmitted across beamwidth 120 toward end devices 132, 134, 136, and 138.

FIG. 16A presents a flowchart illustrating an exemplary process of an AP actively learning antenna association of end devices. During operation, the AP constructs training packets comprising the corresponding antenna identifier for respective antenna (operation 202) and transmits the training packets via corresponding antenna of the AP (operation 204). In some embodiments, the training packets are multi-destination packets. The AP receives response packets corresponding to the training packets from respective end device (operation 206). The AP then extracts the corresponding antenna identifier and priority values of one or more criteria from received response packets (operation 208). For a respective received response packet, the AP identifies the antenna associated with the extracted priority values from the response packet based on the extracted antenna identifier (operation 210). This operation allows the AP to associate the priority values with the antenna for which an end device has determined the priority values. For a respective end device, the AP then determines the designated antenna based on the extracted the priority values (operation 212). In some embodiments, the AP extracts the priority values from a plurality response packets over a period of time and designates an antenna for an end device based on current and historical values (e.g., via a running average).

FIG. 16B presents a flowchart illustrating an exemplary process of an end device facilitating active learning of antenna association. During operation, the end device receives a training packet comprising antenna identifier from an AP (operation 254) and determines the priority values of one or more criteria (operation 254). The end device then constructs a response packet for corresponding antenna comprising the antenna identifier and the determined priority values (operation 256) and transmits the response packet to the AP (operation 258). In some embodiments, the end device transmits the response packet to the antenna associated with the antenna identifier. Examples of a criterion include, but are not limited to, signal strength, packer error rate, and a modulation scheme. Examples of a priority value include, but are not limited to, measured signal strength at an end device, a packet identifier, and the bit error rate associated with a modulation scheme.

Figure 17:
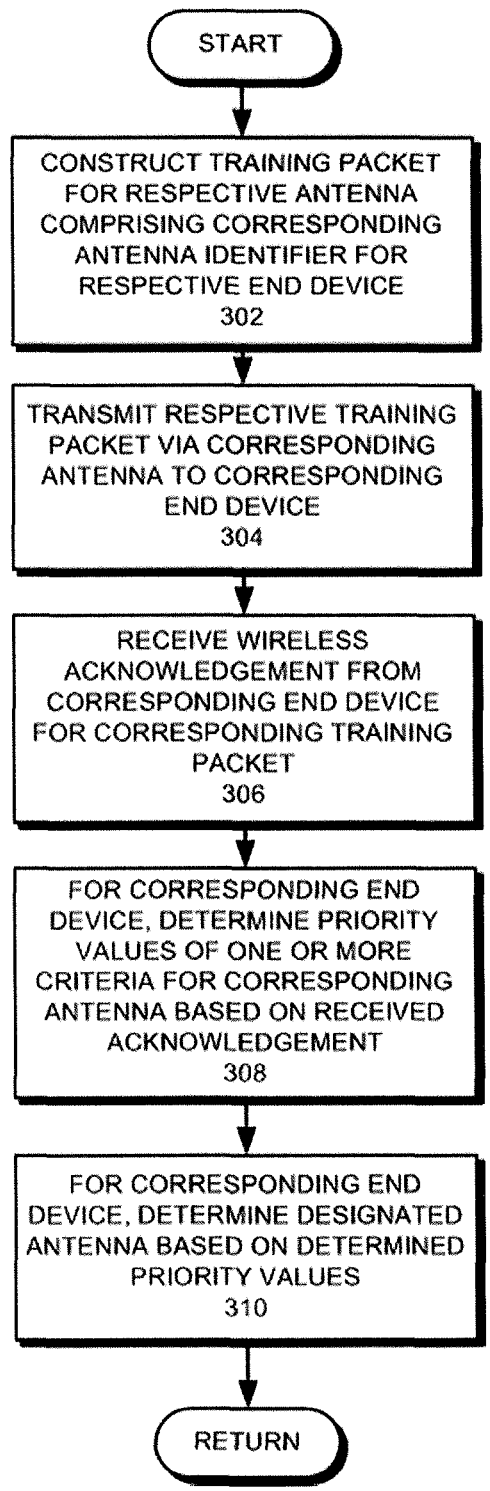
FIG. 17 presents a flowchart illustrating an exemplary process of an AP passively learning antenna association of end devices.

In some embodiments, an AP uses contention-based medium sharing scheme which requires each end device to contend for bandwidth from the AP (e.g., to obtain permission for transmission to/from the AP) and send acknowledgement for each received packet. In some embodiments, an FIG. 17 presents a flowchart illustrating an exemplary process of an AP passively learning antenna association of end devices. During operation, the AP constructs a training packet for a respective antenna comprising the corresponding antenna identifier for a respective end device (operation 302). The AP then transmits the training packet via the corresponding antenna (i.e., the antenna associated with the antenna identifier) of the AP to the corresponding end device (i.e., the end device for which the training packet is intended for) (operation 304). The AP receives a wireless acknowledgement from the corresponding end device for the corresponding training packet (operation 306). In some embodiments, the wireless acknowledgement is based on the IEEE 802.11 family of standards. For the corresponding end device, the AP determines the priority values of one or more criteria for the corresponding antenna based on the received acknowledgement (operation 308) and determines the designated antenna based on determined priority values (operation 310). In some embodiments, the AP determines the priority values from a plurality acknowledgement packets over a period of time and designates an antenna for an end device based on current and historical values (e.g., via a running average).

Figure 18:
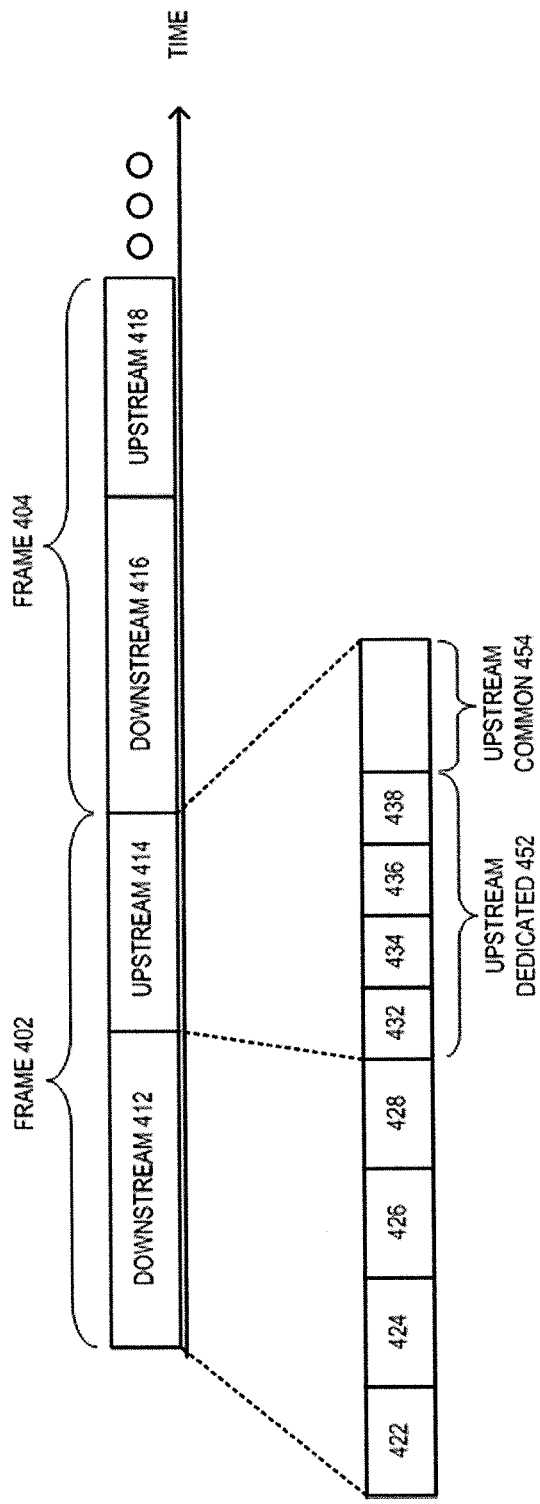
FIG. 18 presents an exemplary time-division multiple access (TDMA) channel access method of an AP.

FIG. 18 presents an exemplary TDMA channel access method of an AP. The AP divides its communication time into a plurality of timeframes 402 and 404. A respective timeframe includes an upstream part and a downstream part. For example, timeframe 402 includes an upstream part 412 and a downstream part 414, and timeframe 404 includes an upstream part 416 and a downstream part 418.

The AP divides the downstream part of a timeframe into timeslots among the end devices under its coverage. In some embodiments, the timeslots of downstream part 412 are not equal and can be based on the bandwidth requirement and/or provisioning of an end device. If the AP has four end devices under its coverage, as described in conjunction with FIG. 15A, the AP divides upstream part 412 into four timeslots 422, 424, 426, and 428, and allocate a timeslot for a corresponding end device. The AP transmits downstream packets to an end device during its allocated timeslot.

The AP divides the upstream part of a timeframe into a dedicated part 452 and a common part 454. The AP further divides dedicated part 452 into timeslots among the end devices under its coverage. In some embodiments, timeslots of dedicated part 452 are not equal and can be based on the bandwidth requirement and/or provisioning of an end device. If the AP has four end devices under its coverage, as described in conjunction with FIG. 15A, the AP divides dedicated part 452 into four timeslots 432, 434, 436, and 438, and allocate a timeslot for a respective end device with more packets than a threshold. The end device transmits upstream packets to the AP during its allocated timeslot. If an end device does not have more packets than a threshold, the end device contend with other end devices under the coverage of the AP during common part 454 and transmits the packet to the AP if the end device is allowed to transmit based on the contention. In some embodiments, the contention is based on IEEE 802.11 family of standards. Note that the end devices with downstream timeslots can also contend during common part 454.

Figure 19A:
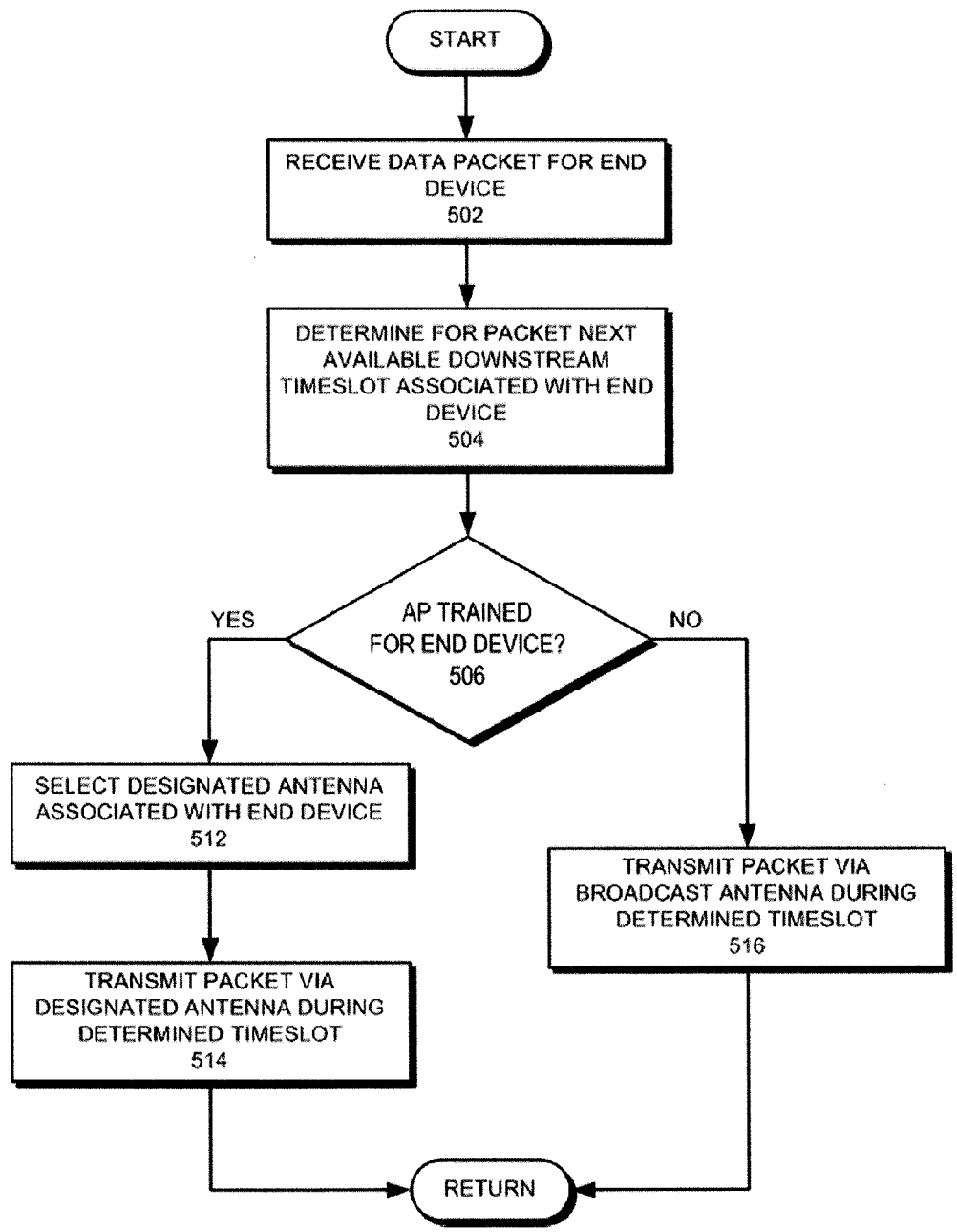
FIG. 19A presents a flowchart illustrating an exemplary downstream transmission process of an AP.

FIG. 19A presents a flowchart illustrating an exemplary downstream transmission process of an AP. During operation, the AP receives a data packet for an end device (operation 502) and determines for the packet the next available downstream timeslot associated with the end device (operation 504). The AP then checks whether the AP has been trained for the end device (operation 506). If the AP has been trained for the end device, the AP selects the designated antenna associated with the end device (operation 512) and transmits the packet via the designated antenna during the determined timeslot (operation 514). Otherwise, the AP transmits the packet via a physical/virtual broadcast antenna during the determined timeslot (operation 516), as described in conjunction with FIGS. 15C and 15D. This allows the AP to transmit packets to an end device for which the AP has not been trained for an antenna association (e.g., when a new end device comes under the coverage of the AP).

Figure 19B:
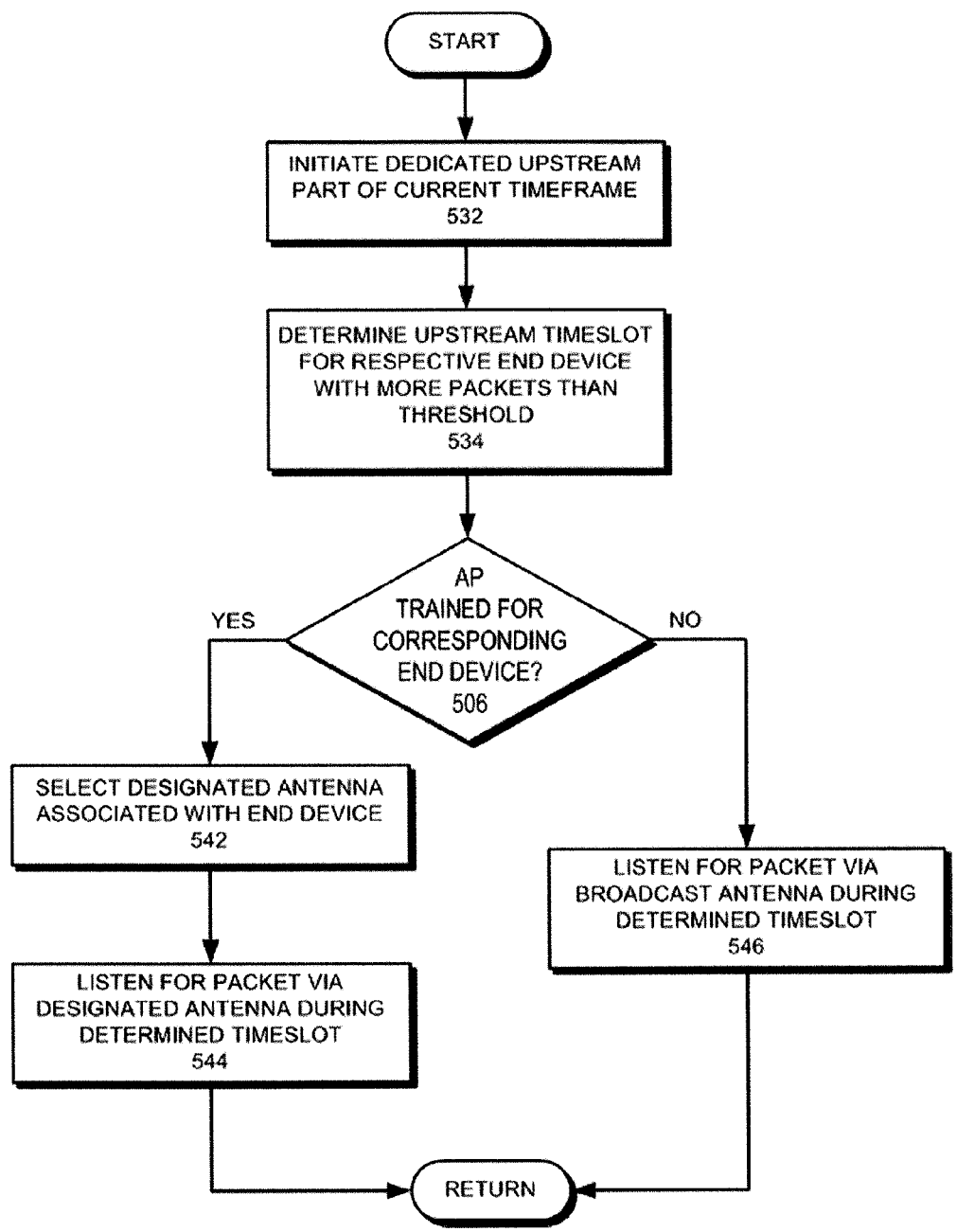
FIG. 19B presents a flowchart illustrating an exemplary upstream reception process of an AP based on dedicated timeslots.

FIG. 19B presents a flowchart illustrating an exemplary upstream reception process of an AP based on dedicated timeslots. During operation, the AP initiates dedicated upstream part of current timeframe (operation 532) and determines a timeslot for a respective end device with more packets than a threshold (operation 534). An end device can notify the AP regarding the number of packets (or the amount of data) to be transmitted to the AP (e.g., via piggybacking or messaging). The AP then checks whether the AP has been trained for the corresponding end device (operation 536). If the AP has been trained for the corresponding end device, the AP selects the designated antenna associated with the end device (operation 542) and listens for a packet via the designated antenna during the determined timeslot (operation 544). Otherwise, the AP listens for a packet via a physical/virtual broadcast antenna during the determined timeslot (operation 546). In this way, the AP can receive a packet from an end device for which the AP has not been trained for an antenna association (e.g., when a new end device comes under the coverage of the AP).

Figure 19C:
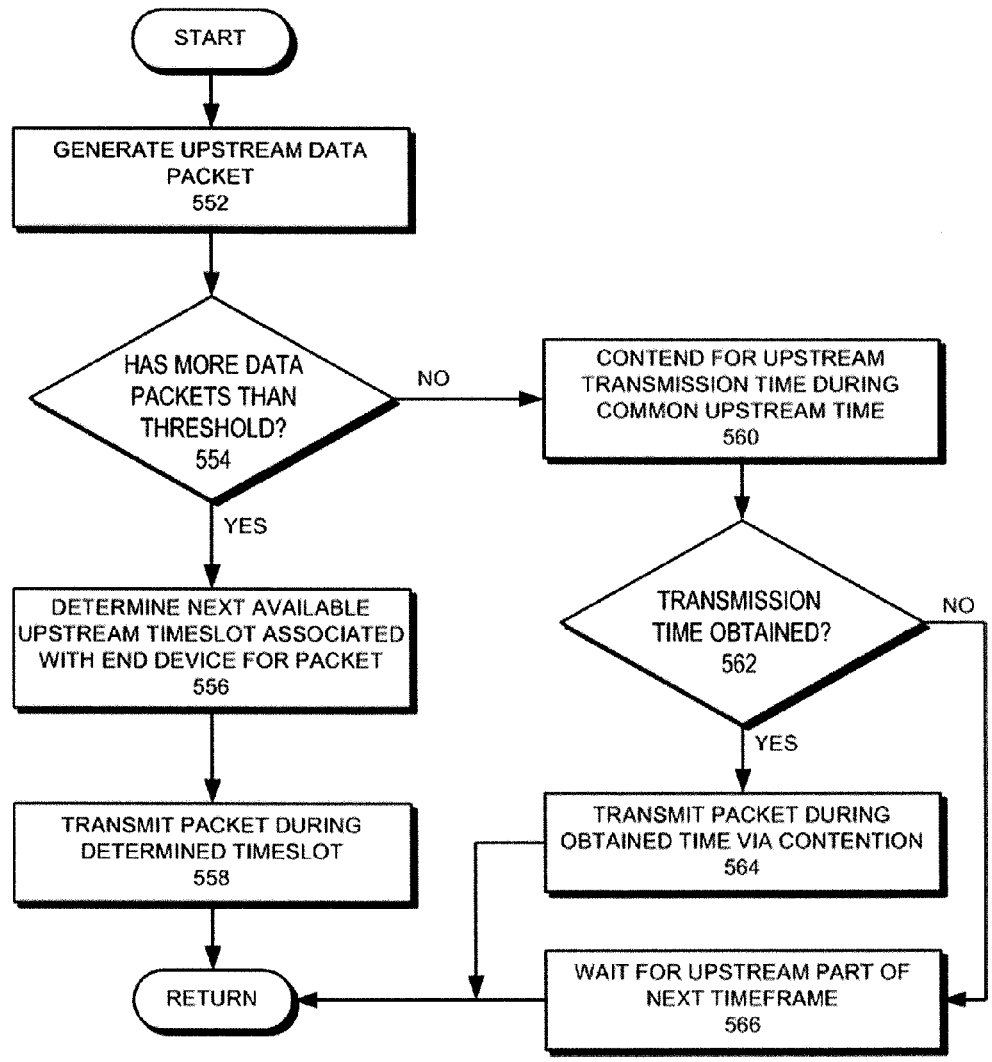
FIG. 19C presents a flowchart illustrating an exemplary upstream transmission process of an end device.

FIG. 19C presents a flowchart illustrating an exemplary upstream transmission process of an end device. During operation, the end device generates an upstream data packet (operation 552) and checks whether the end device has more data packets than a threshold (operation 554). If so, the end device determines the next available upstream timeslot associated with end device for the packet (operation 556) and transmits the packet during determined timeslot (operation 558). Otherwise, the end device contends for upstream transmission time during the common upstream time (operation 560) and checks for obtained transmission time via contention (operation 562). If the end device has obtained transmission time via contention, the end device transmits the packet during obtained time via contention (operation 564). Otherwise, the end device waits for the upstream part of the next timeframe (operation 566).

Exemplary AP System

Figure 20:
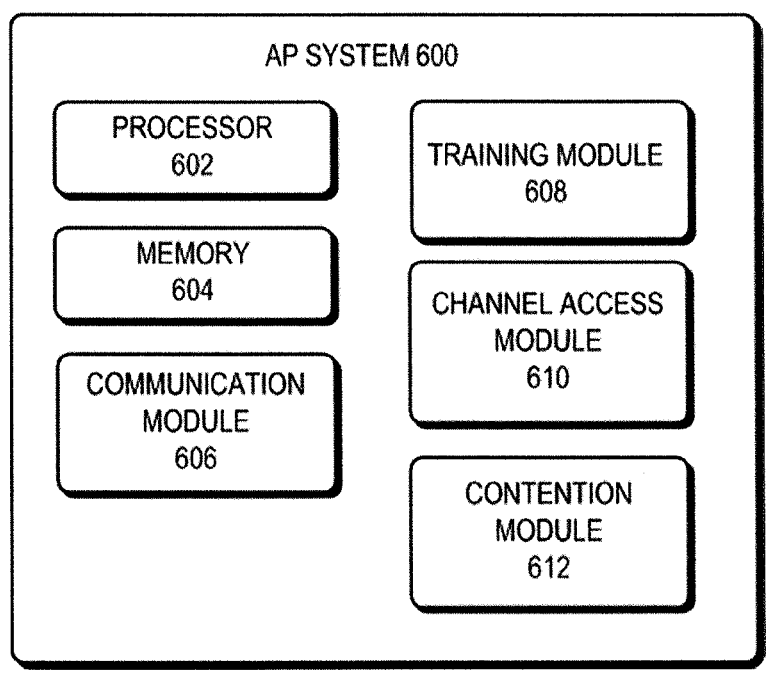
FIG. 20 illustrates an exemplary AP system that comprises an array of antennae operating as the AP system.

FIG. 20 illustrates an exemplary AP system that comprises an array of antennae operating as the AP system. In this example, an AP system 600 includes a processor 602, a memory 604, and a communication module 606, which can include a radio transceiver and an array of antennae (not shown). Communication module 606 communicates with a respective end device, as described in conjunction with FIGS. 19A and 19B.

Also included in AP system are a training module 608, a channel access module 610, and a contention module 612. During operation, training module 608 trains a respective end device for designating an antenna from the array of antennae for the end device, as described in conjunction with FIGS. 16A and 3. Channel access module 610 facilitates channel access to end devices, as described in conjunction with FIG. 18. Contention module 612 facilitates contention-based channel access, as described in conjunction with FIGS. 17 and 18.

Figure 8B:
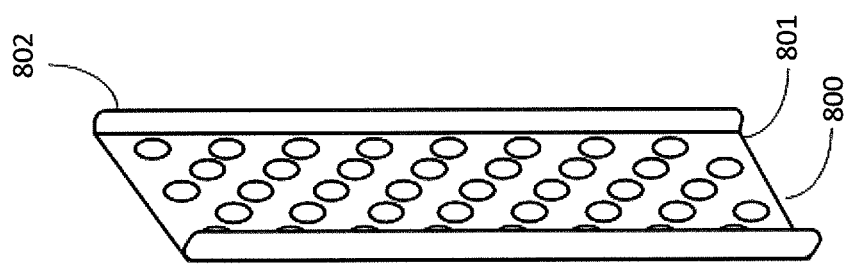
FIG. 8B is a side perspective view of the antenna array shown in FIG. 8A.
Figure 8A:
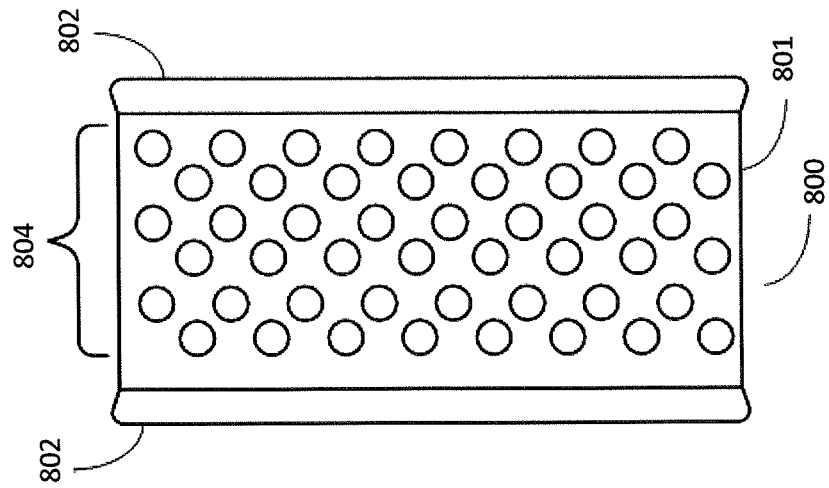
FIG. 8A shows a front perspective view of an exemplary antenna array having a plurality of emitting elements arranged in vertical groups similar to the variation shown in FIGS. 3E and 6B.
Figure 9A:
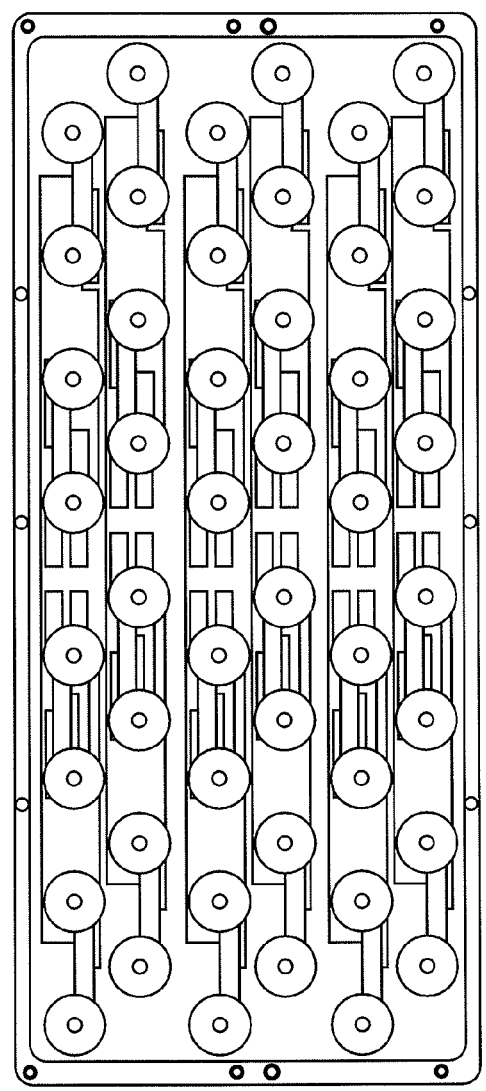
FIG. 9A is a front view of another example of antenna (emitter) elements of a phased array antenna.
Figure 9B:
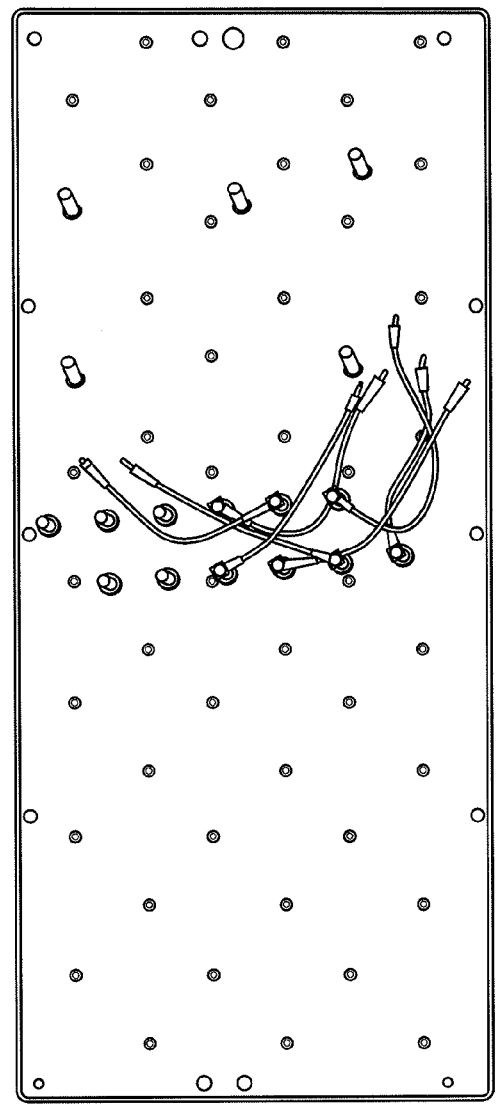
FIG. 9B is a back view of the phased array antenna emitter elements shown in FIG. 9A.
Figure 9C:
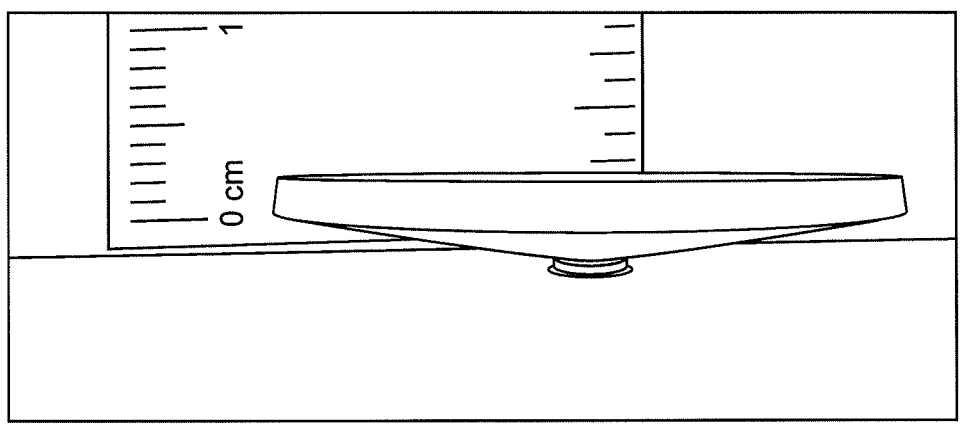
FIG. 9C shows one example of an antenna (emitter) element of the phased array antenna of FIG. 9A.

FIG. 8A illustrates an exemplary antenna array, and FIG. 8B presents a perspective view of this antenna array. In this example, an antenna system 800 includes an array of antenna elements 804 which are placed on a housing 801. Note that during normal operation housing 801 may also include a cover which protects antenna elements 804 from the elements of weather. Housing 801 also includes a pair of flares 802, which are made from metal and extend at an angle. Flares 802 improve rejection of noise from directions that are not useful for antenna system 800, such as from behind or on the sides of antenna system 800.

In one embodiment, antenna element array 804 may include a number of columns of antenna elements. One column (for example, the right-most column) can be used to transmit omni-directional signals (i.e., the signals are transmitted through these elements in a pass-through mode). The rest of the columns of antenna elements are used to generate directional beam transmission based on phase change introduced to the signal path to each antenna elements. In one embodiment, a subset of the antenna elements are used for transmission of horizontally polarized signals and phase manipulation is used to achieve different beam directions for such horizontally polarized signals, as a result of interference of signals transmitted by these antenna elements. Similarly, another subset of the antenna elements is used for transmission of vertically polarized signals in various directions.

In one embodiment, antenna system 800 can also include a signal processing module which is responsible for distributing the signals to antenna elements 804 and facilitating appropriate phase changes to the signals to achieve the desired beam directions.

Figure 22:
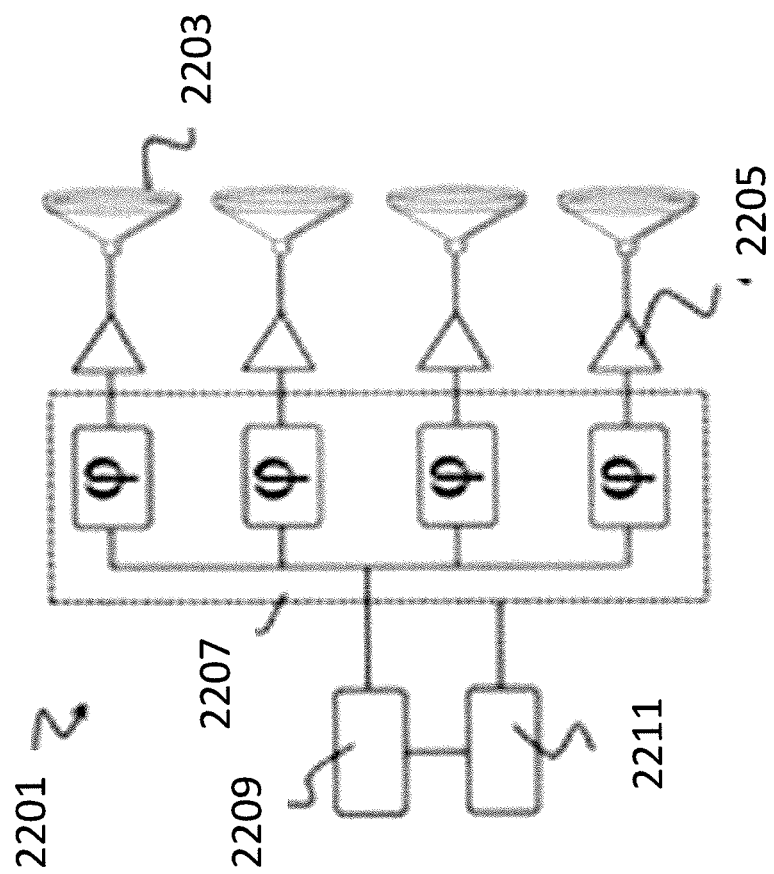
FIG. 22 is another example of a system including an array of antennas or antenna elements, each phase shifted (e.g., to steer) that may be controlled as an AP system as described herein.

As mentioned above, a phased array antenna (as illustrated in FIGS. 1A-3E above) is another example of an AP system that comprises an array of antennae elements that can be operated as the AP system described above. In this example, the AP system includes a processor, a memory, and a communication module, which can include a radio transceiver and an array of antennae (the phased array antenna). A communication module communicates with the various devices to which the phased array antenna is aimed. FIG. 22 is another example of a system 2201 of a phase-shifted set of antennas that may be operated as described herein; in this example, a plurality of antennas 2203 each receive phase-shifted input 2207 that is delayed 2205 in a predetermined manner. The inputs 2209, 2211 may be from a single radio device (e.g., having a vertical and horizontal polarization).

Figure 21:
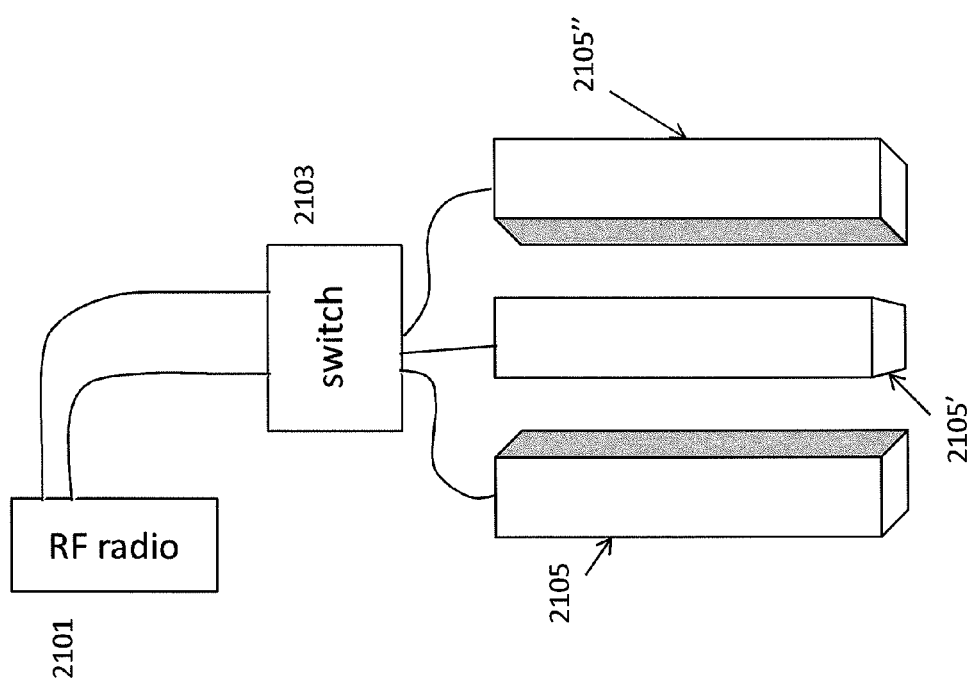
FIG. 21 is another example of a system including an array of sector antennas that may be controlled as an AP system as described herein.

Similarly, the array of antennas may be an array of sector antennas, as illustrated in FIG. 21. In this example three sector antennas 2105, 2105', 2105" are connected to a single radio device 2101 through a switch 2103. The system may be controlled as described above to operate as an AP system.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

In some variations of the phased array antenna devices (such as those configured to operate as access points) described herein, the apparatus may include a plurality of antenna emitting elements such as those shown in FIG. 6B, but RF beam forming may be performed using a plurality of phase shifting elements, as shown in FIG. 22. As discussed above, a controller may select the phase angles to set the phase shifting elements to steer the beam (e.g., select a directional beam) from the device. Such a configuration may be particularly helpful when TDMA is used in which the apparatus can assign each of a plurality of station devices that communicate with the access point (and particularly stationary access points) a directional beam (as described above, e.g., by transmitting training packets and receiving response packets). The methods described herein permit training with relatively low overhead demands, as training packets don't have to be transmitted very often. Any of these methods may also allow the access point apparatus to associate multiple directional beams to the same antenna, including one for receiving data from the station at the AP (uplink directional beam) and transmitting data to the station from the AP (downlink directional beam). In addition, any of the systems described herein may also be configured for operation as MIMO (multiuser MIMO) systems; for example, both horizontal and vertical polarizations may be used for transmission/reception between the AP and a station.

In the apparatuses and devices described herein, assigning a directional beam to a station may be done iteratively, particularly in variations in which a phase shifting array is used to form the directional beam(s). Any of these systems may have a large number of possible directions (e.g., phase angles) for the beamforming, based on the signals sent to each of the phase shift elements in the array of phase shifters. Thus, in some variations, an iterative process of selecting an initial range of directional beams that are broadly separated (e.g., five directional beams, extending between −45 and +45) may be initially used. When information received from one or more response packet specific to a device indicates the "best" directional beam (e.g., based on the criteria for directional beam selection described above), a second (or more) round of training packets may be sent out over a narrower range of directional beams, e.g., if the best response packet corresponded to the −22.5 directional beam, then the next five training packets may be between −32.5 and −12.5. This process may be repeated again for each station, either separately for each station or as a group for some of the stations. Thus, the assignment of directional beams to specific target devices may be fine-tuned.

As mentioned above, e.g., in reference to the response packets described herein typically refer to a particular directional beam, station, and one or more criteria for directional beam selection. For example, a criteria for selecting the directional beam (the "goodness" of a particular directional beam) may include information such as the CINR, or carrier to interference noise ratio. This information may indicate an interferer that is relevant only in one direction (e.g., upstream transmission) and may therefore allow the selection of different upstream and downstream directional beams, as described above.

For example, an AP apparatus may send out a common training packet (e.g., from each directional beam or from a broadband beam spanning all or most beam angles) during beam training. CINR may be included as part of the information transmitted. For example, an AP may be using a specific beam combination (e.g., the AP could get a reading for Tx and Rx for each station device, including the CINR). An interfere may be present in a given direction, e.g., from nearby beams that are close (but not too far away) that the system may want to avoid. A beam training packet (e.g., broadcast packet) may be used to minimize the link capacity for learning packets. The AP may assign a special slot to send back beam training packets during operation. For downlink there may not be a special slot when, e.g., a general training packet is broadcast to all stations. There may be contention in the uplink, because there may be multiple stations, which can't be 'heard' by the AP at the same time. The AP may assign slots (e.g., uplink/downlink time slots) dynamically and based on requirement, rather than dedicating a slot to each station, in order to enhance efficiency, so that only those stations that have a need to transmit to the AP above a threshold value (or other otherwise prioritized) may be assigned a predetermined slot. In the contention period (or common period), the AP may receive signal from any of the stations, those that did not require a dedicated slot of time or needed slightly more time than permitted by the assigned slot. The AP may therefor dedicate a training slot to send CINR training packet, so as to avoid collision. When the AP provides CINR training slots, so that the AP will listen on a particular beam, the CINR may be transmitted and used to determine assignment of directional beams and/or rate of transfer information. For example, CINR may be encoded in one bit, so that each station has a time-series value for CINR; once the AP puts a beam dimension to the CINR training value, it may bin this according to the directional beam, and it can be sorted based on CINR (e.g., beam and time). Adding another dimension (beam) and each beam will have a time series of CINR values). Thus, the use of CINR values, either as part of the training packet or as part of a separate packet may enhance the determination of the directional beam for each station.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A phased array antenna apparatus, the apparatus comprising:
   an antenna housing enclosing a two-dimensional (2D) array of antenna emitters forming two or more vertical columns of emitting surfaces arrange in a flat plane within the antenna housing;
   a radio frequency (RF) transceiver and steering subsystem connected to the 2D array of antenna emitters, and configured to generate a plurality of RF signals that are phase shifted relatively to each other for beamforming of the plurality of RF signals emitted by the two dimensional array of antenna emitters, wherein the RF transceiver and steering subsystem comprises a radio device and a lacunated lens, wherein the lacunated lens has a body having at least two parallel plates separated by a dielectric material and multiple openings at least partially through the body of the lens, wherein the openings are arranged in the body so that an RF signal entering the body will exit from at a time delay corresponding to a predetermined steering angle that corresponds to where the RF signal entered the body; and
   two or more RF connectors on a back of the antenna housing, configured to connect the radio device to the two-dimensional array of antenna emitters.

2. The device of claim 1, wherein each antenna element of the array of antenna elements comprises a line of emitting elements.

3. The apparatus of claim 1, wherein the radio frequency (RF) transceiver and steering subsystem comprises a plurality of phase shifters, wherein each phase shifter is connected to the RF transceiver and wherein steering subsystem is configured to set a phase angle for each of the phase shifters.

4. The apparatus of claim 1, wherein the radio frequency (RF) transceiver and steering subsystem is configured to periodically transmit a training packet at each of a plurality of directional beams, wherein the training packet encodes an identifier of the directional beam.

5. The apparatus of claim 1, wherein the radio frequency (RF) transceiver and steering subsystem is separable into an RF transceiver having one or more RF outputs and a steering controller coupled to the one or more RF outputs.

6. The apparatus of claim 1, wherein the radio frequency (RF) transceiver and steering subsystem is configured to assign the directional beam to a station device based on the response packet received from the station device, wherein the response packet includes an identifier of a directional beam and a priority value associated with one of the training packets.

7. The apparatus of claim 1, further wherein the radio frequency (RF) transceiver and steering subsystem is configured to periodically transmit training packets at each of a plurality of directional beams.

8. The apparatus of claim 1, further wherein the radio frequency (RF) transceiver and steering subsystem is configured to periodically transmit training packets at each of a plurality of directional beams, wherein the period is less than once every minute.

9. The apparatus of claim 1, further wherein the radio frequency (RF) transceiver and steering subsystem is configured to periodically transmit training packets at each of a plurality of directional beams, wherein the period is less than once every five minutes.

10. The device of claim 1, wherein the radio frequency (RF) transceiver and steering subsystem is configured to assign each of a plurality of station devices a directional beam based on a response packet received from each of the station devices in response to a training packet emitted by the array of antenna elements, and to transmit data to the station devices using an assigned directional beam.

11. A phased array antenna apparatus, the apparatus comprising:
 an antenna housing enclosing a two-dimensional (2D) array of antenna emitters forming two or more vertical columns of disc-shaped emitting surfaces arrange in a flat plane within the antenna housing;
 a pair of flared wings extending at an angle from a front of the housing, wherein the flared wings are formed of an RF shielding material;
 a radio frequency (RF) transceiver and steering subsystem connected to the 2D array of antenna emitters, and configured to generate a plurality of RF signals that are phase shifted relatively to each other for beamforming of the plurality of RF signals emitted by the two dimensional array of antenna emitters, wherein the RF transceiver and steering subsystem comprises a radio device and a lacunated lens, wherein the lacunated lens has a body having at least two parallel plates separated by a dielectric material and multiple openings at least partially through the body of the lens, wherein the openings are arranged in the body so that an RF signal entering the body will exit from at a time delay corresponding to a predetermined steering angle that corresponds to where the RF signal entered the body; and
 two or more RF connectors on a back of the antenna housing, configured to connect the radio device to the two-dimensional array of antenna emitters.

\* \* \* \* \*